Aug. 21, 1928.

J. F. GAIL 1,681,728

MACHINE FOR MAKING SPIRAL SPRINGS

Filed April 28, 1922      41 Sheets-Sheet 1

Witnesses:
Harry R. White
W. P. Kilroy

Inventor
John F. Gail
By Fisher Towle Clapp & Soans
Atty's

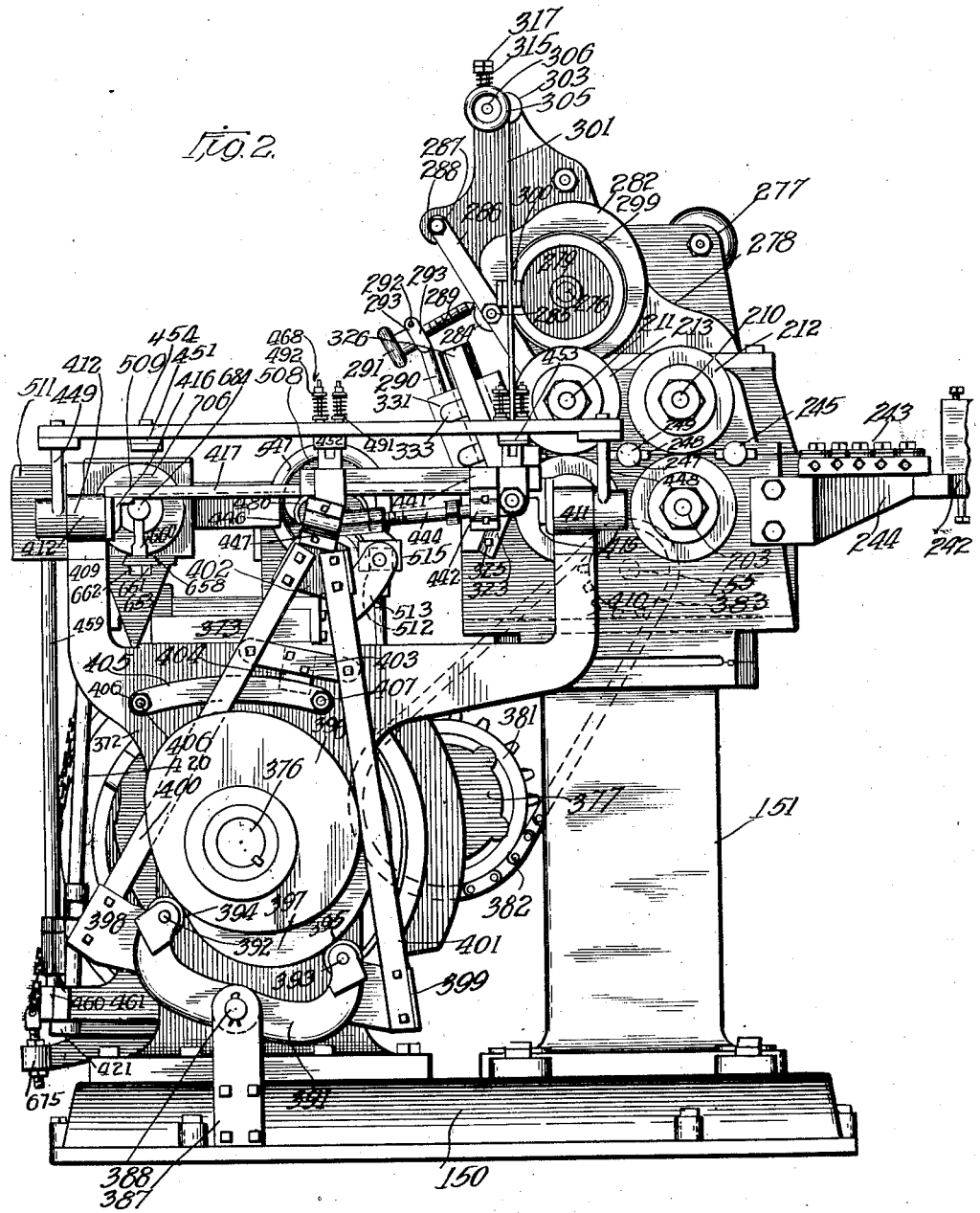

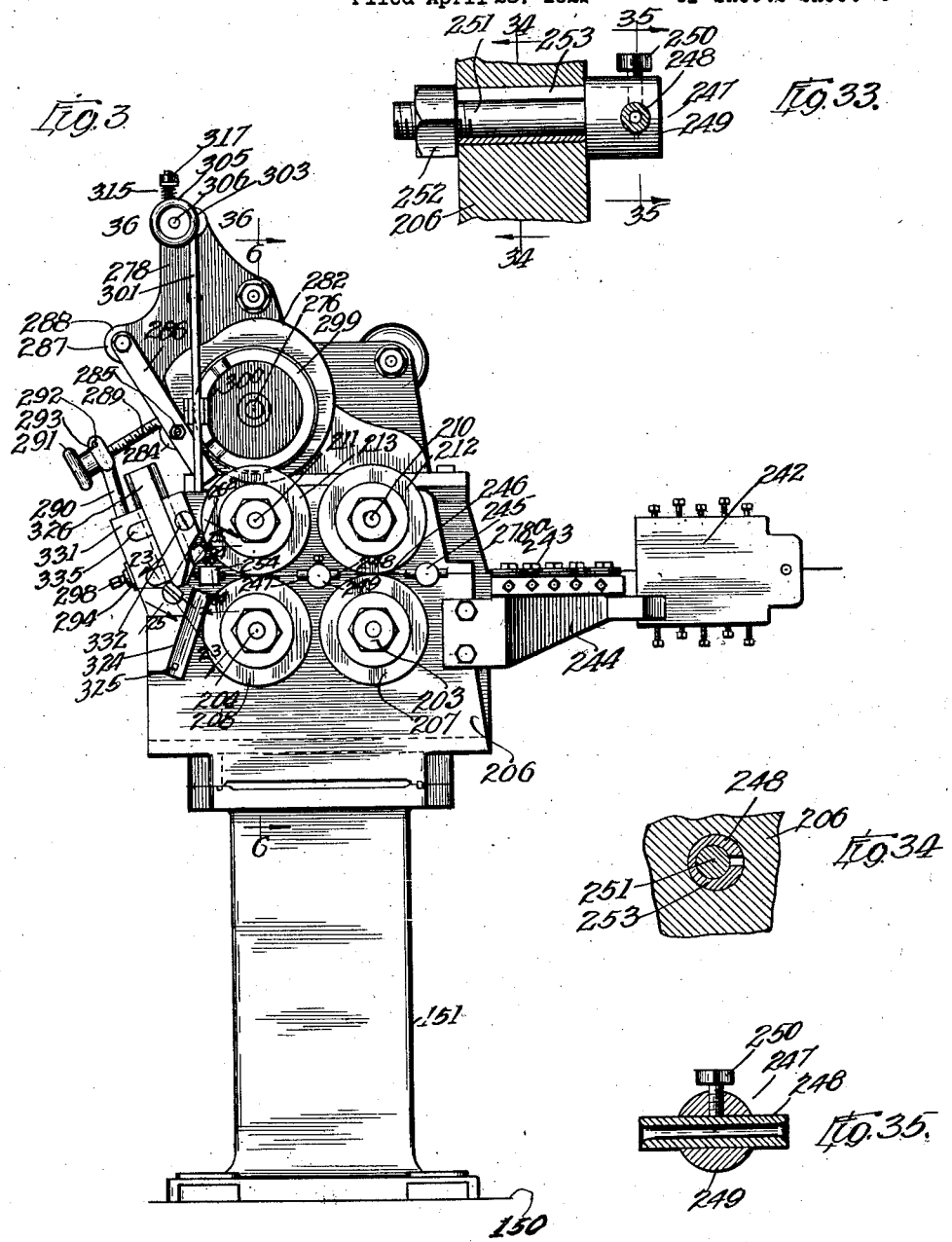

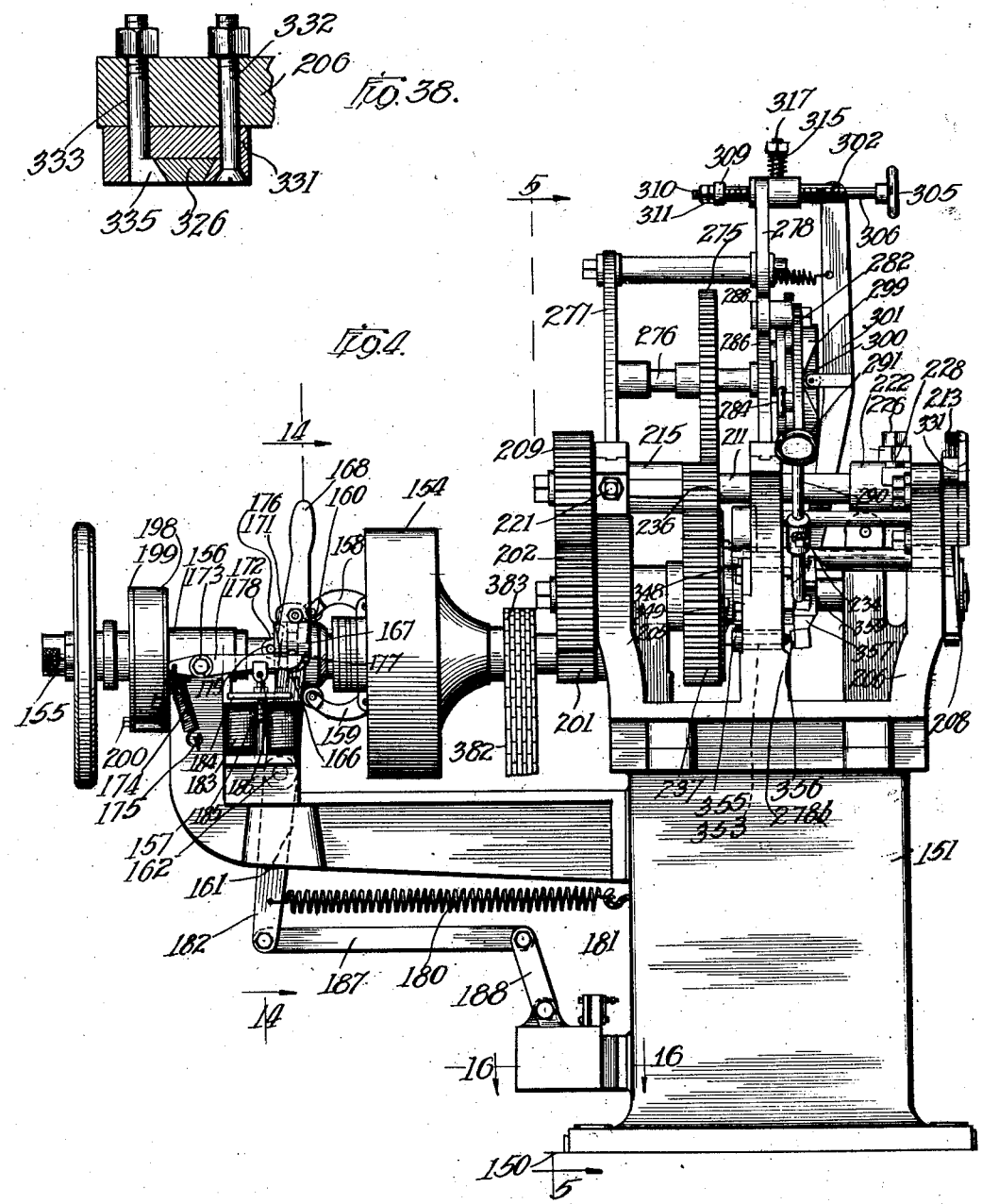

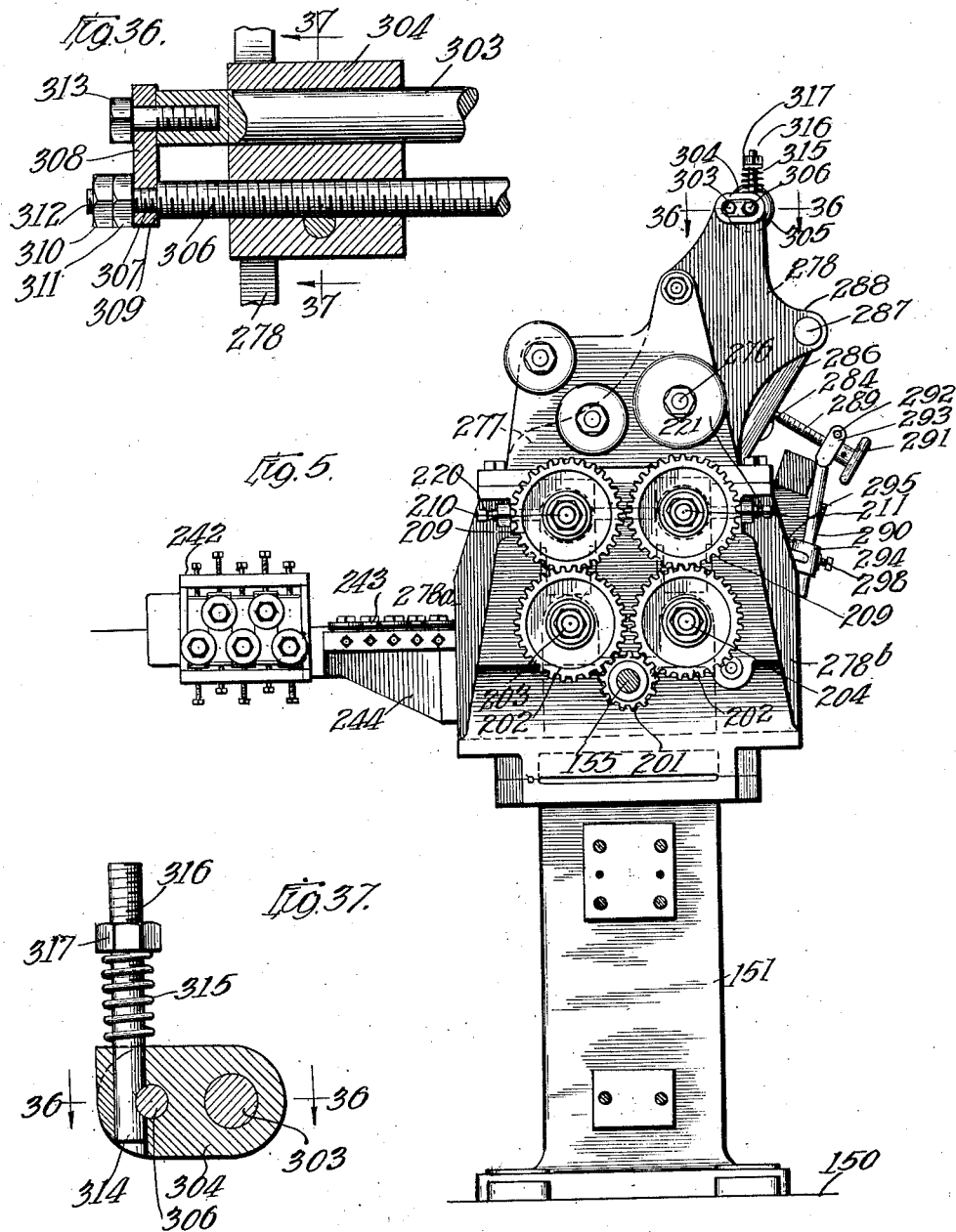

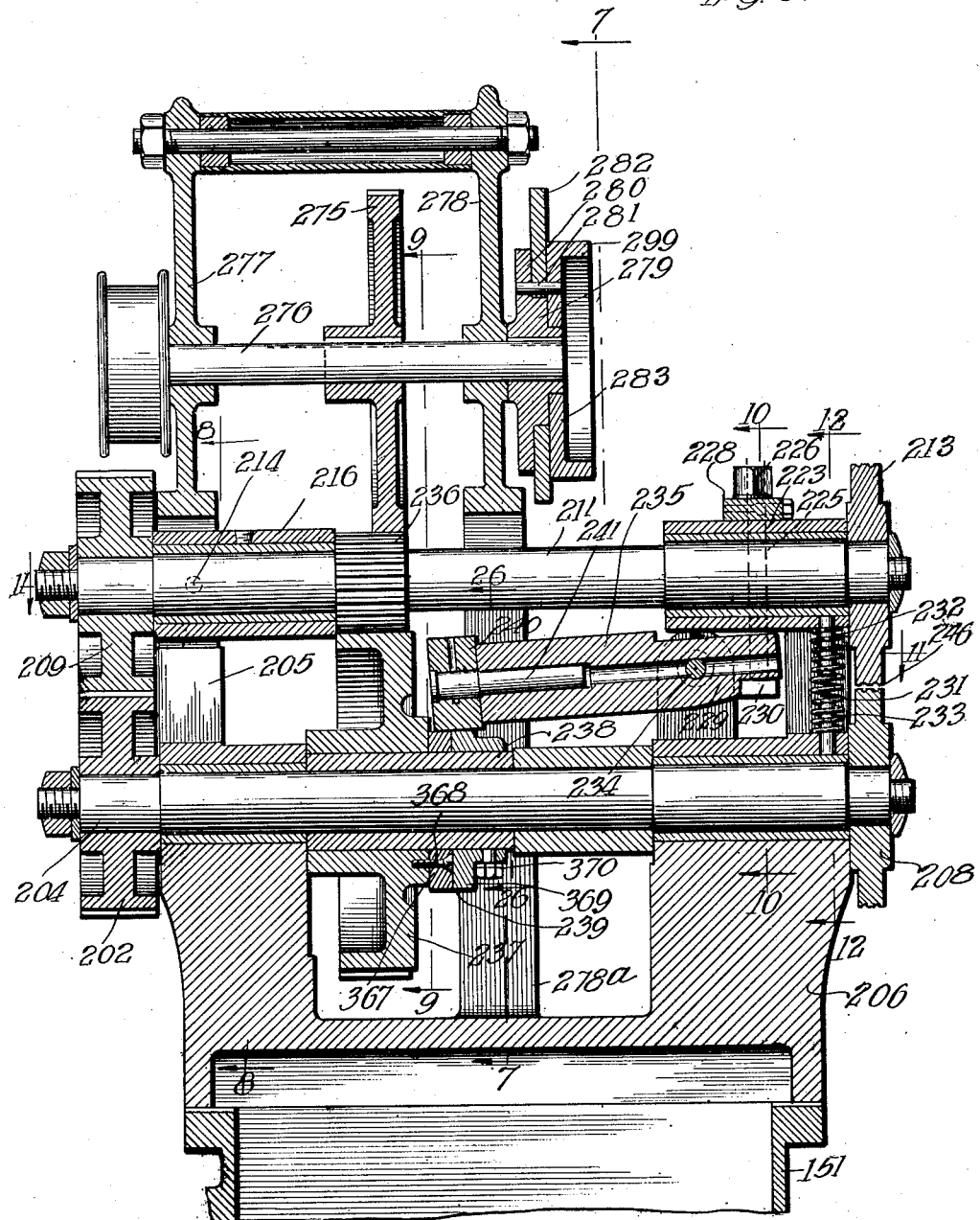

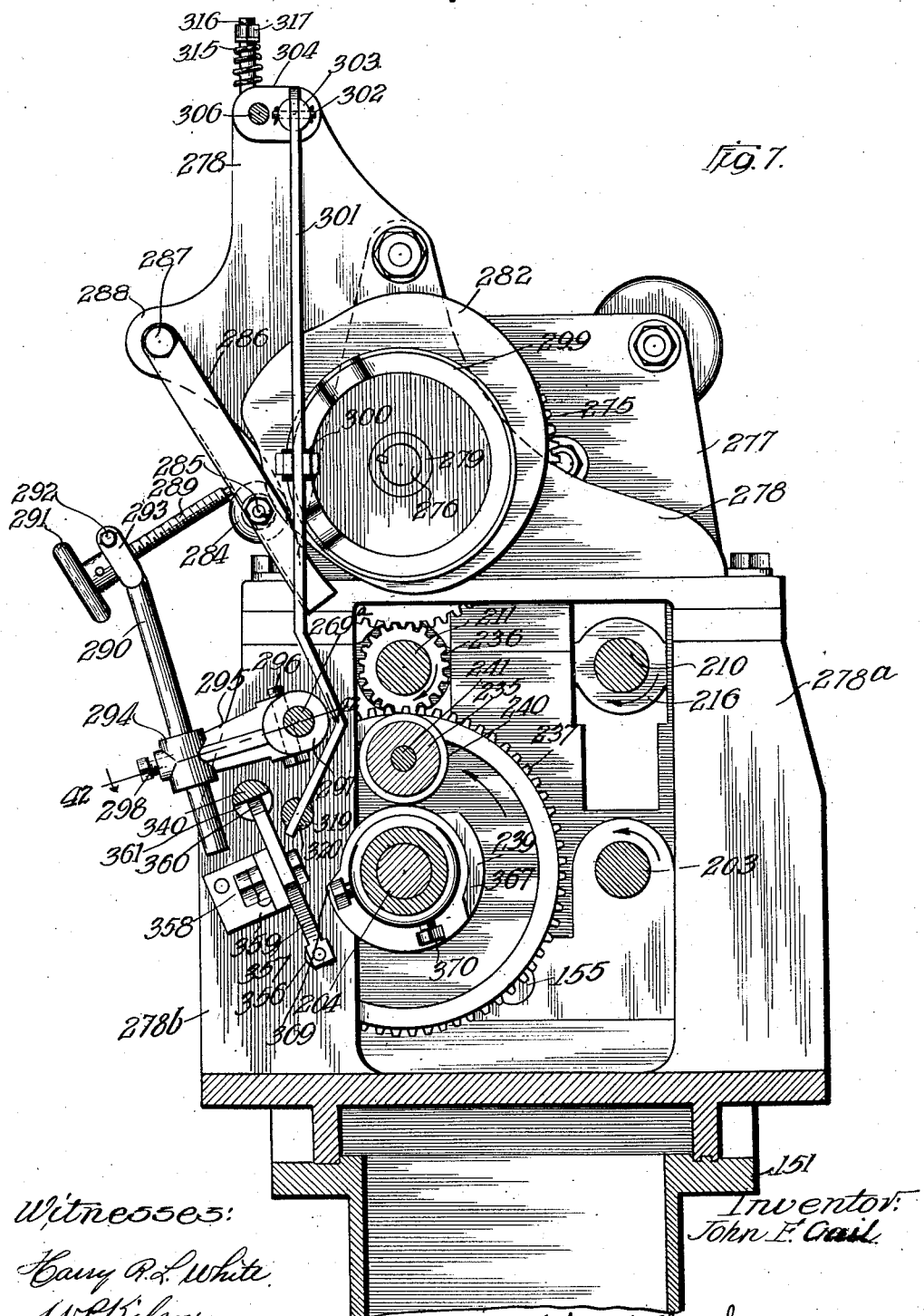

Aug. 21, 1928.　　　　　　　　　　　　　　　　1,681,728
J. F. GAIL
MACHINE FOR MAKING SPIRAL SPRINGS
Filed April 28, 1922　　　41 Sheets-Sheet 8
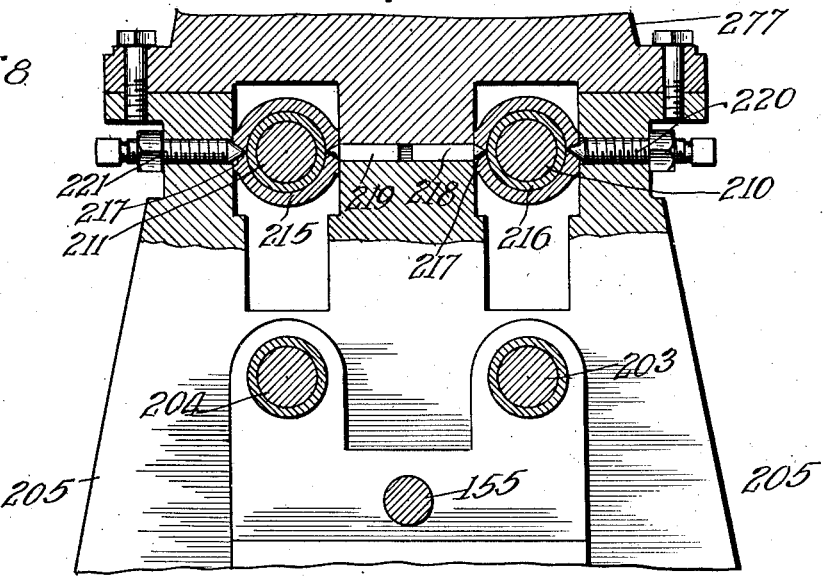
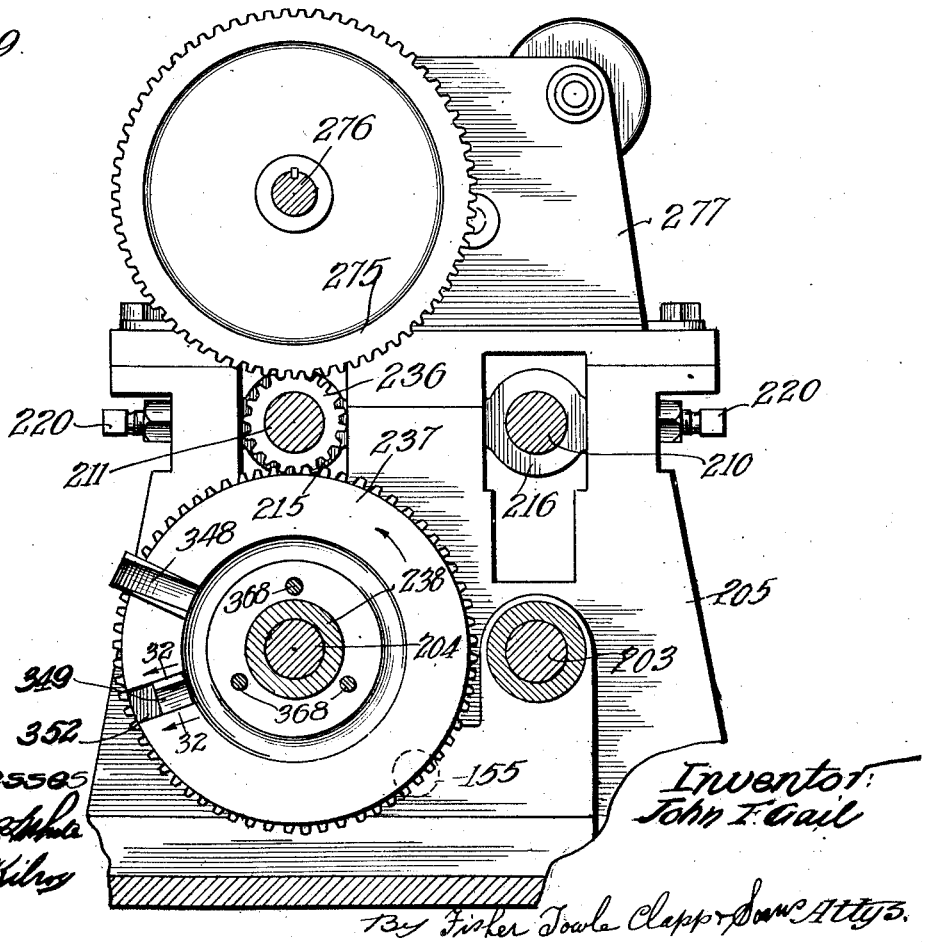

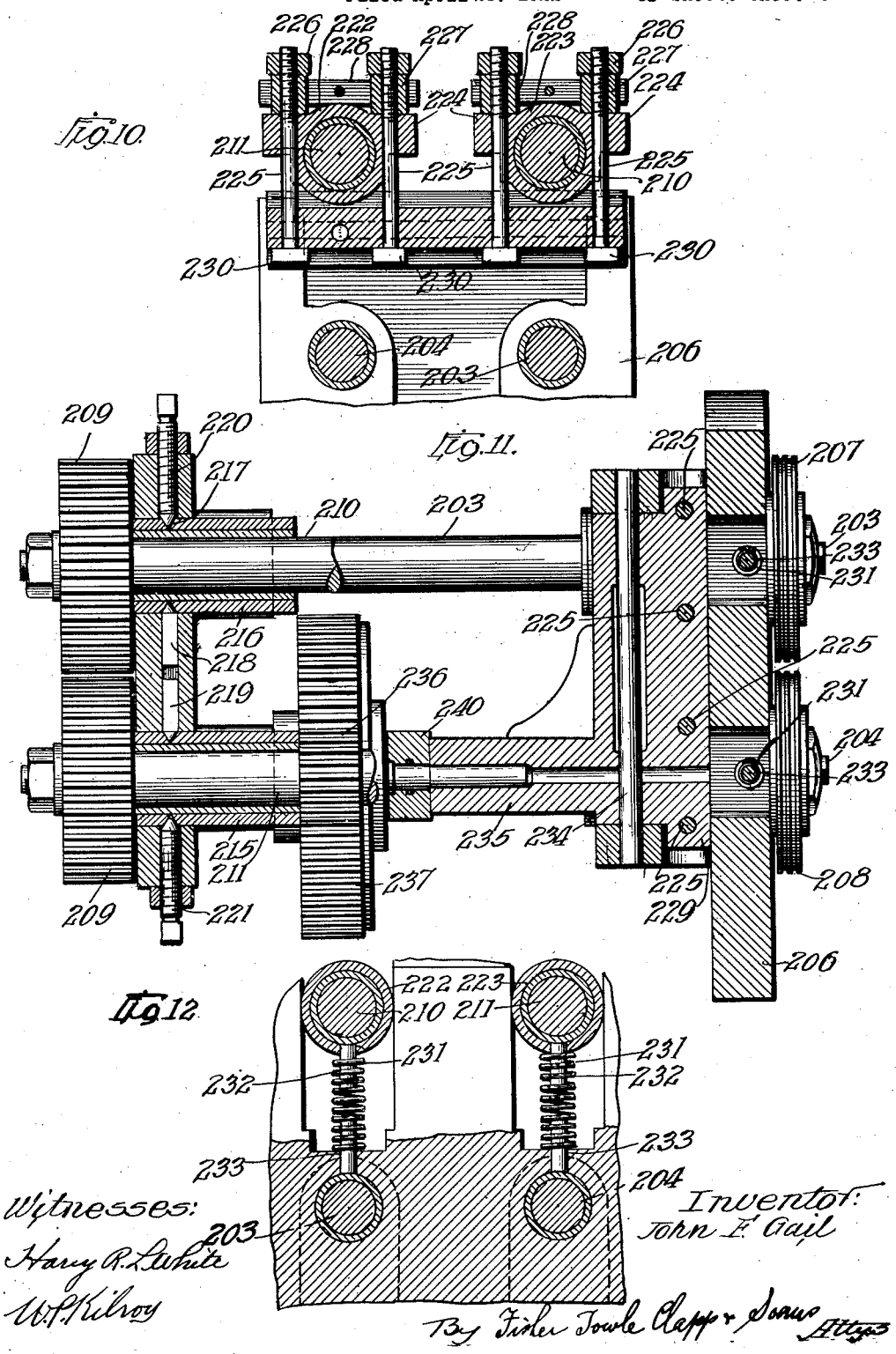

Aug. 21, 1928.                                              1,681,728
                           J. F. GAIL
              MACHINE FOR MAKING SPIRAL SPRINGS
                 Filed April 28, 1922      41 Sheets-Sheet 10
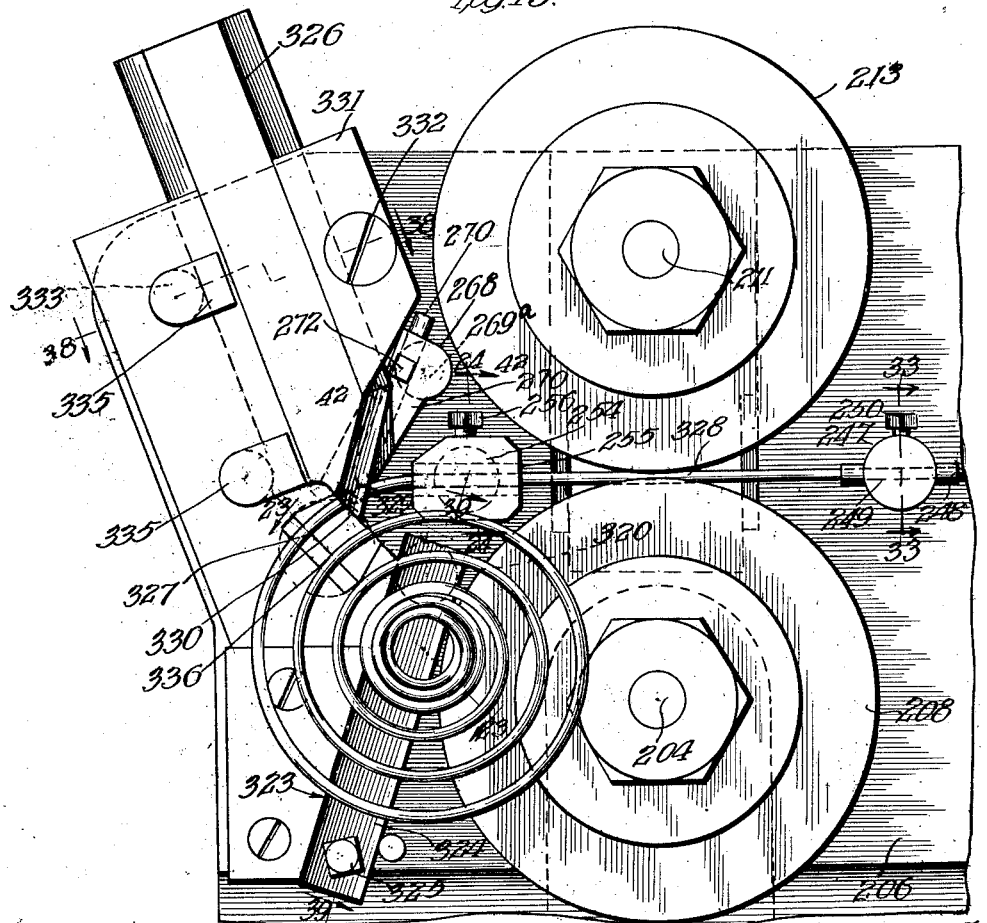
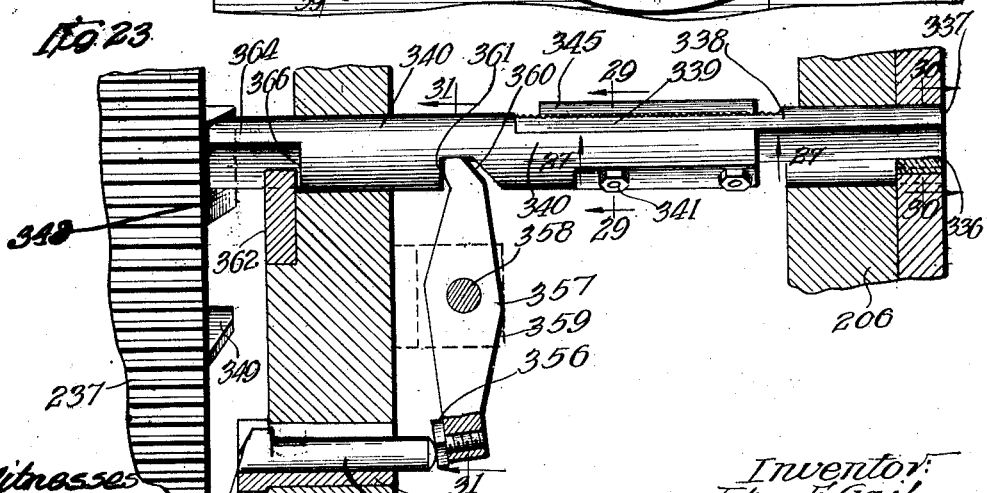

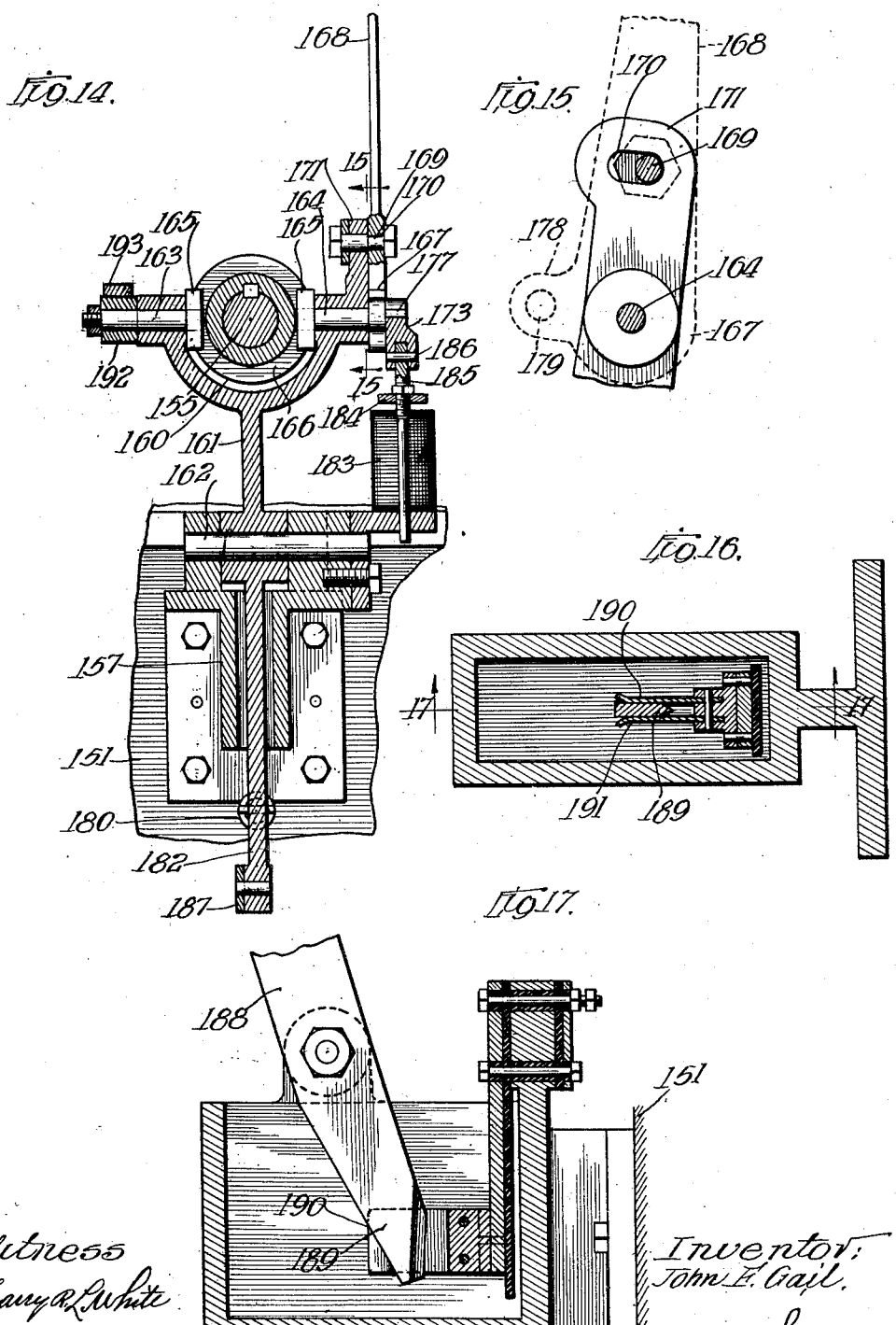

Aug. 21, 1928.
J. F. GAIL
1,681,728
MACHINE FOR MAKING SPIRAL SPRINGS
Filed April 28, 1922  41 Sheets-Sheet 12
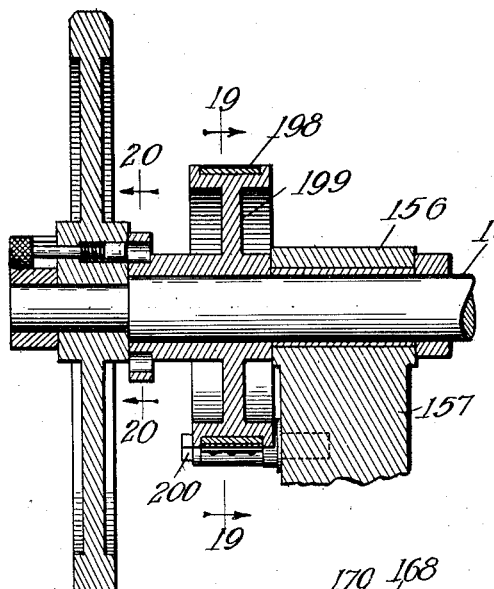
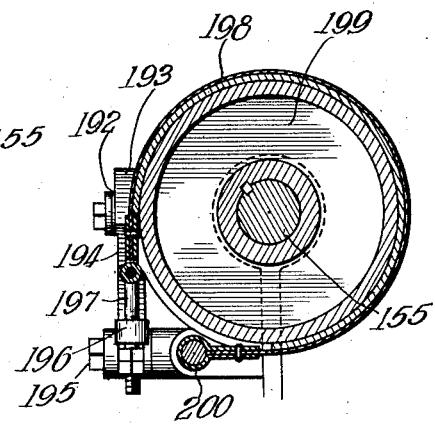
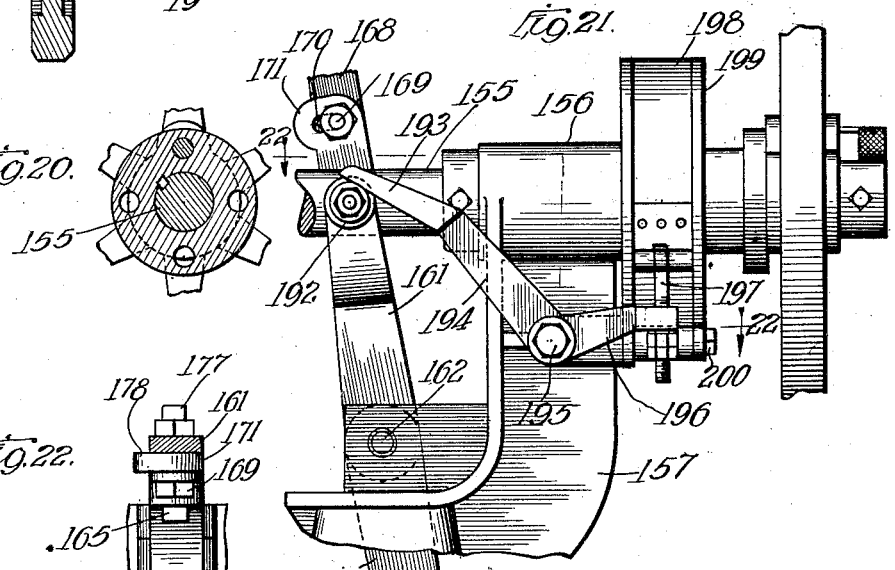
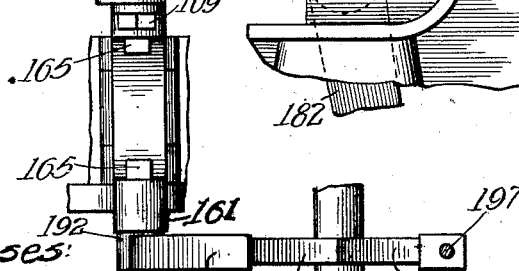

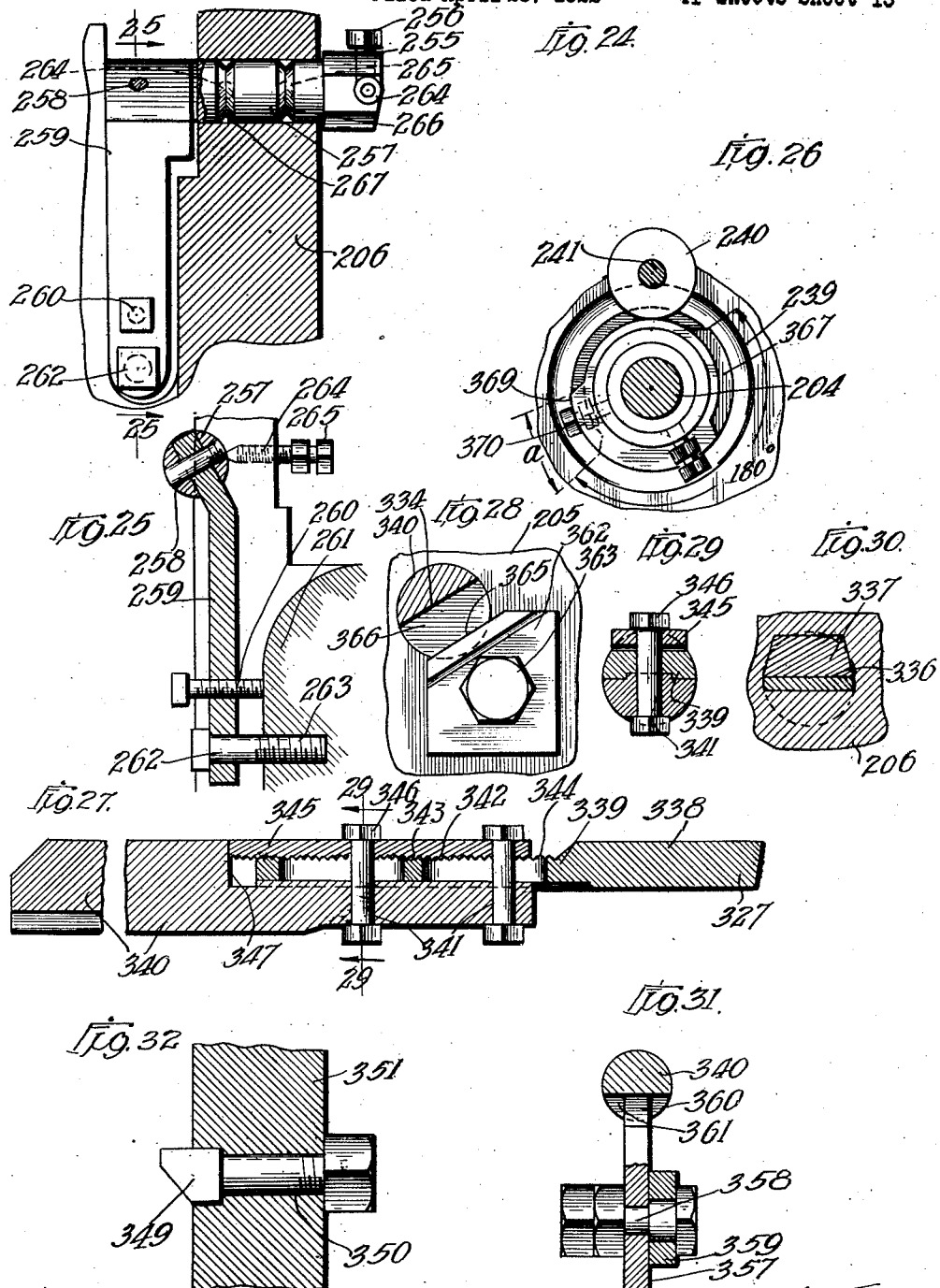

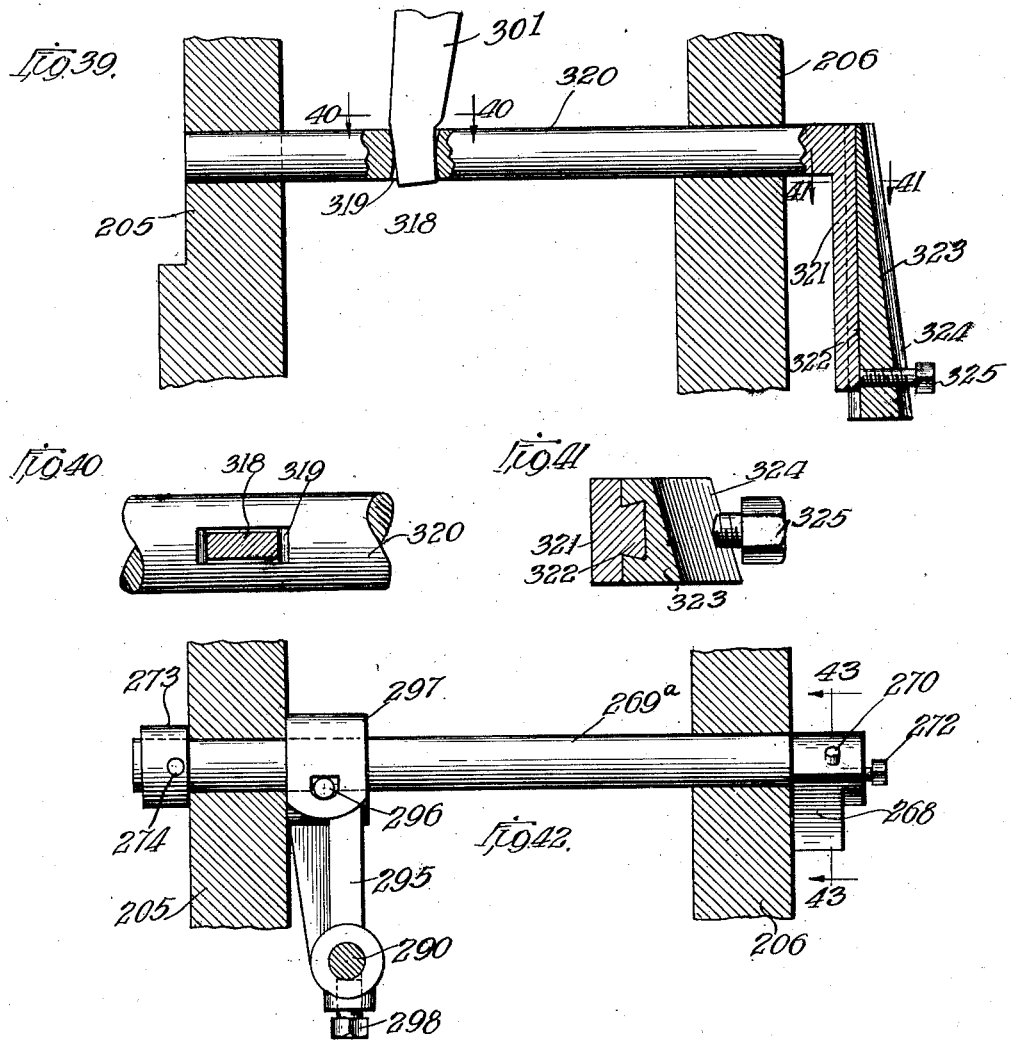
Aug. 21, 1928.
J. F. GAIL
MACHINE FOR MAKING SPIRAL SPRINGS
Filed April 28, 1922   41 Sheets-Sheet 14
1,681,728
Inventor:
John F. Gail
By Fisher Towle Clapp & Sons
Attys.

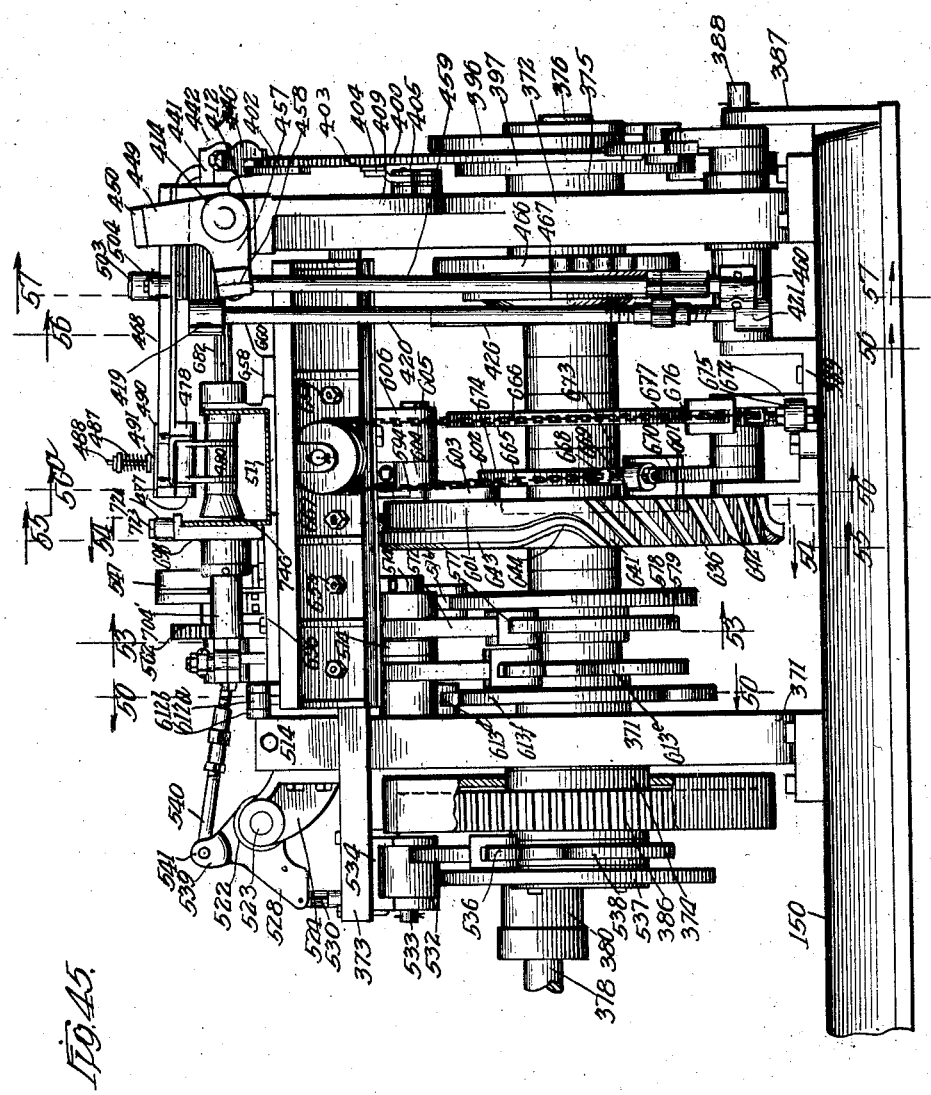

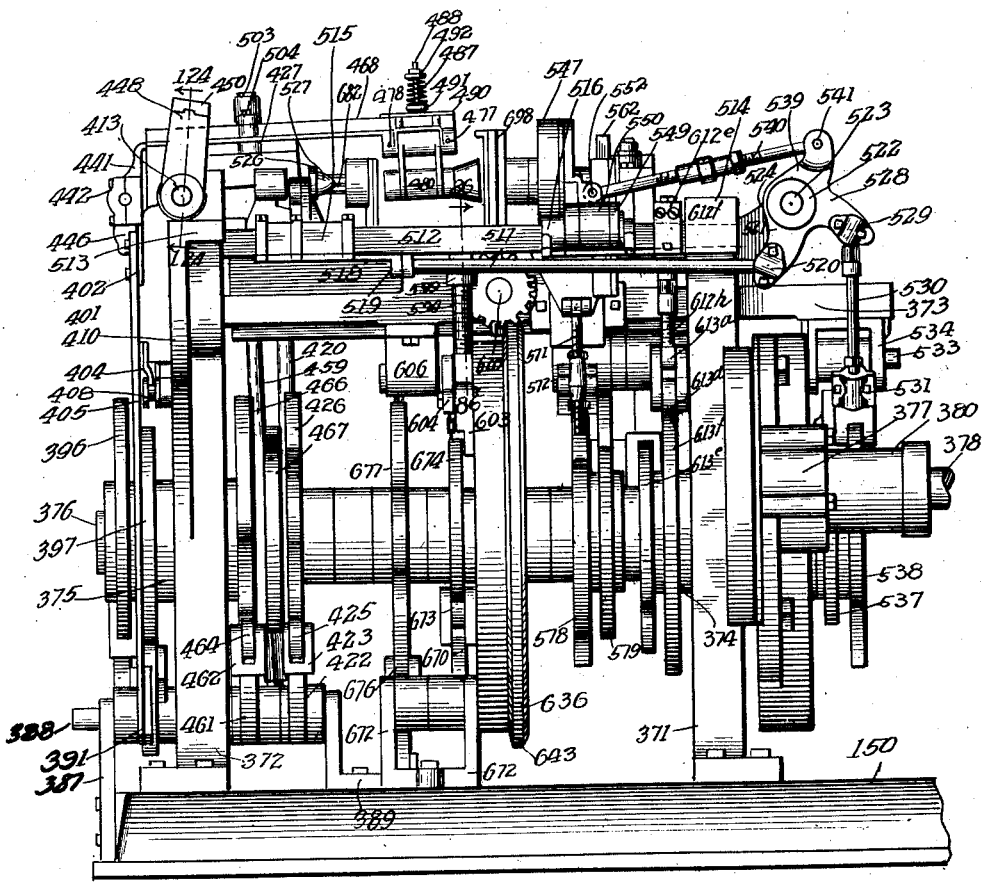

Aug. 21, 1928.  
J. F. GAIL  
1,681,728  
MACHINE FOR MAKING SPIRAL SPRINGS  
Filed April 28, 1922  41 Sheets-Sheet 17

Witnesses:  
Harry R. L. White  
W. P. Kilroy

Inventor:  
John F. Gail  
By Fisher Towle Clapp & Soans  
Attys.

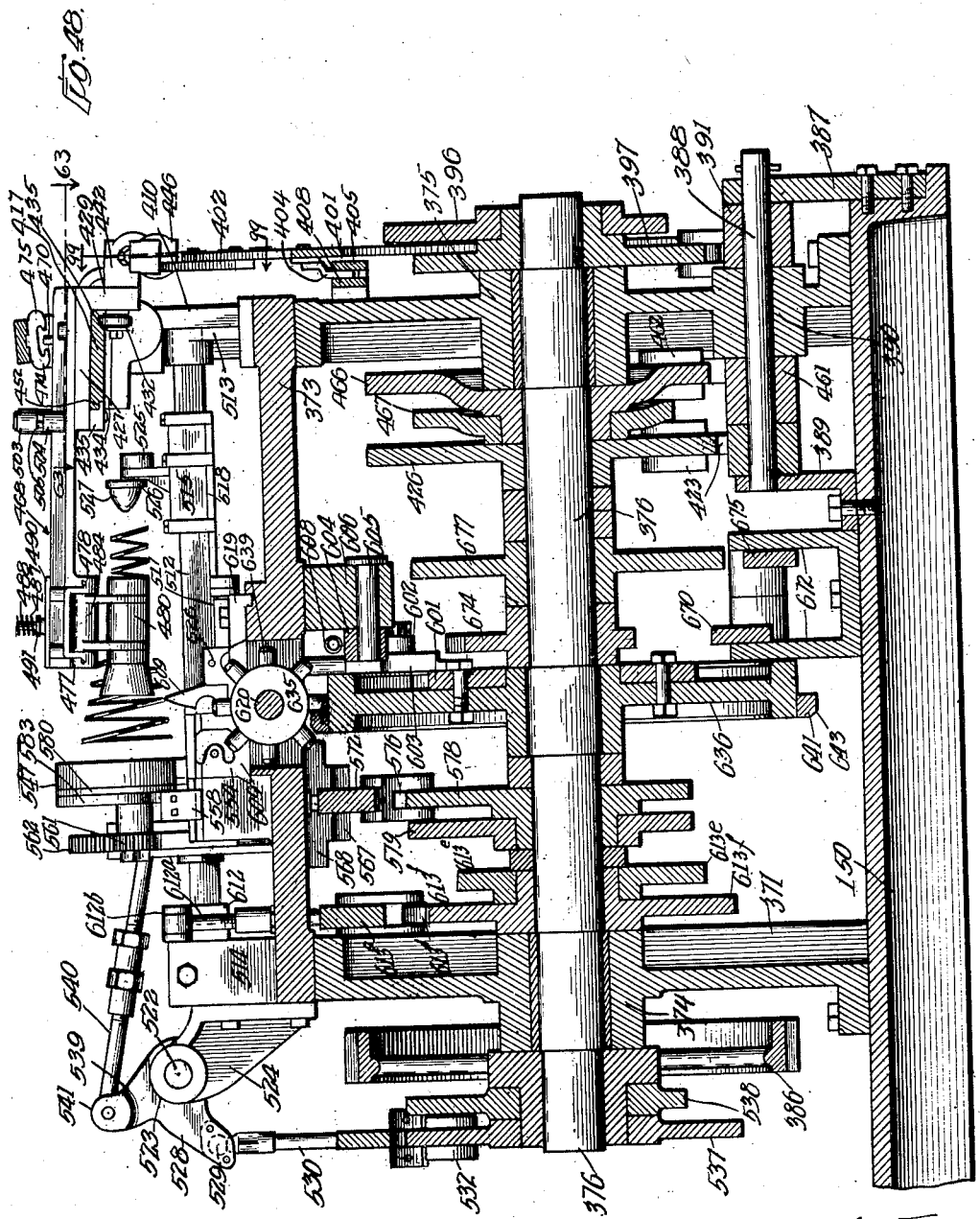

Aug. 21, 1928.

J. F. GAIL 1,681,728

MACHINE FOR MAKING SPIRAL SPRINGS

Filed April 28, 1922     41 Sheets-Sheet 19

Witnesses
Harry R. L. White
W. P. Kilroy

Inventor
John F. Gail
By Fisher Towle Clapp & Sours
Attys

Aug. 21, 1928.  
J. F. GAIL  
1,681,728  
MACHINE FOR MAKING SPIRAL SPRINGS  
Filed April 28, 1922  41 Sheets-Sheet 20
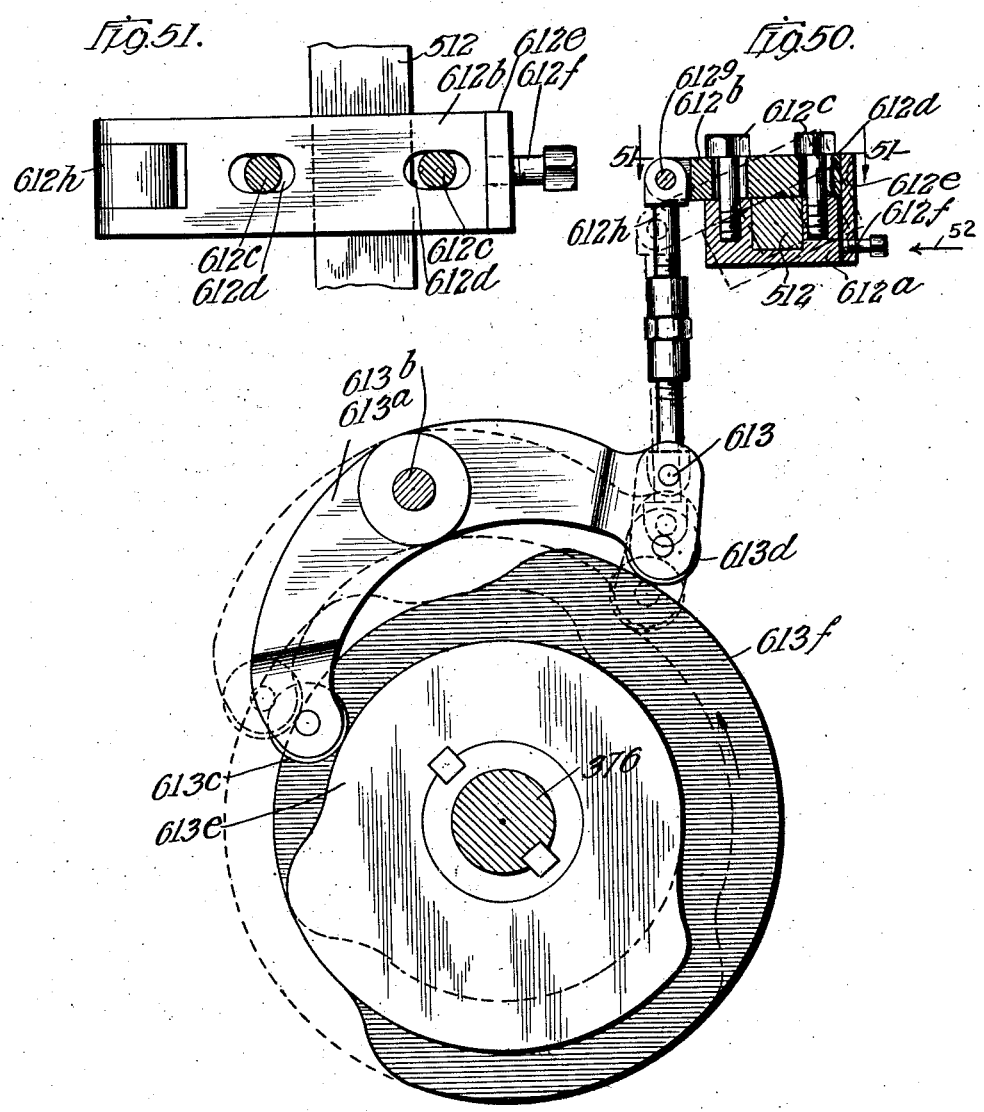
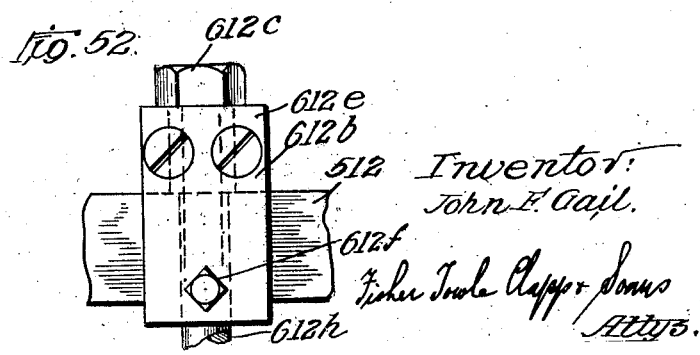

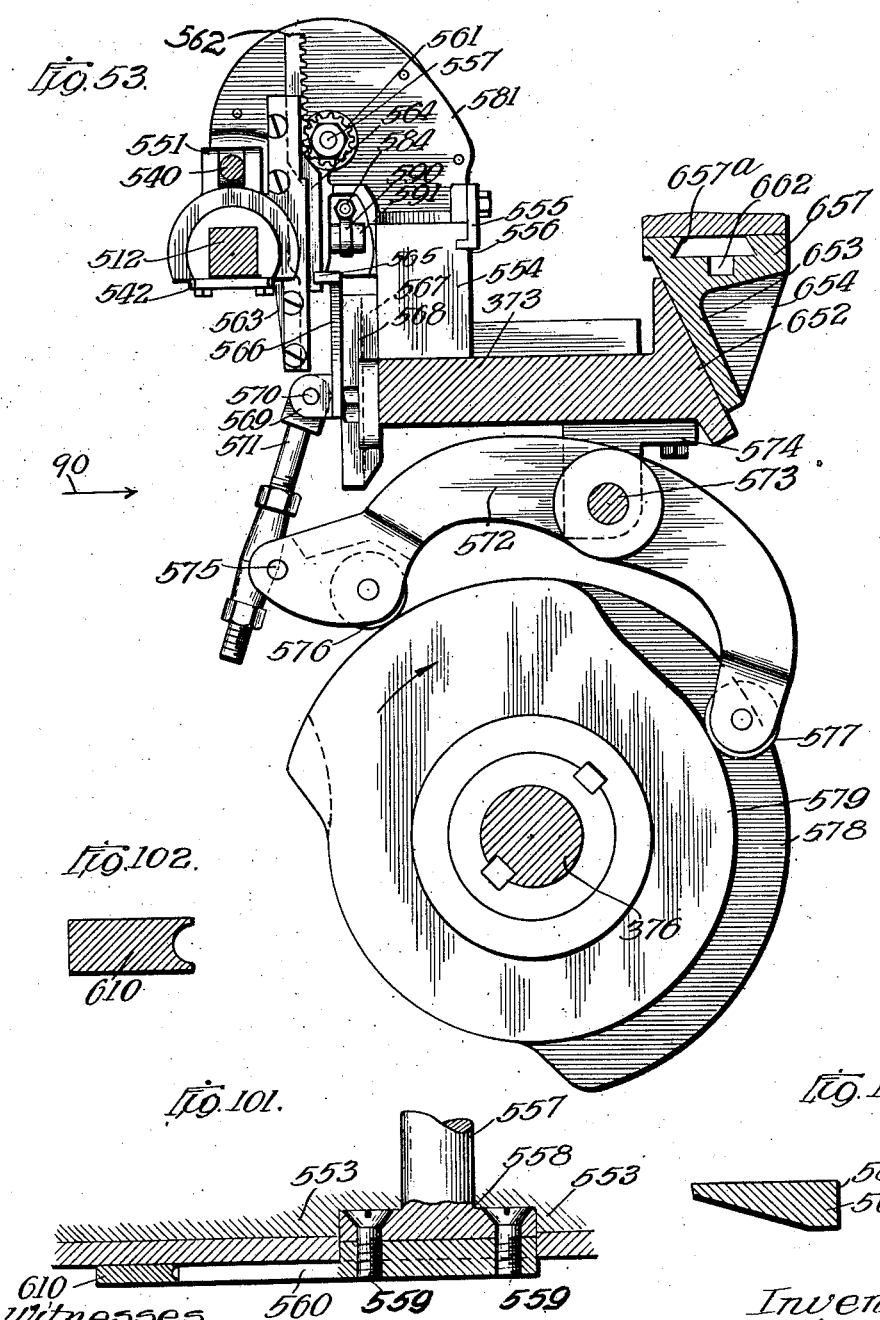

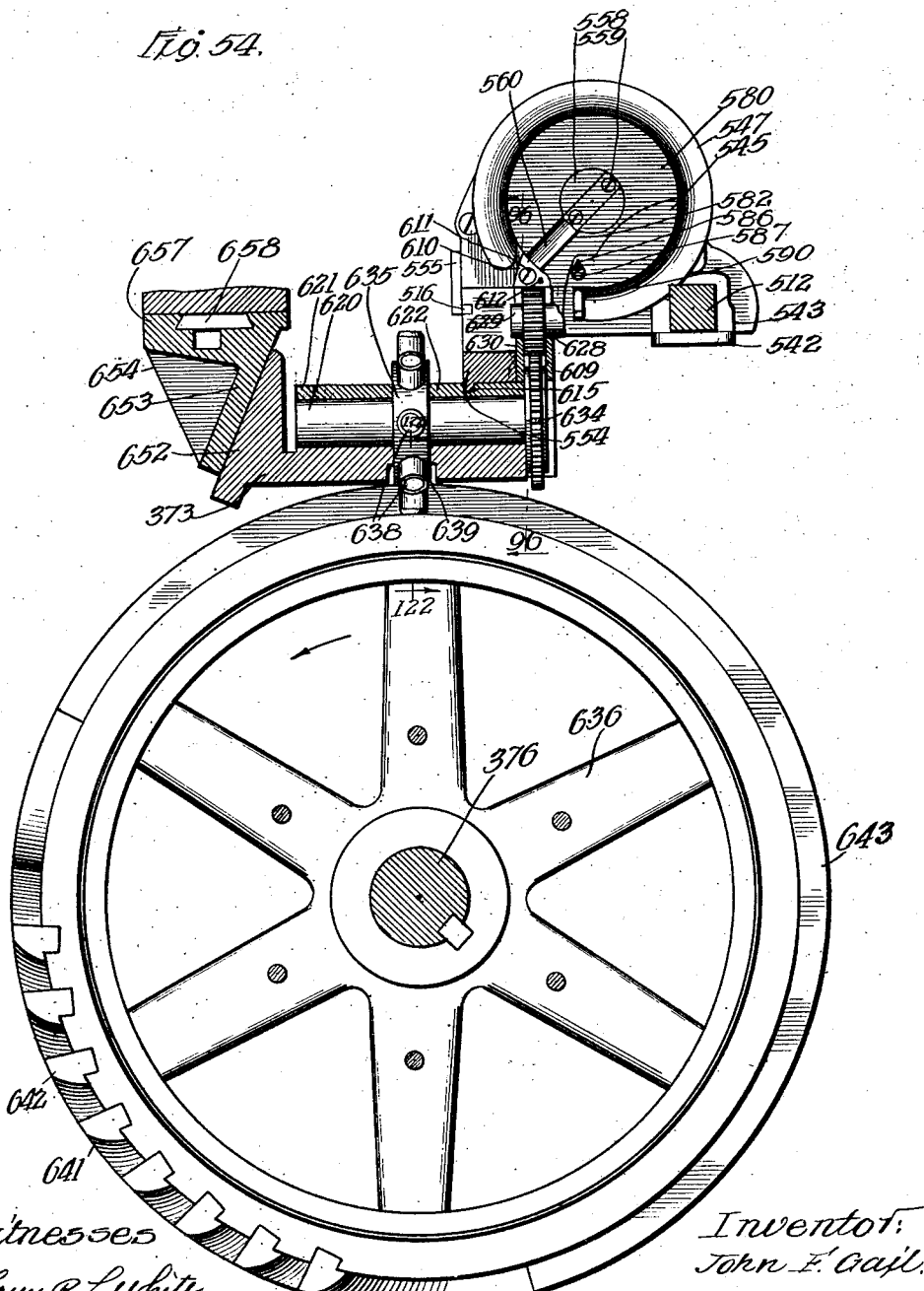

Aug. 21, 1928.  
J. F. GAIL  
1,681,728
MACHINE FOR MAKING SPIRAL SPRINGS
Filed April 28, 1922  41 Sheets-Sheet 23
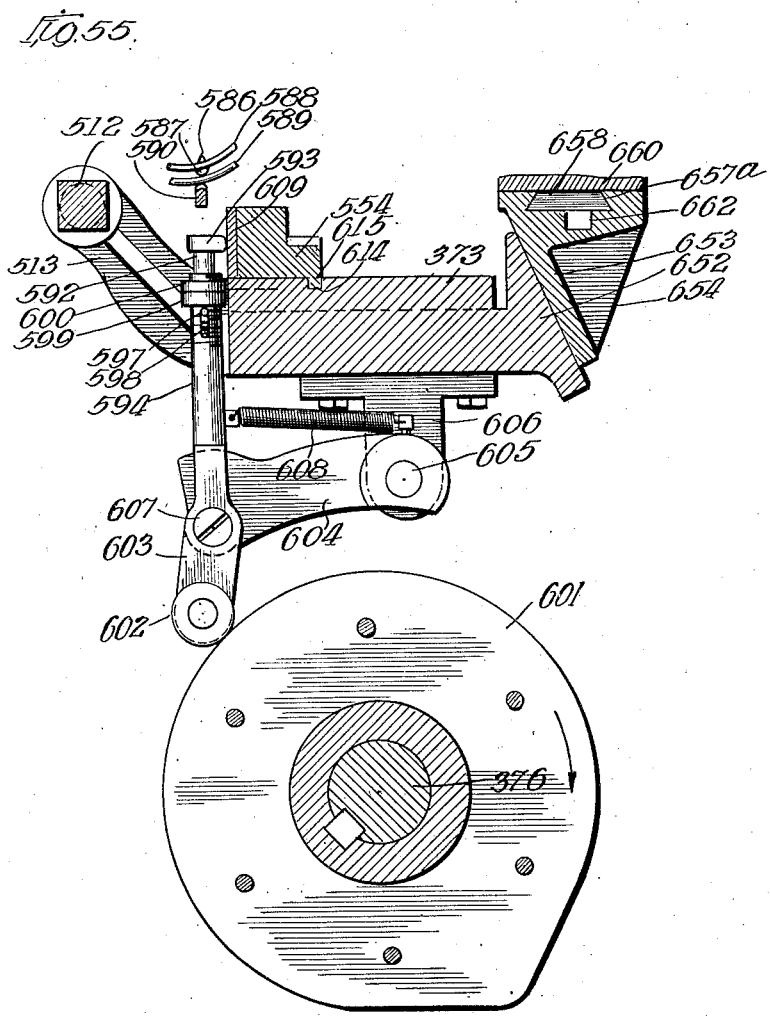
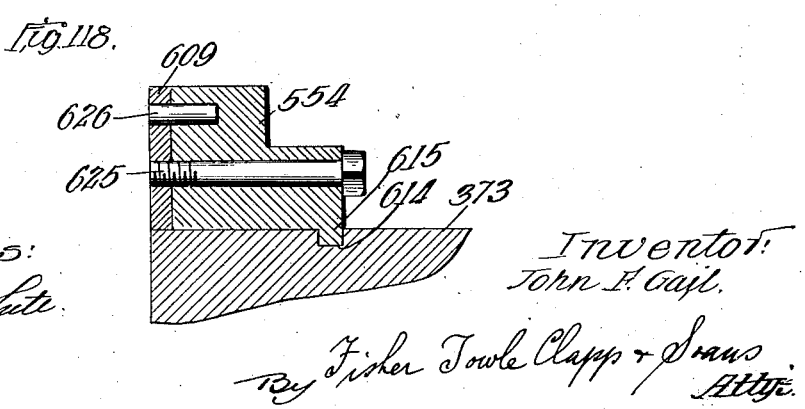

Aug. 21, 1928.
J. F. GAIL
1,681,728
MACHINE FOR MAKING SPIRAL SPRINGS
Filed April 28, 1922   41 Sheets-Sheet 24
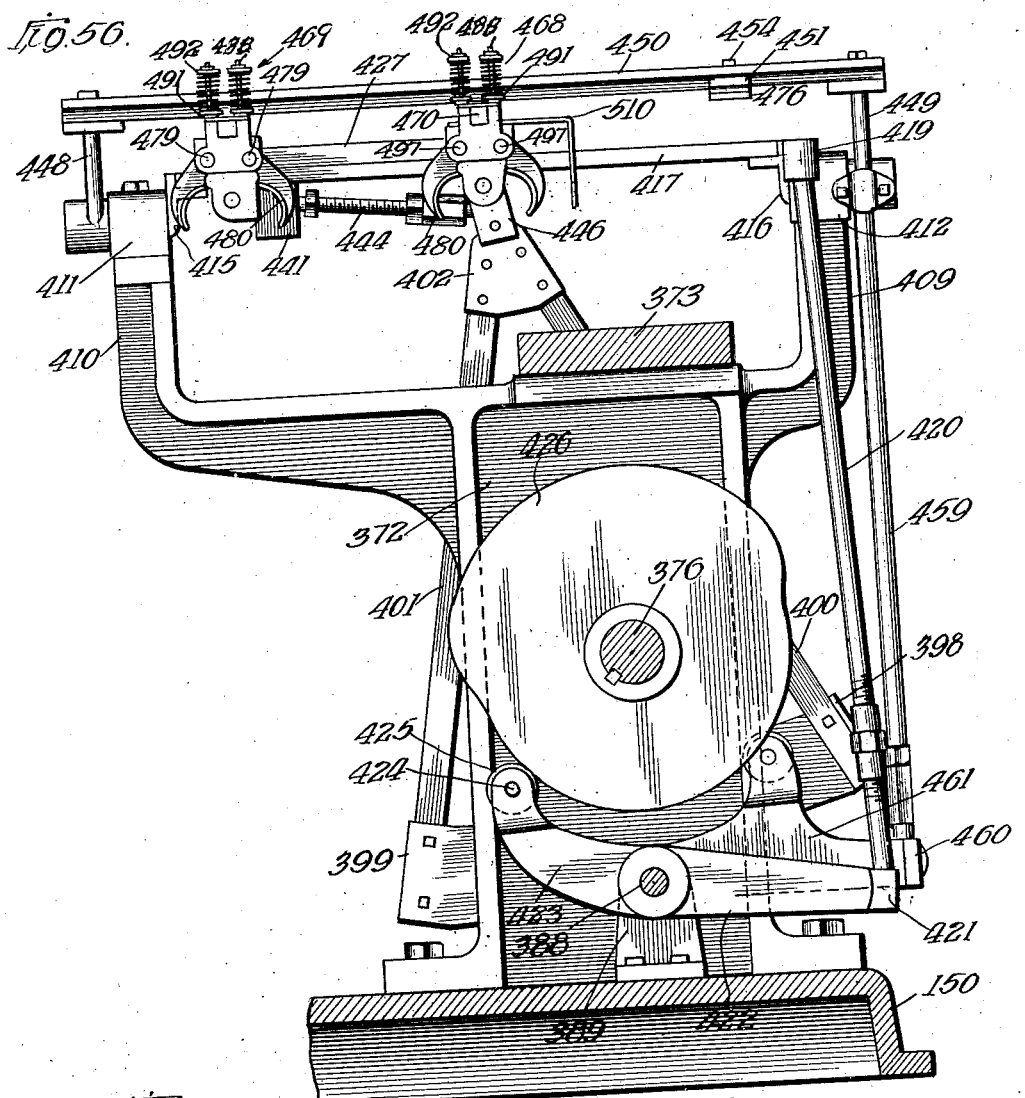
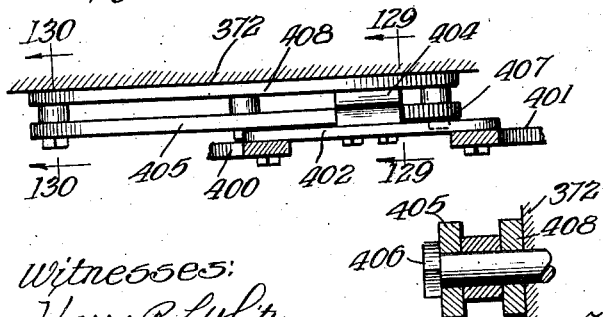
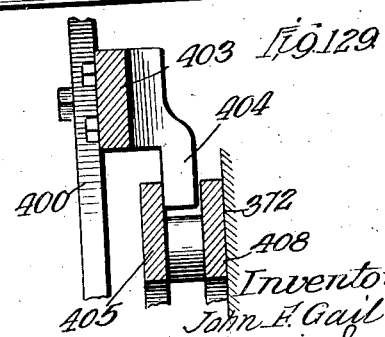

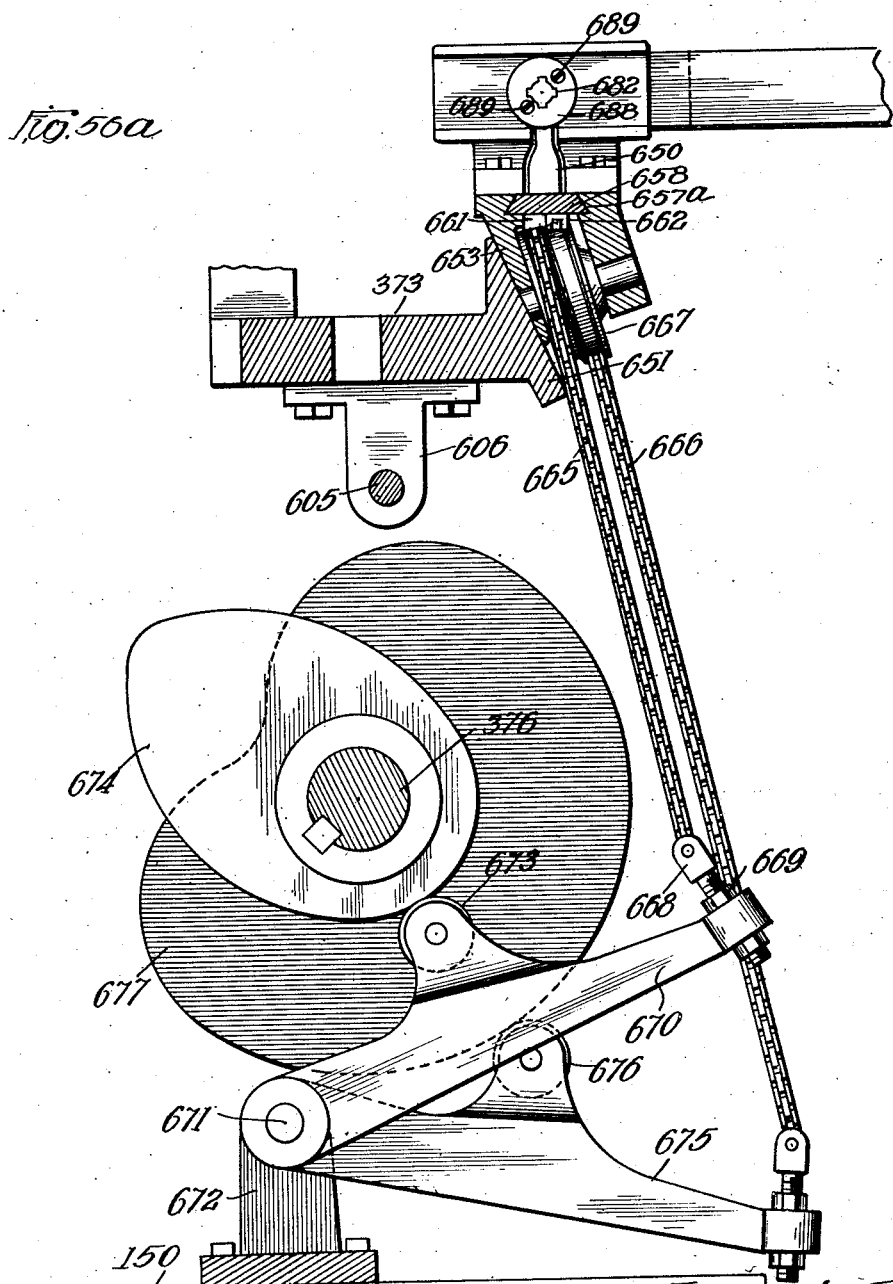

Aug. 21, 1928. 1,681,728
J. F. GAIL
MACHINE FOR MAKING SPIRAL SPRINGS
Filed April 28, 1922 41 Sheets-Sheet 26
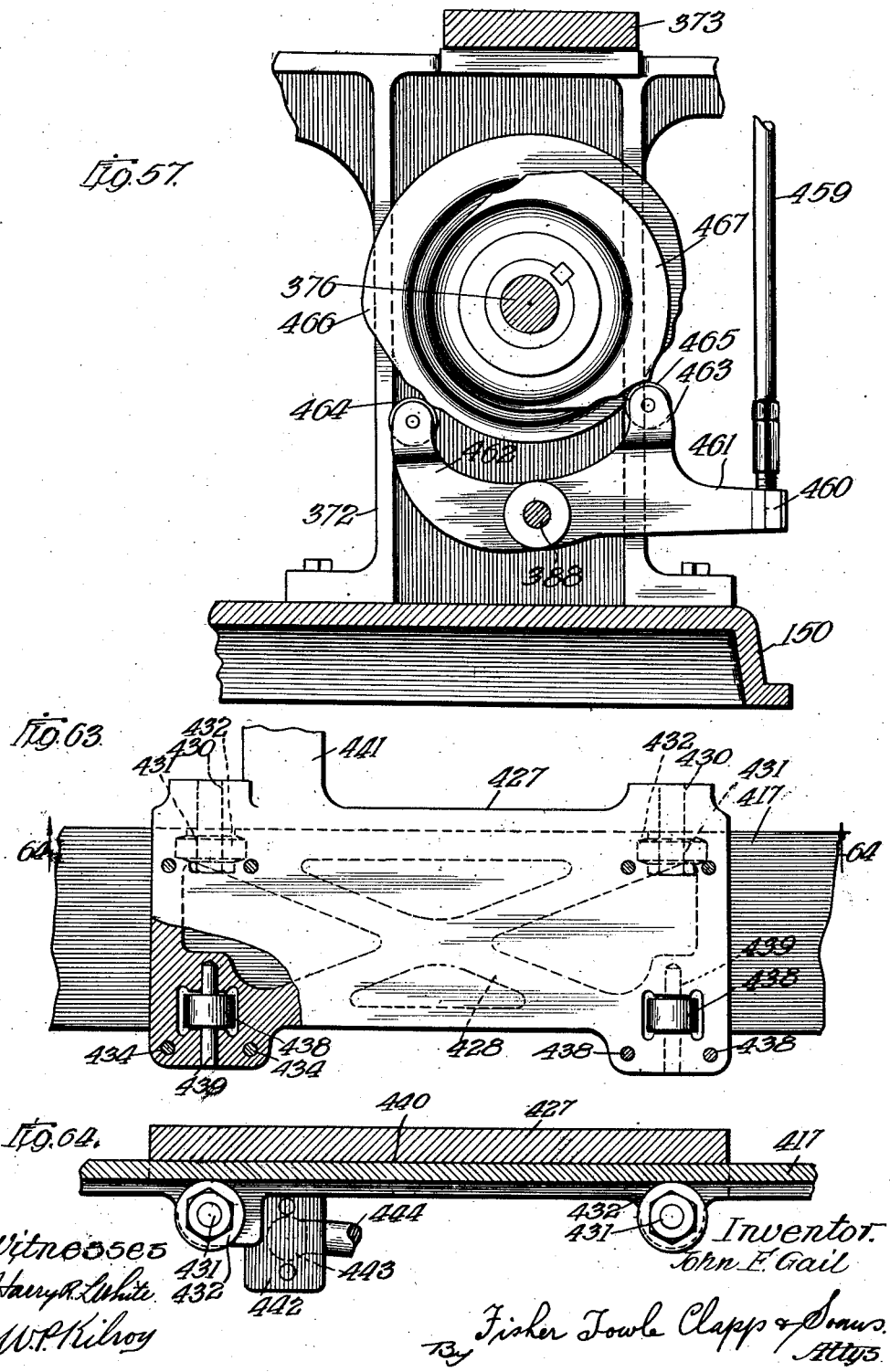

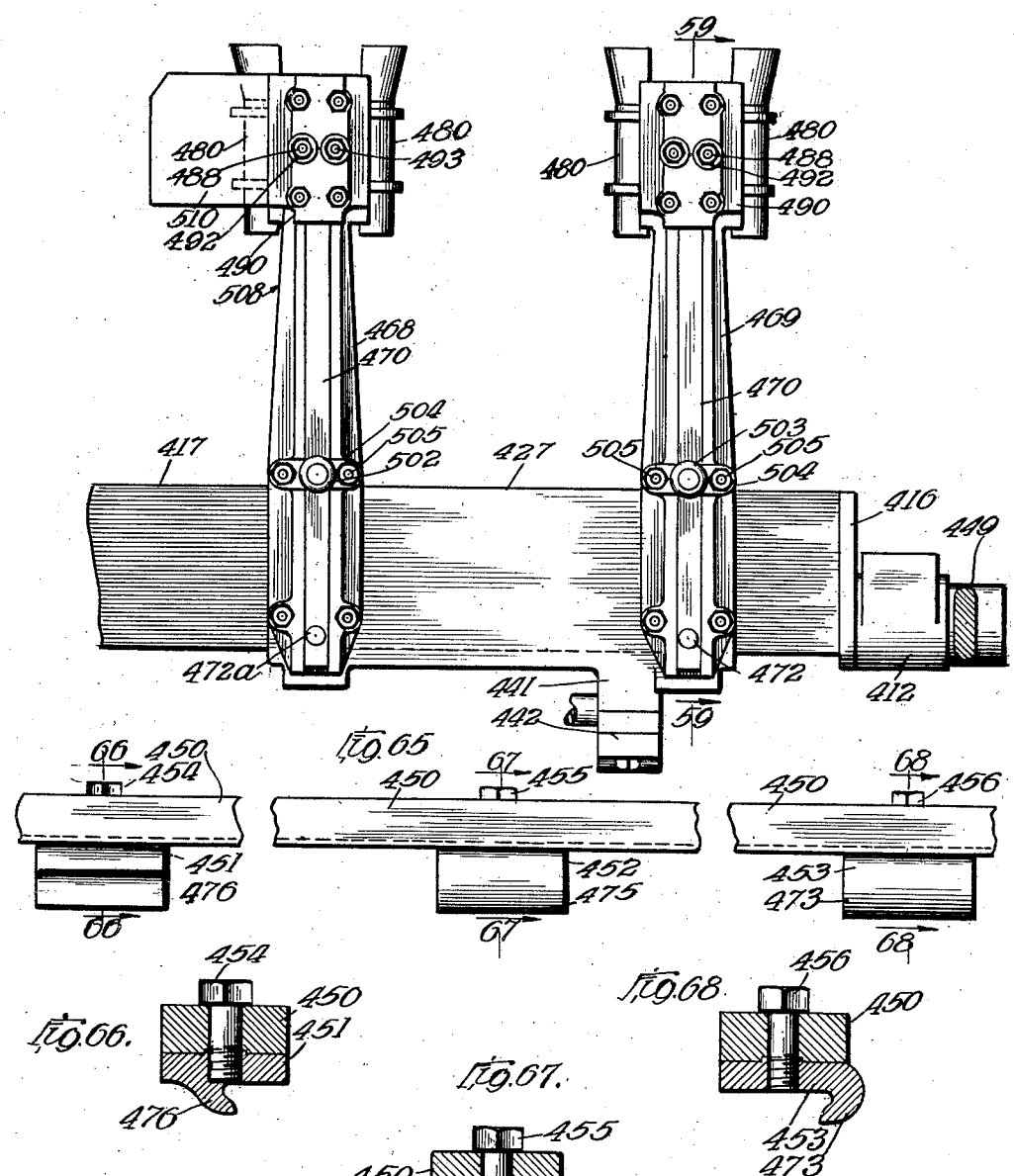

Aug. 21, 1928.
J. F. GAIL
1,681,728
MACHINE FOR MAKING SPIRAL SPRINGS
Filed April 28, 1922     41 Sheets-Sheet 28
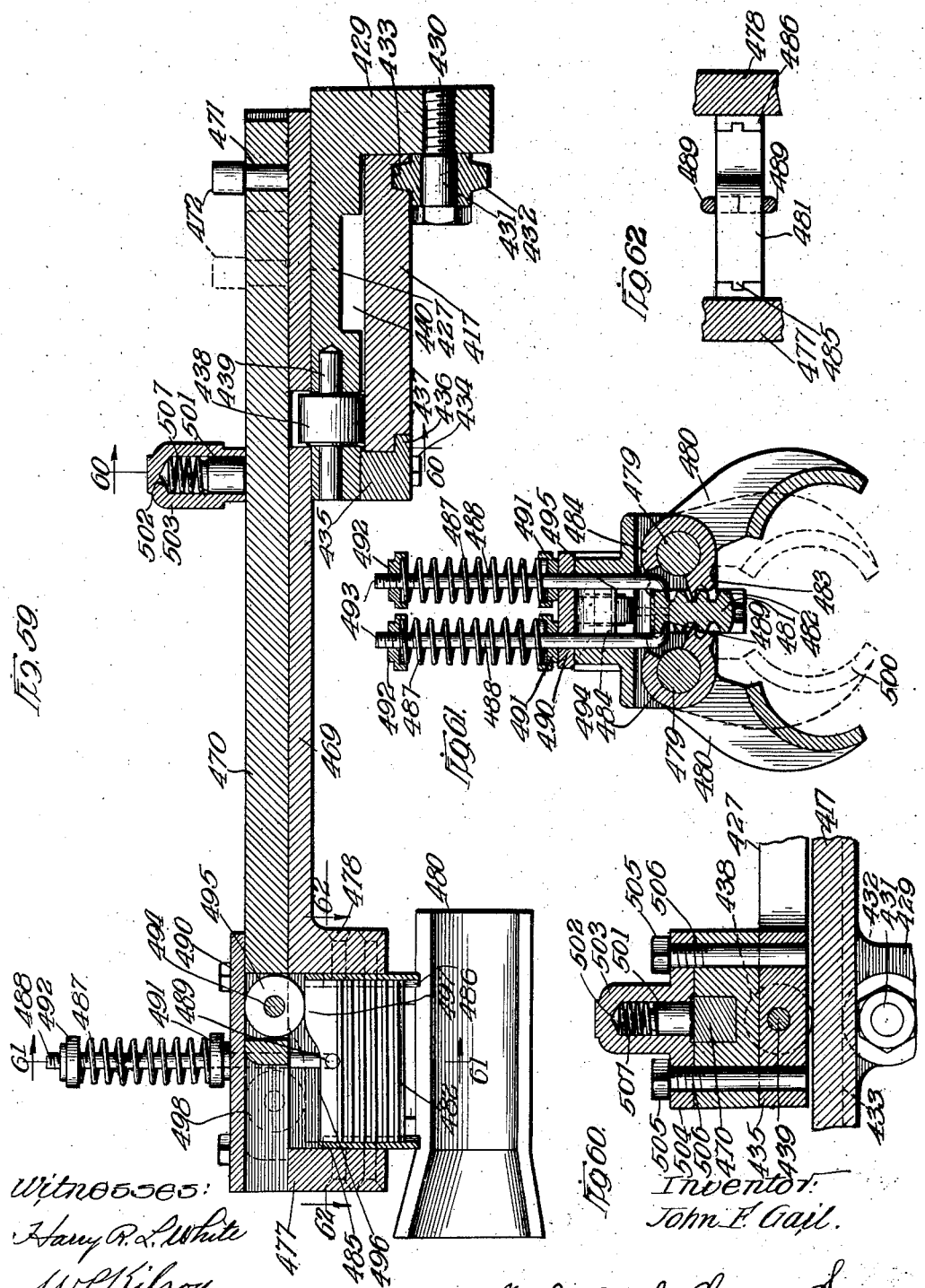

Aug. 21, 1928.                                                    1,681,728
J. F. GAIL
MACHINE FOR MAKING SPIRAL SPRINGS
Filed April 28, 1922        41 Sheets-Sheet 29
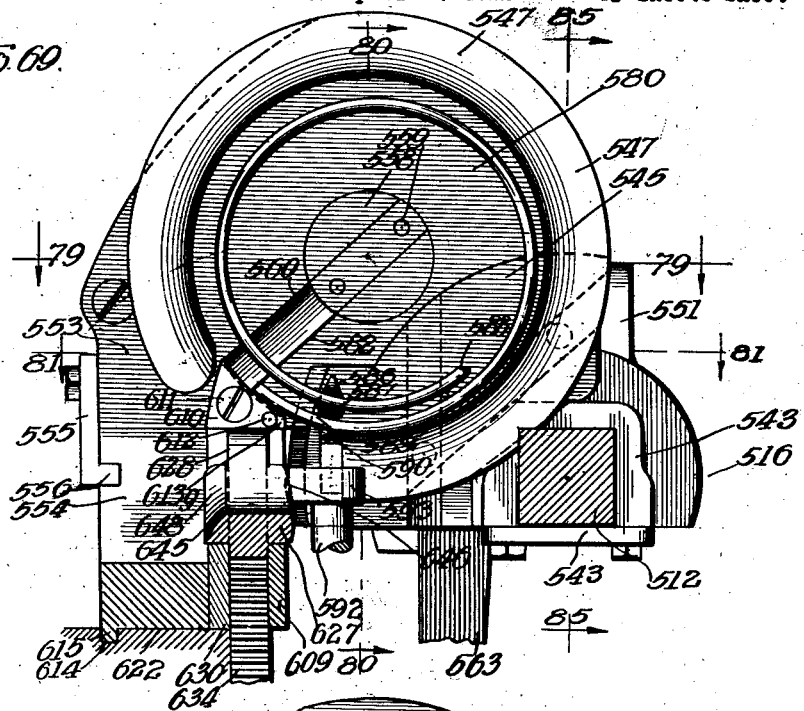
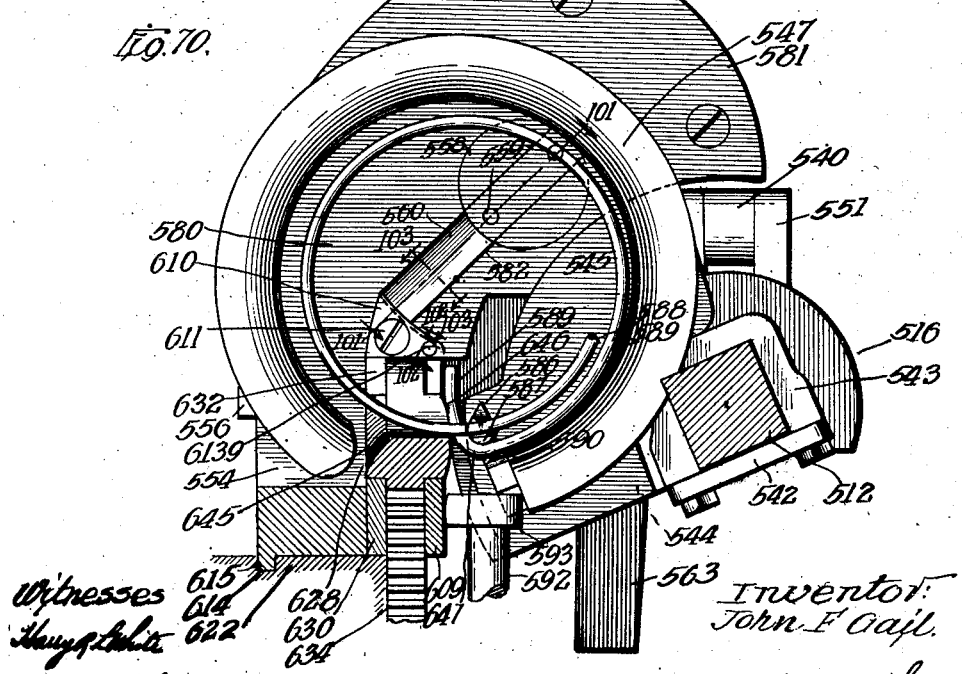

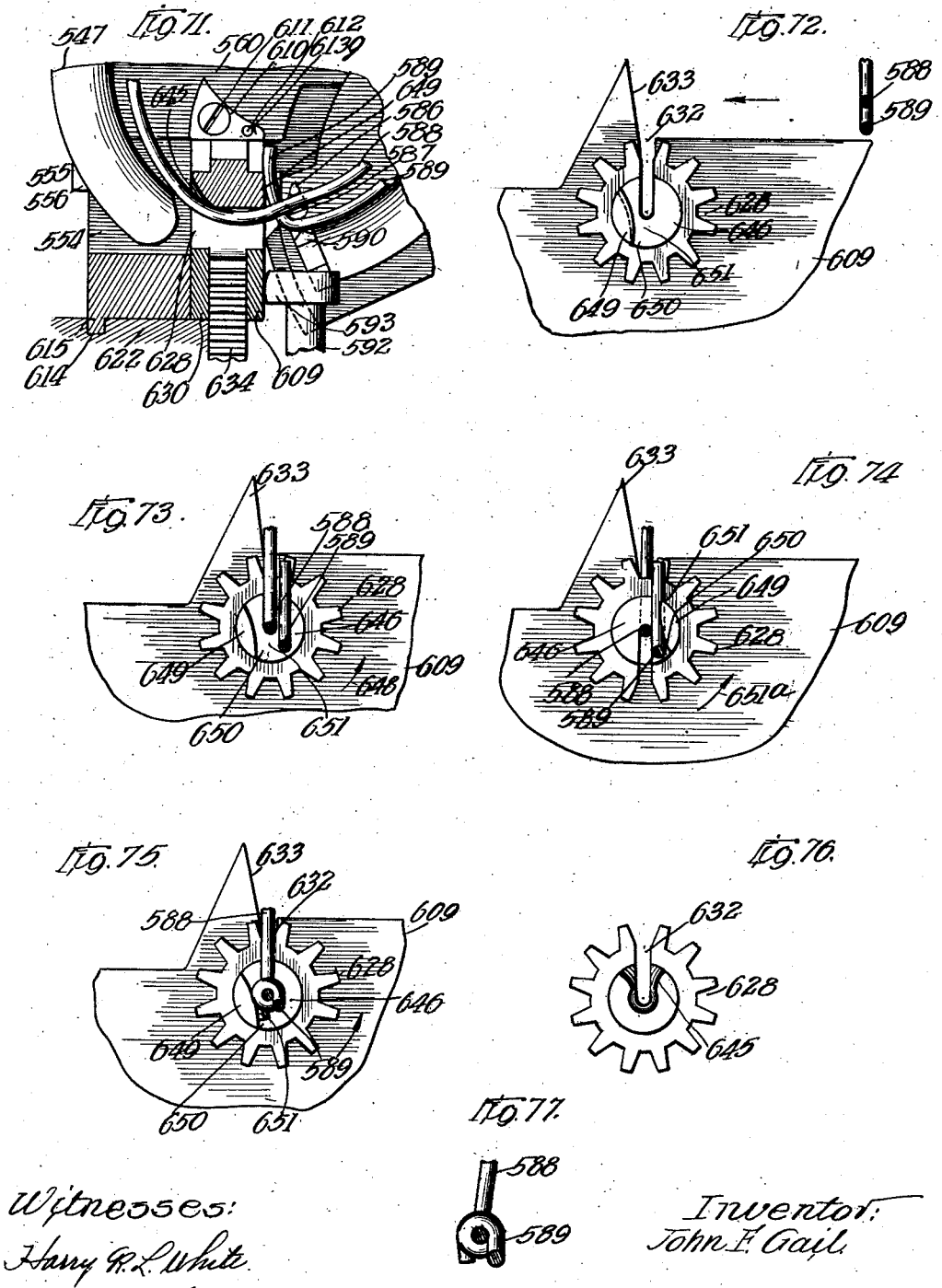

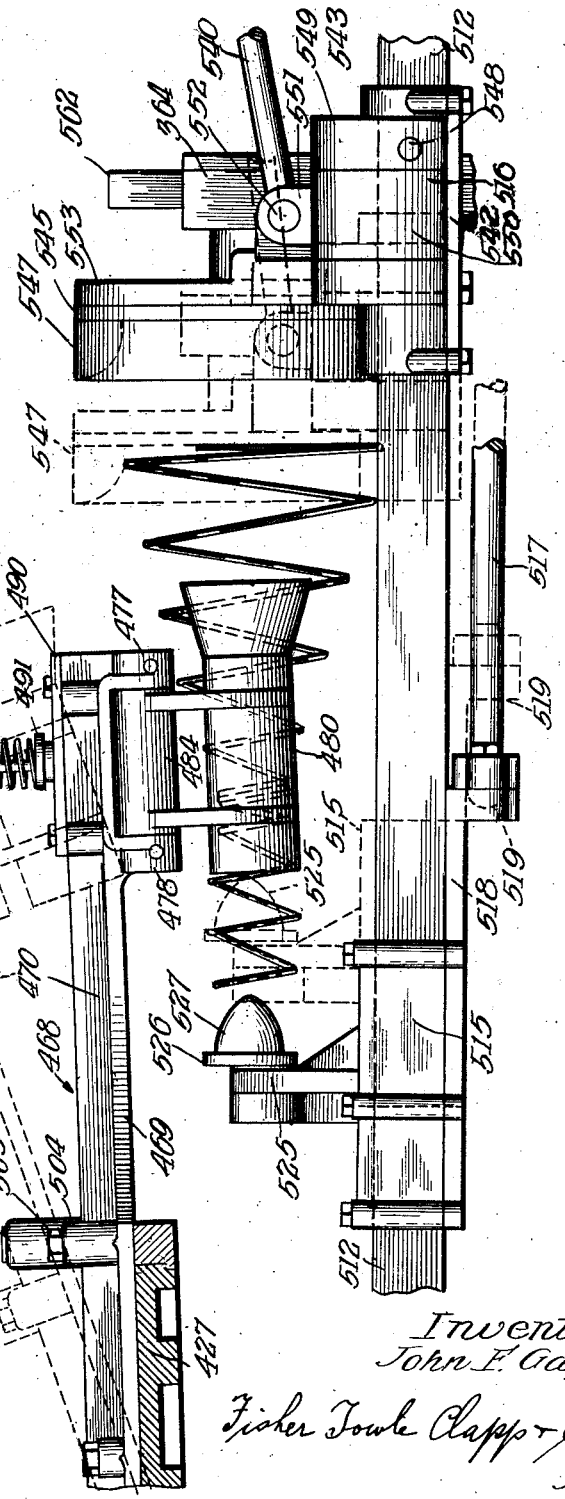

Aug. 21, 1928.　　　　　　　　　　　　　　　　1,681,728
J. F. GAIL
MACHINE FOR MAKING SPIRAL SPRINGS
Filed April 28, 1922　　41 Sheets-Sheet 32
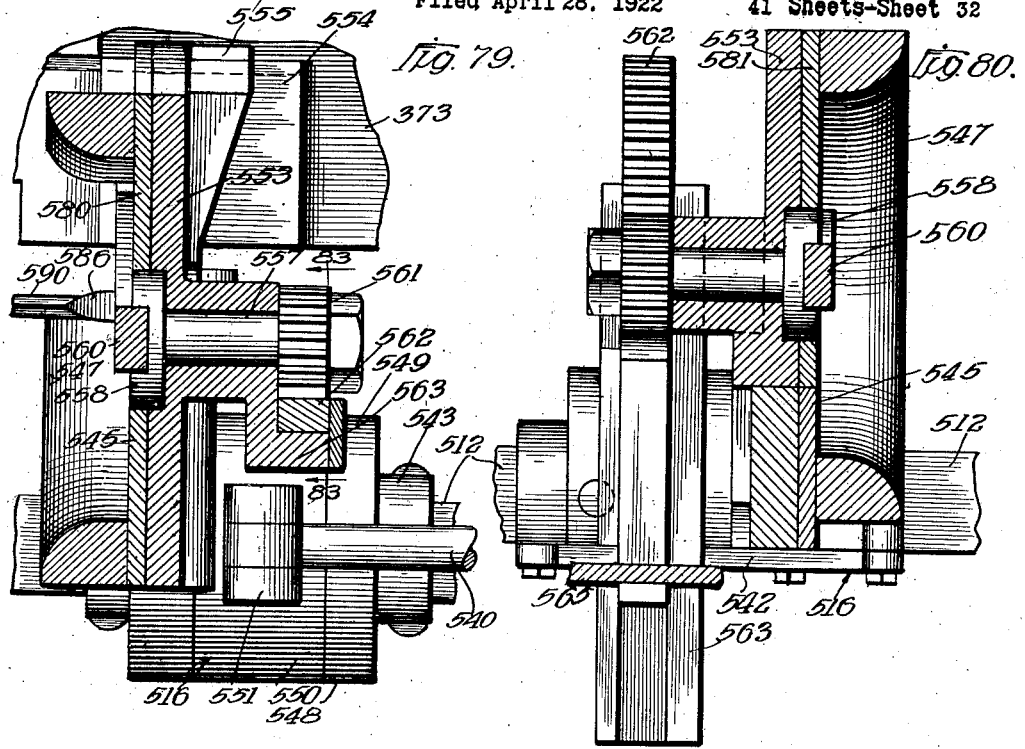
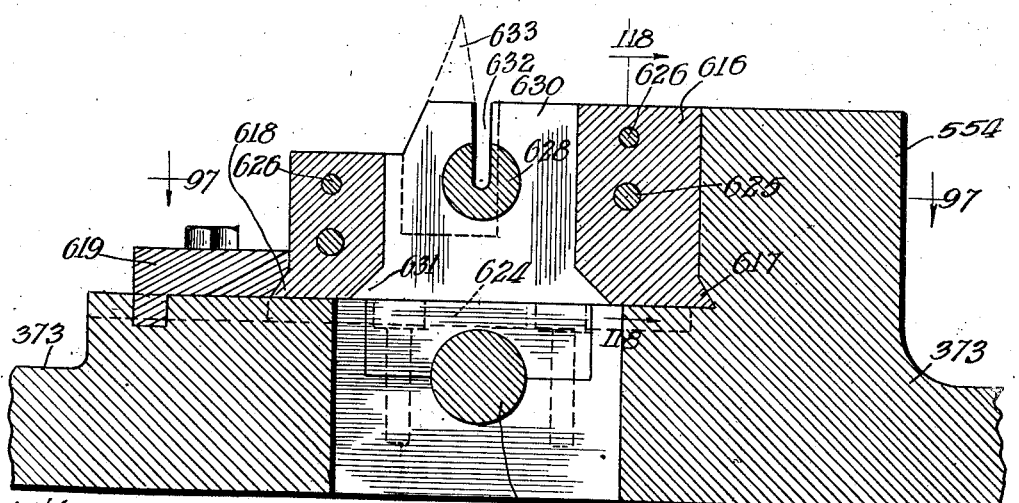
Witnesses:　　　　　　　　　　　Inventor
　　　　　　　　　　　　　　　　John F. Gail.

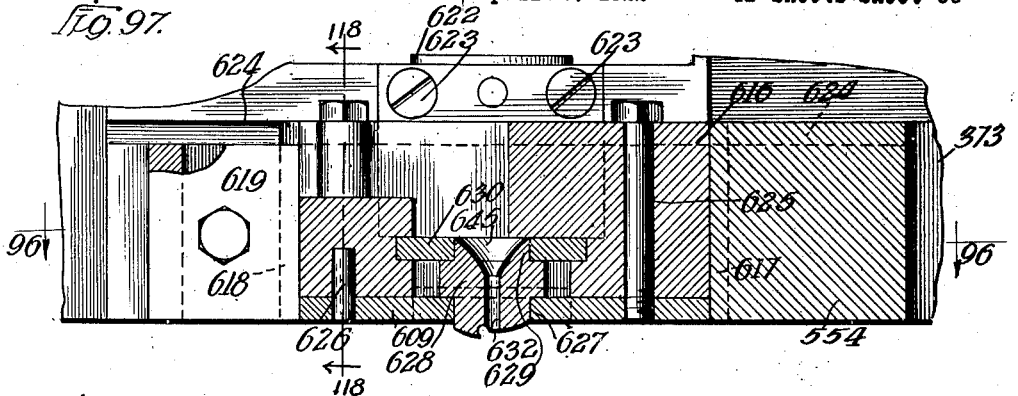
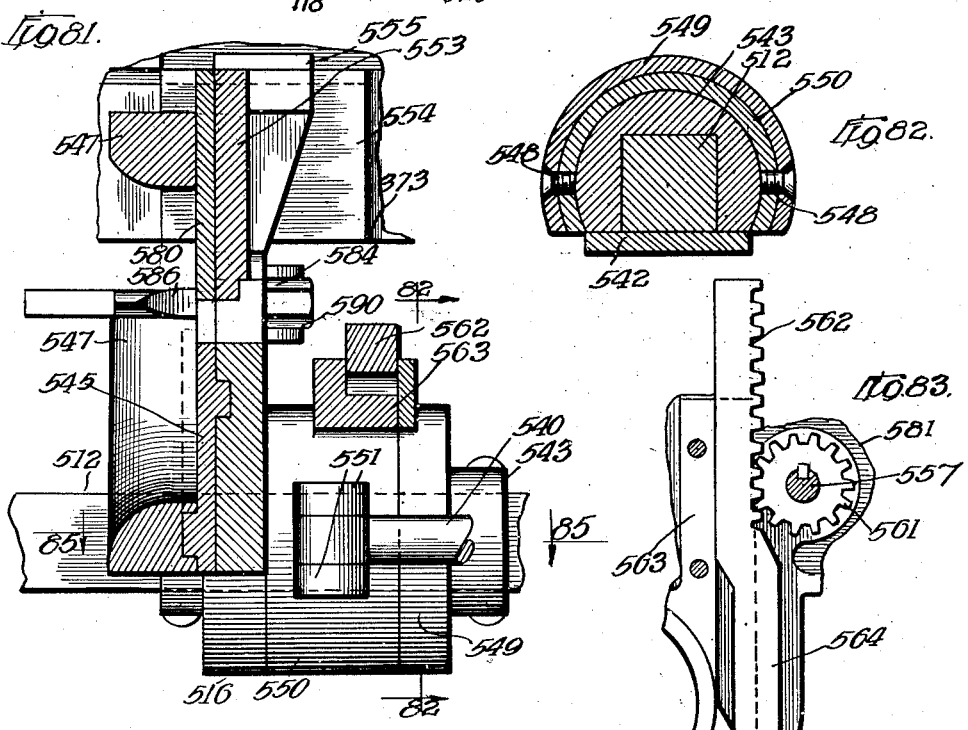

Aug. 21, 1928.
J. F. GAIL
1,681,728
MACHINE FOR MAKING SPIRAL SPRINGS
Filed April 28, 1922 41 Sheets-Sheet 34
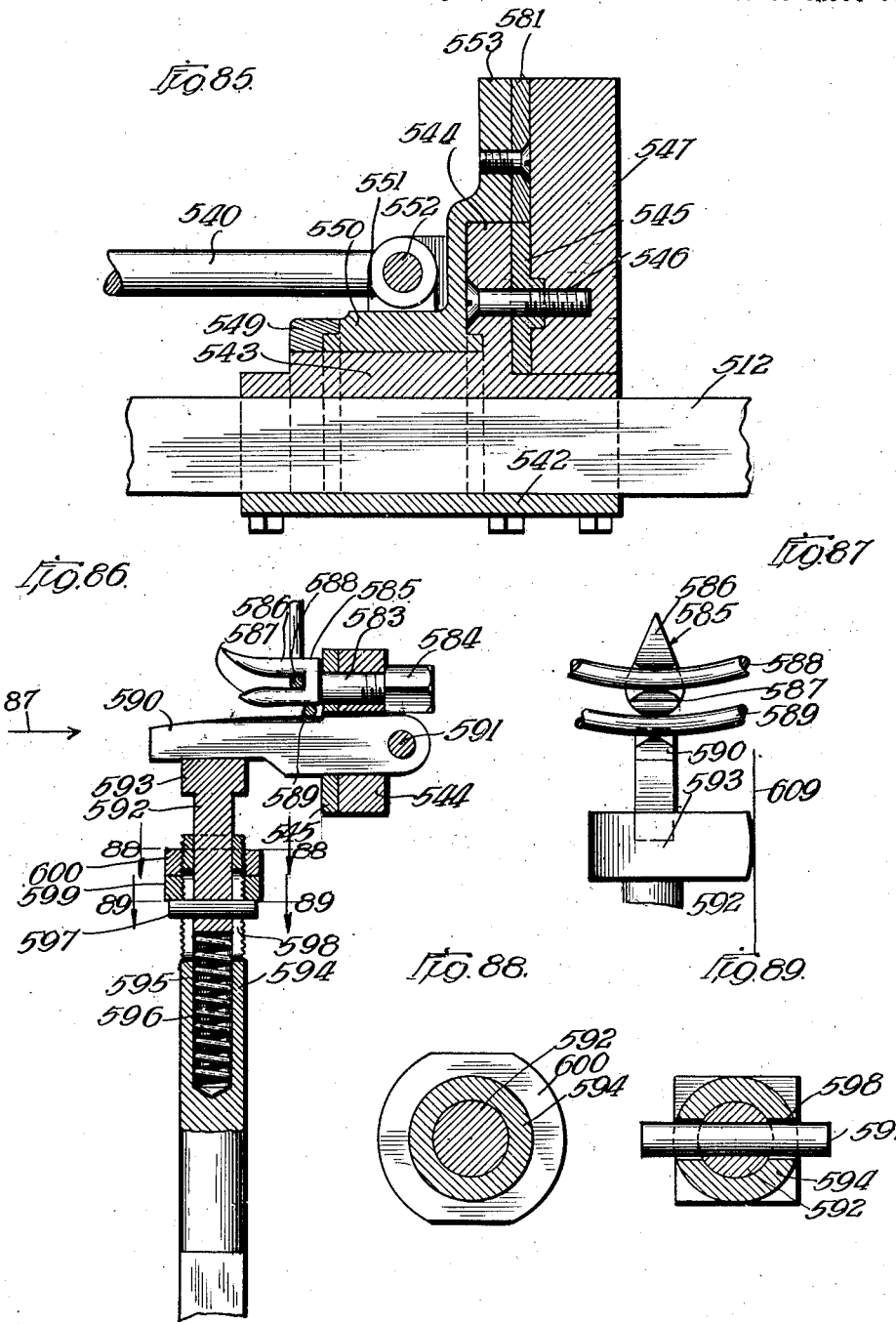

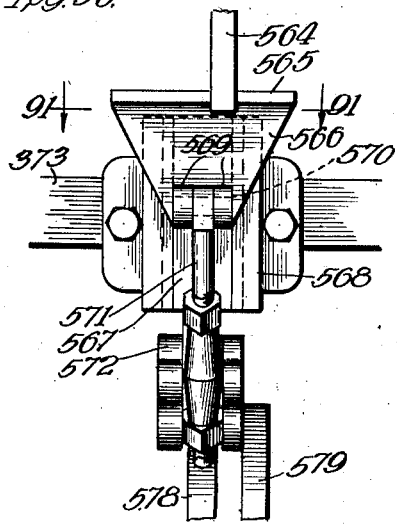

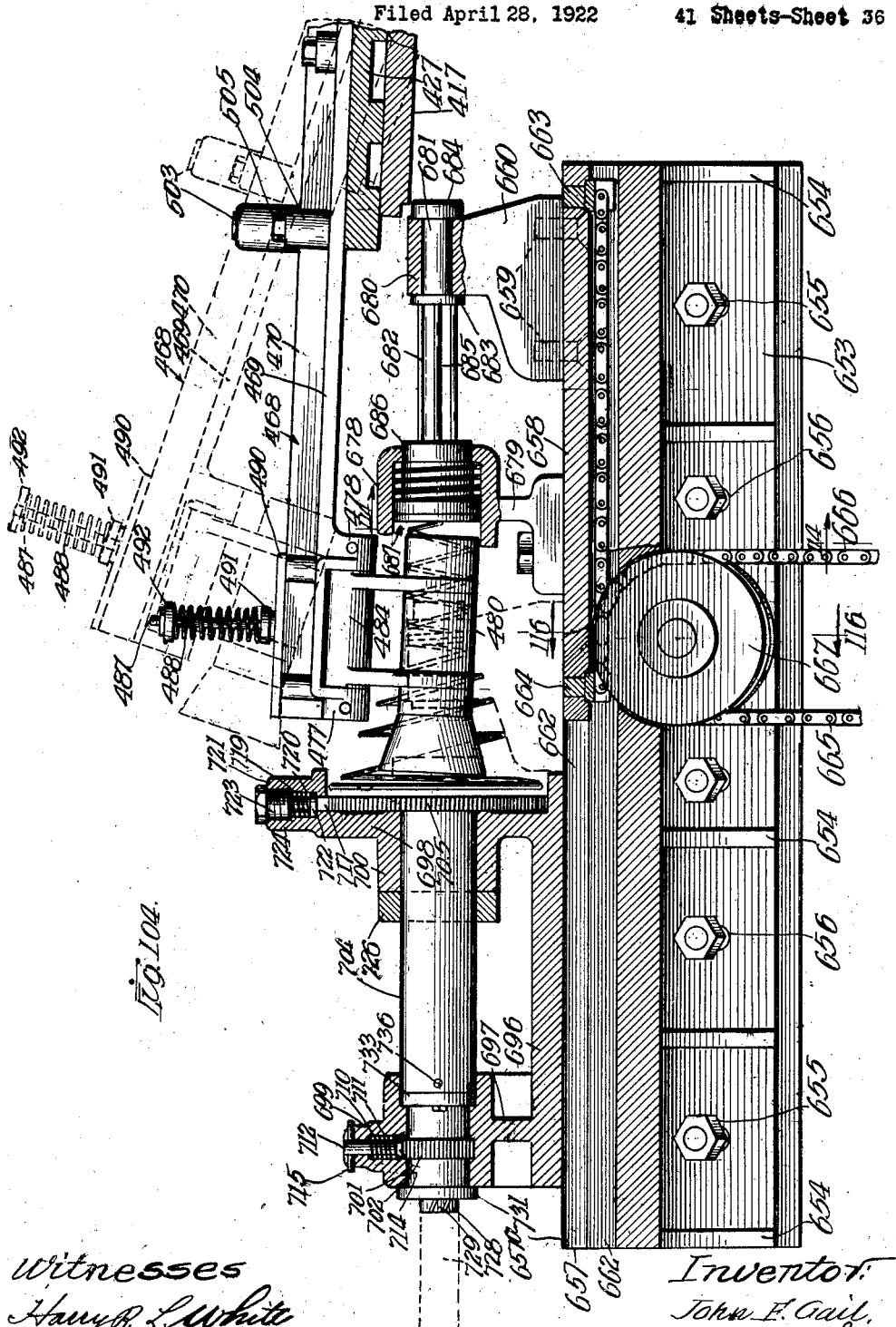

Aug. 21, 1928.
J. F. GAIL
1,681,728
MACHINE FOR MAKING SPIRAL SPRINGS
Filed April 28, 1922   41 Sheets-Sheet 37
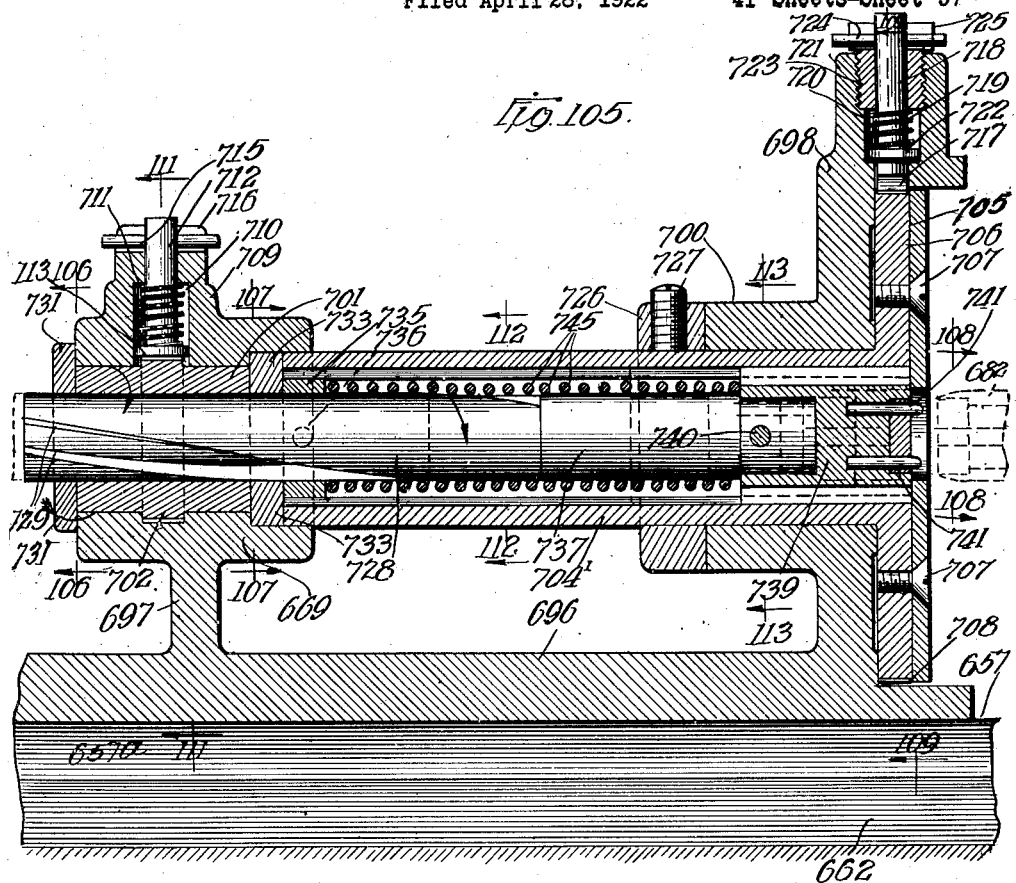

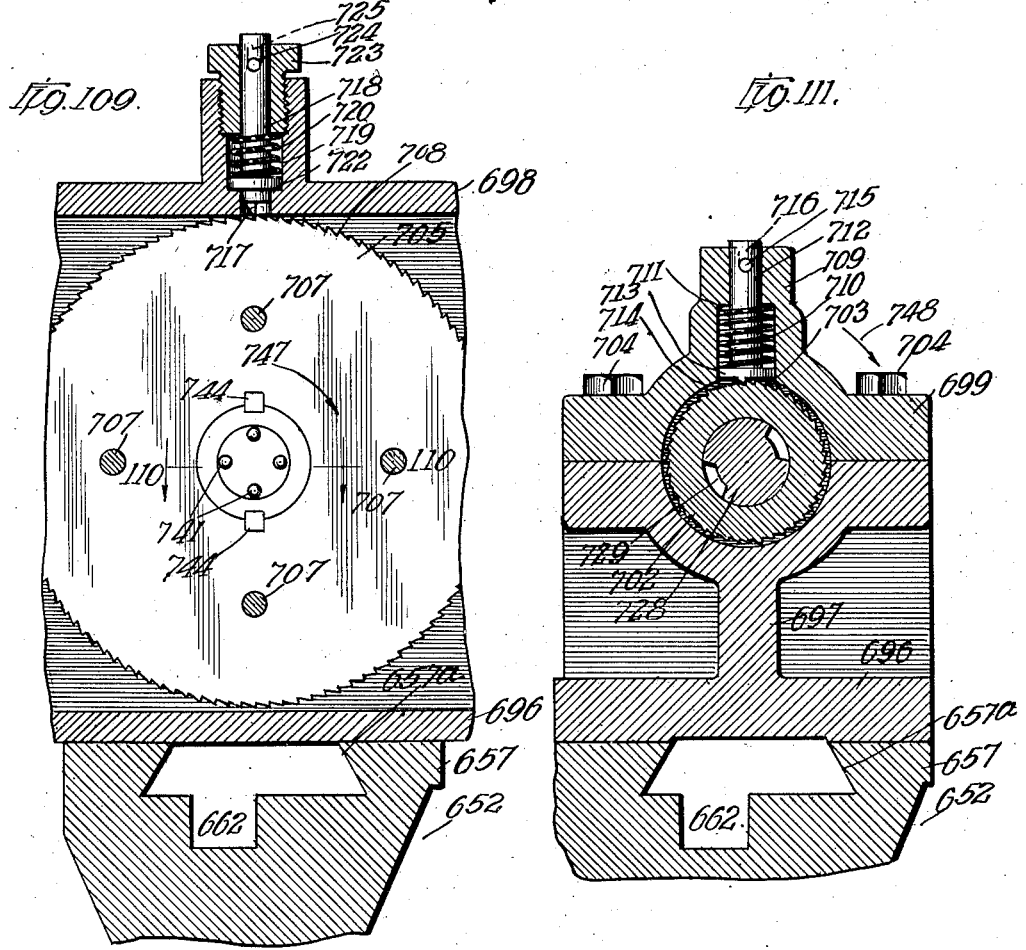

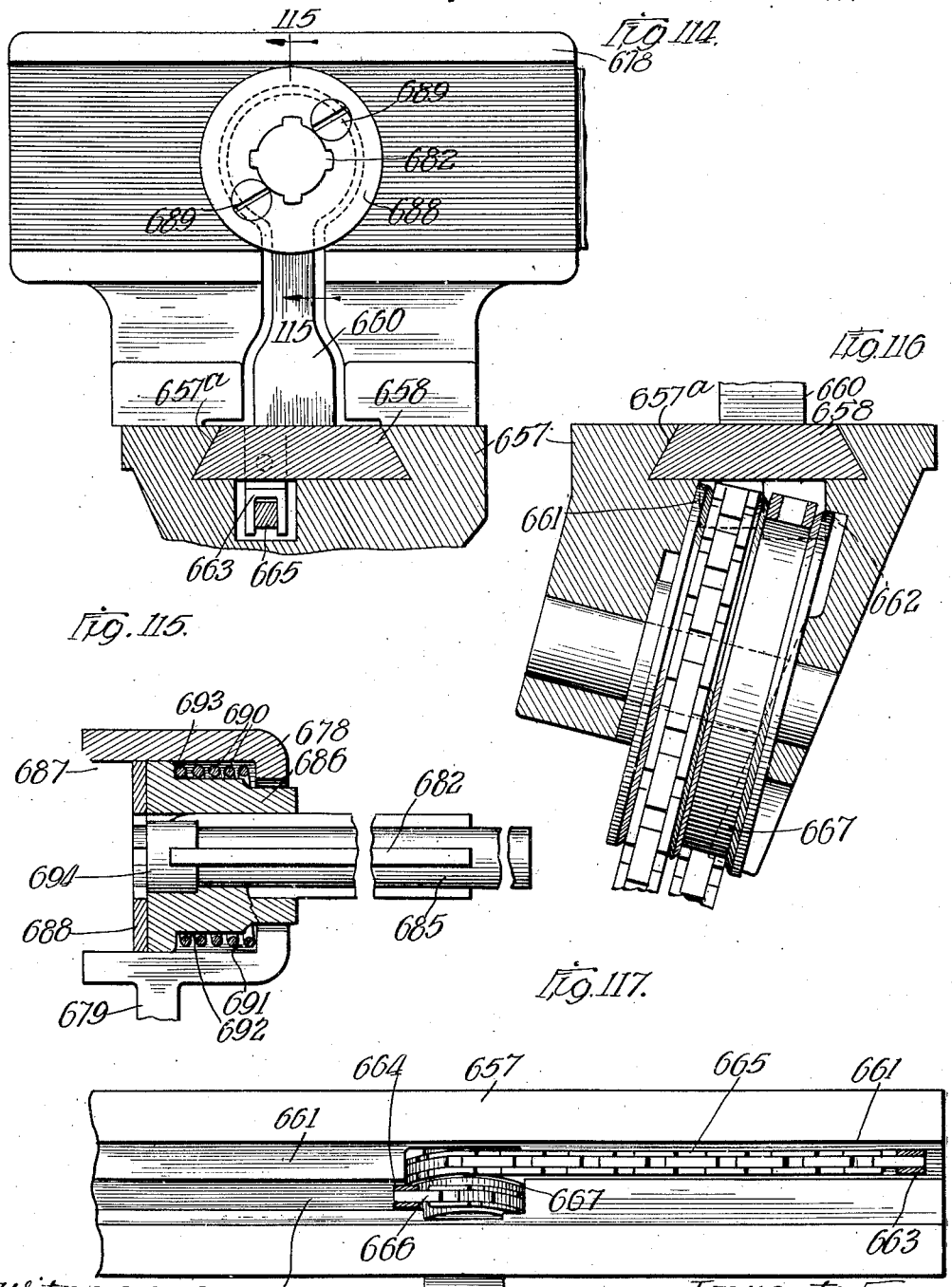

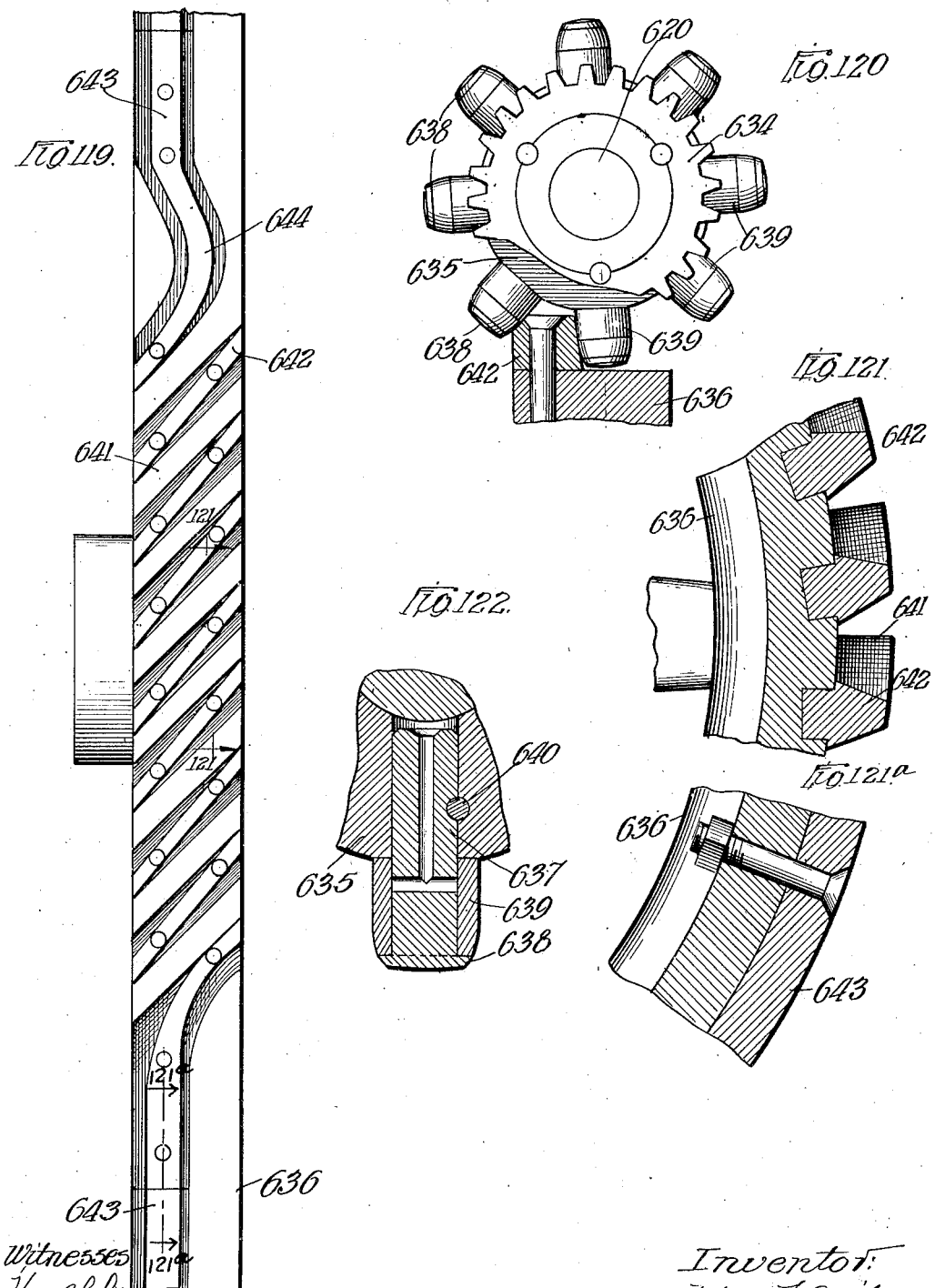

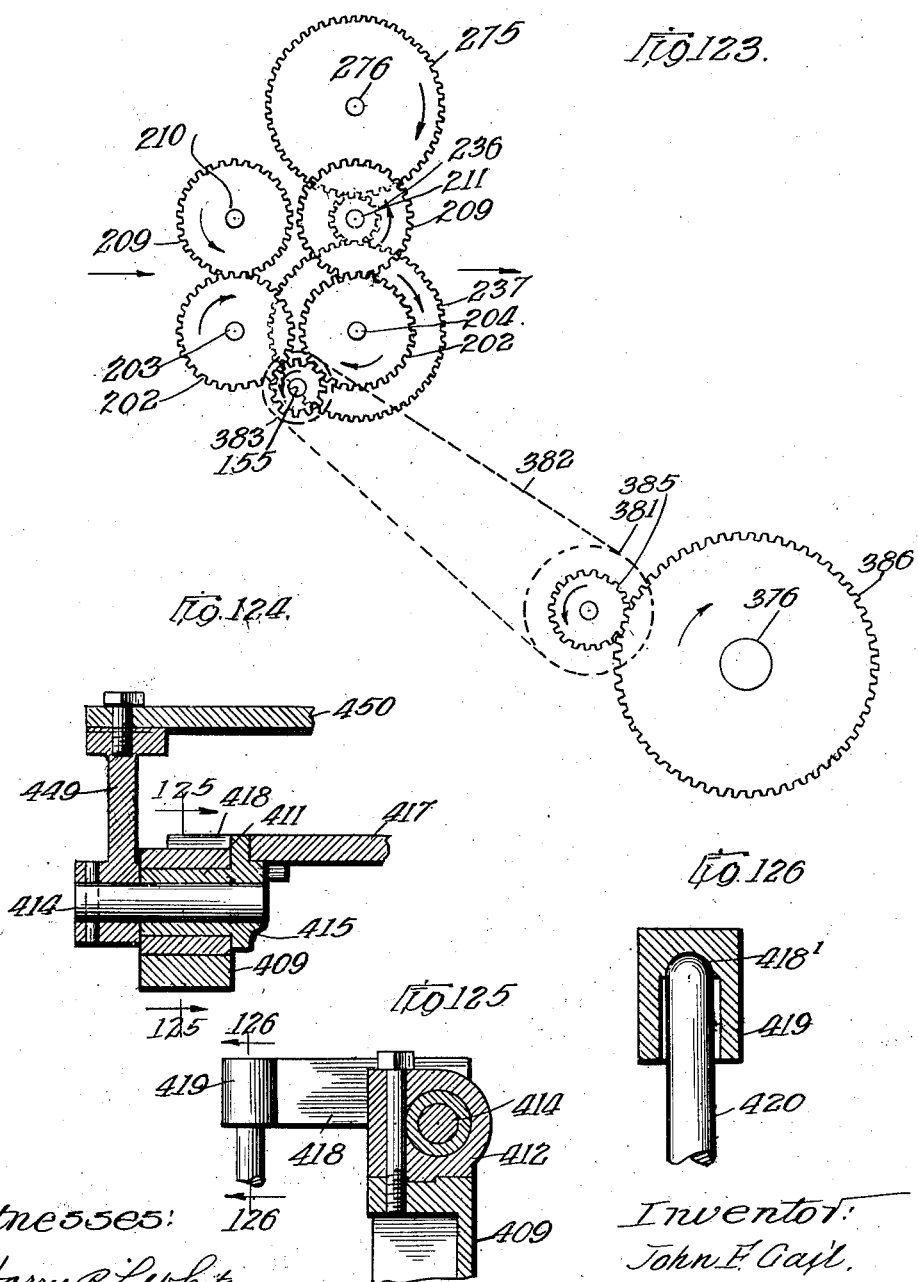

Patented Aug. 21, 1928.

1,681,728

UNITED STATES PATENT OFFICE.

JOHN F. GAIL, OF EVANSTON, ILLINOIS, ASSIGNOR TO SIMMONS COMPANY, OF KENOSHA, WISCONSIN, A CORPORATION OF DELAWARE.

MACHINE FOR MAKING SPIRAL SPRINGS.

Application filed April 28, 1922. Serial No. 557,121.

My invention relates to improvements in machines for making coiled wire springs, such as are used in articles of furniture for sitting or lying upon. The machine may, however, be used in the manufacture of wire springs for other purposes.

The machine as disclosed in this application resembles somewhat, and is in the nature of, an improvement upon the machine set forth and described in my previous United States Patent No. 810,048, issued Jan. 16, 1906.

The principal objects of the invention are to provide in a machine of the character referred to, a construction which shall be more accessible for adjustment and repair purposes; a construction in which the various groups of mechanism performing the different functions shall be, in a sense, independent, and thereby capable of adjustment and repair without adversely affecting the adjustment of other groups of mechanism performing different functions; to provide an improved wire feeding and propelling mechanism; to provide an improved coiling mechanism whereby the pitch of the coils may be varied independently of the diameter of the convolutions; to provide an improved transfer mechanism for conducting the coiled spring from the coiler to the knotter, and for delivering the spring; to provide an improved knotting mechanism; to provide an improved compressor mechanism for setting the springs before delivery of same, and in general to provide an improved machine of the character referred to.

In the drawings, accompanying this illustration, and illustrating my invention as applied to a machine for making what in the trade are termed single coned springs, sheets 1 to 14 inclusive refer more particularly to the arrangement and details of the coiling apparatus while the remaining sheets 15 to 41 inclusive relate more especially to the transfer, knotting and delivering mechanisms.

In said drawings,

Fig. 2 is a side elevation of the apparatus shown in Fig. 1;

Fig. 3 is a view similar to Fig. 2, showing the coiling instrumentalities only;

Fig. 4 is a front elevation of the apparatus shown in Fig. 3;

Fig. 5 is a rear elevation of the apparatus as shown in Fig. 3;

Fig. 6 is a section taken on the line 6—6 of Fig. 3;

Fig. 7 is a section taken on the line 7—7 of Fig. 6;

Fig. 8 is a section taken on the line 8—8 of Fig. 6;

Fig. 9 is a section taken on the line 9—9 of Fig. 6;

Fig. 10 is a section taken on the line 10—10 of Fig. 6;

Fig. 11 is a section taken on the line 11—11 of Fig. 6;

Fig. 12 is a section taken on the line 12—12 of Fig. 6;

Fig. 13 is an enlargement of the portion of Fig. 3;

Fig. 14 is a section taken on the line 14—14 of Fig. 4;

Fig. 15 is a section taken on the line 15—15 of Fig. 14;

Fig. 16 is a section taken on the line 16—16 of Fig. 4;

Fig. 17 is a section taken on the line 17—17 of Fig. 16;

Fig. 18 is a section taken on the line 18—18 of Fig. 1;

Fig. 19 is a section taken on the line 19—19 of Fig. 18;

Fig. 20 is a section taken on the line 20—20 of Fig. 18;

Fig. 21 is a rear elevation of the mechanism illustrated in section in Fig. 18;

Fig. 22 is a section taken on the line 22—22 of Fig. 21;

Fig. 23 (see Sheet 10) is a section taken on the line 23—23 of Fig. 13;

Fig. 24 is a section taken on the line 24—24 of Fig. 13;

Fig. 25 is a section taken on the line 25—25 of Fig. 24;

Fig. 26 is a section taken on the line 26—26 of Fig. 6;

Fig. 27 is a section taken on the line 27—27 of Fig. 23 (see Sheet 10);

Fig. 28 is an elevation of the rear guide for the cutting bar;

Fig. 29 is a section taken on the line 29—29 of Fig. 23 (see Sheet 10);

Fig. 30 is a section taken on the line 30—30 of Fig. 23;

Fig. 31 is a section taken on the line 31—31 of Fig. 23;

Fig. 32 is a section taken on the line 32—32 of Fig. 9;

Fig. 33 (see Sheet 3) is a section taken on the line 33—33 of Fig. 13;

Fig. 34 (see Sheet 3) is a section taken on the line 34—34 of Fig. 33;

Fig. 35 is a section taken on the line 35—35 of Fig. 33;

Fig. 36 (see Sheet 5) is a section taken on the line 36—36 of Fig. 5;

Fig. 37 is a section taken on the line 37—37 of Fig. 36;

Fig. 38 is a section taken on the line 38—38 of Fig. 13 (see Sheet 10);

Fig. 39 (see Sheet 14) is a section taken on the line 39—39 of Fig. 13;

Fig. 40 is a section taken on the line 40—40 of Fig. 39;

Fig. 41 is a section taken on the line 41—41 of Fig. 39;

Fig. 42 is a section taken on the line 42—42 of Fig. 7;

Fig. 43 is a section taken on the line 43—43 of Fig. 42;

Fig. 44 is a section taken on the line 44—44 of Fig. 43;

Fig. 45 is a front elevation of the machine shown in Fig. 1 with the coiling instrumentalities not shown.

Fig. 46 is a rear elevation of the mechanism shown in Fig. 45;

Fig. 48 is a section taken on the line 48—48 of Fig. 47;

Fig. 50 is a section taken on the line 50—50 of Fig. 45;

Fig. 51 is a section taken on the line 51—51 of Fig. 50;

Fig. 52 is a detail view looking in the direction of arrow 52 of Fig. 50;

Fig. 53 is a section taken on the line 53—53 of Fig. 45;

Fig. 54 is a section taken on the line 54—54 of Fig. 45;

Fig. 55 is a section taken on the line 55—55 of Fig. 45;

Fig. 56 is a section taken on the line 56—56 of Fig. 45;

Figure 1:
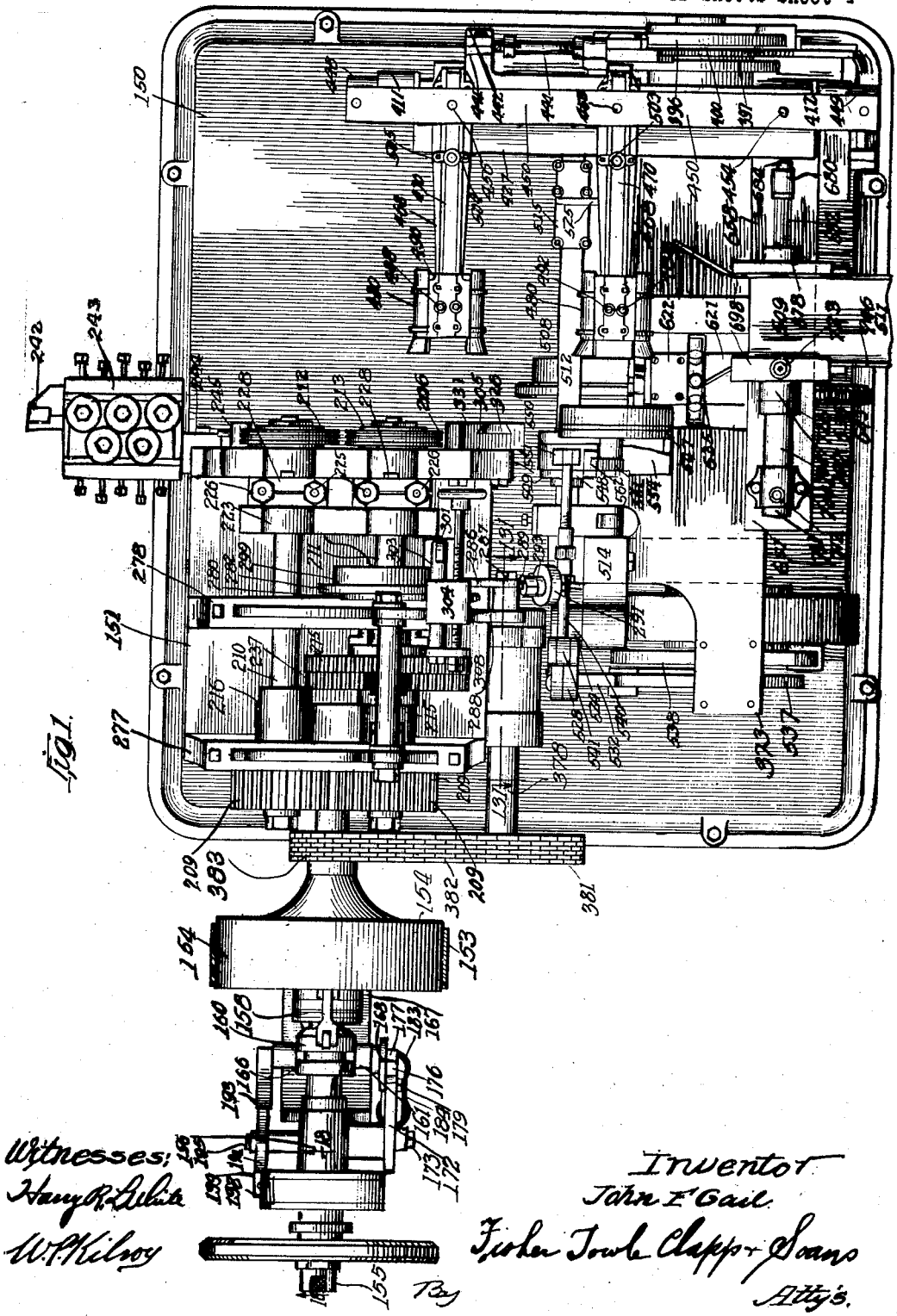
Fig. 1 is a plan view of the combined apparatus for coiling, transferring, knotting and delivering the spring.
Figure 47:
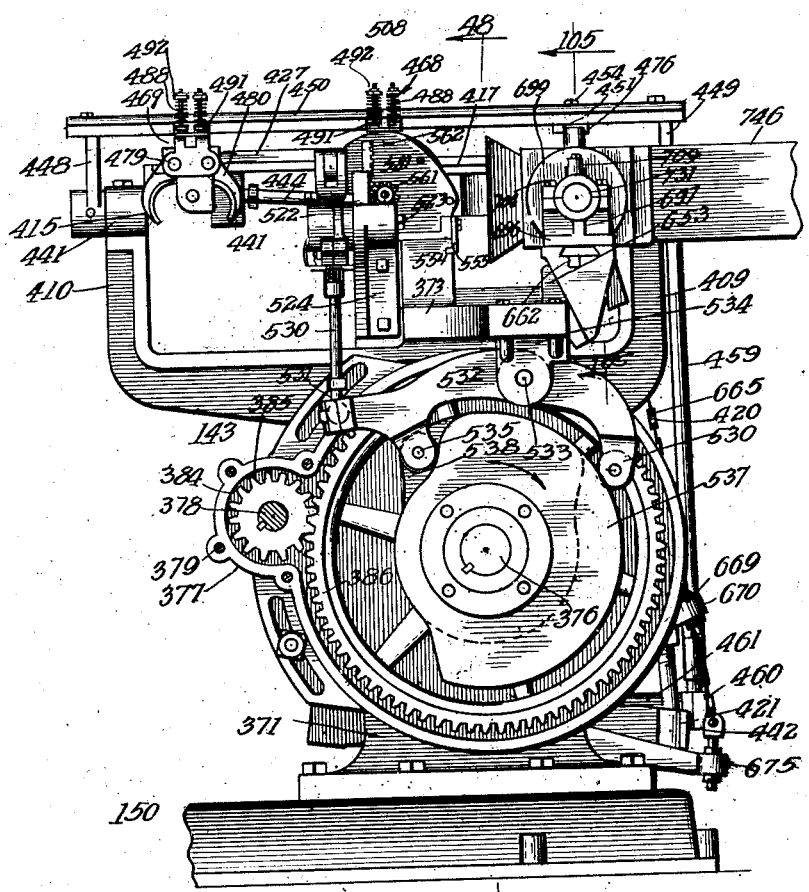
Fig. 47 is a left hand end elevation of the mechanism shown in Fig. 45.
Figure 131:
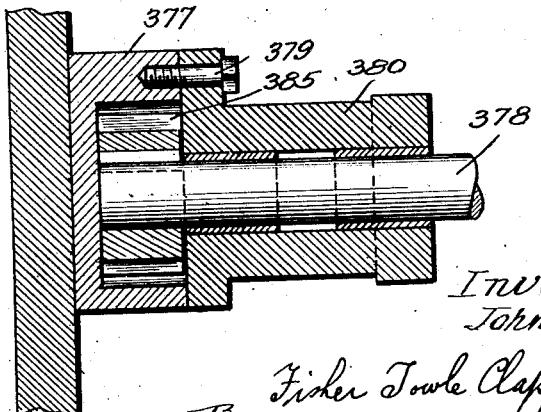
Figure 49:
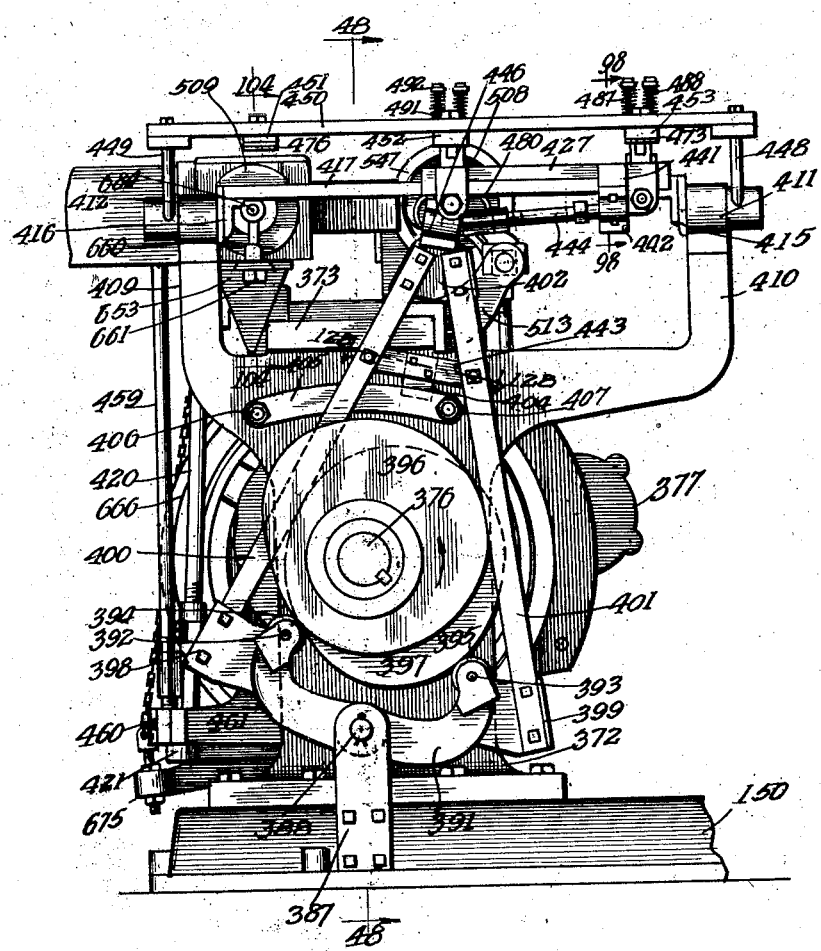
Fig. 49 is a right hand end elevation of the apparatus shown in Fig. 45.
Figure 127:
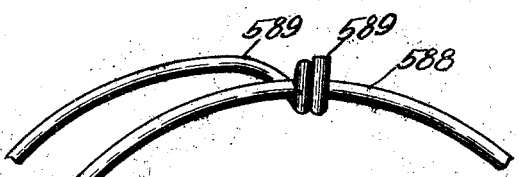

Fig. 56ª is a section taken on the line 56ª—56ª of Fig. 45;

Fig. 57 is a section taken on the line 57—57 of Fig. 45;

Fig. 58 is a plan view of the transfer arms;

Fig. 59 is a section taken on the line 59—59 of Fig. 58;

Fig. 60 is a section taken on the line 60—60 of Fig. 59;

Fig. 61 is a section taken on the line 61—61 of Fig. 59;

Fig. 62 is a section taken on the line 62—62 of Fig. 59;

Fig. 63 (see Sheet 26) is a section taken on the line 63—63 of Fig. 48 (see Sheet 18);

Fig. 64 is a section taken on the line 64—64 of Fig. 63;

Fig. 65 (see Sheet 27) is an elevation of a rocking bar which controls the transfer mechanism;

Fig. 66 is a section taken on the line 66—66 of Fig. 65;

Fig. 67 is a section taken on the line 67—67 of Fig. 65;

Fig. 68 is a section taken on the line 68—68 of Fig. 65;

Fig. 69 is an elevation of the coil end locating mechanism;

Fig. 70 is a view similar to Fig. 69, but showing the parts in a different position;

Fig. 71 is an enlargement of a portion of Fig. 70, showing the knotter gear in a different position of rotation;

Fig. 72 is an elevation of the knotter gear and associate parts shown in Fig. 71;

Figs. 73, 74, 75 and 76 are similar views of the knotter gear, but showing the parts in different positions;

Fig. 77 is a section taken through the spring adjacent the knot;

Fig. 78 is an elevation showing portions of the transfer and setting mechanisms;

Fig. 79 is a section taken on the line 79—79 of Fig. 69 (see Sheet 29);

Fig. 80 is a section taken on the line 80—80 of Fig. 69;

Fig. 81 (see Sheet 33) is a section taken on the line 81—81 of Fig. 69;

Fig. 82 is a section taken on the line 82—82 of Fig. 81;

Fig. 83 is a section taken on the line 83—83 of Fig. 79;

Fig. 84 is a section taken on the line 84—84 of Fig. 83;

Fig. 85 is a section taken on the line 85—85 of Fig. 81;

Fig. 86 is a section taken on the line 86—86 of Fig. 46 (see Sheet 16);

Fig. 87 is an elevation of certain of the parts shown in Fig. 86, looking in the direction of arrow 87;

Fig. 88 is a section taken on the line 88—88 of Fig. 86;

Fig. 89 is a section taken on the line 89—89 of Fig. 86;

Fig. 90 is an elevation of a portion of the actuating mechanism for the coil end locating finger, looking in the direction of arrow 90 on Fig. 53;

Fig. 91 is a section taken on the line 91—91 of Fig. 90;

Fig. 92 is a cross section through the movable spring centering cone;

Fig. 93 is a section through certain of the compression slide mechanism;

Fig. 94 is a section taken on the line 94—94 of Fig. 93;

Fig. 95 is a section taken on the line 95—95 of Fig. 93;

Fig. 96 (see Sheet 32) is a section taken on the line 96—96 of Fig. 54 (see Sheet 22);

Fig. 97 (see Sheet 33) is a section taken on the line 97—97 of Fig. 96;

Fig. 98 (see Sheet 16) is a section taken on the line 98—98 of Fig. 49;

Fig. 99 is a section taken on the line 99—99 of Fig. 48 (see Sheet 18);

Fig. 100 is a section taken on the line 100—100 of Fig. 99;

Fig. 101 (see Sheet 21) is a section taken on the line 101—101 of Fig. 70 (see Sheet 29);

Fig. 102 (see Sheet 21) is a section taken on the line 102—102 of Fig. 70;

Fig. 103 (see Sheet 21) is a section taken on the line 103—103 of Fig. 70;

Fig. 104 is a section taken on the line 104—104 of Fig. 49;

Fig. 105 is a section taken on the line 105—105 of Fig. 47 (see Sheet 17);

Fig. 106 is a section taken on the line 106—106 of Fig. 105;

Fig. 107 is a section taken on the line 107—107 of Fig. 105;

Fig. 108 is a section taken on the line 108—108 of Fig. 105;

Fig. 109 is a section taken on the line 109—109 of Fig. 105;

Fig. 110 is a section taken on the line 110—110 of Fig. 109;

Fig. 111 is a section taken on the line 111—111 of Fig. 105;

Fig. 112 is a section taken on the line 112—112 of Fig. 105;

Fig. 113 is a section taken on the line 113—113 of Fig. 105;

Fig. 114 is a section taken on the line 114—114 of Fig. 104;

Fig. 115 is a section taken on the line 115—115 of Fig. 114;

Fig. 116 is a section taken on the line 116—116 of Fig. 104;

Fig. 117 is a plan view of certain chain parts shown in Fig. 104;

Fig. 118 (see Sheet 23) is a section taken on the line 118—118 of Fig. 97;

Fig. 119 is a development of the knotting worm;

Fig. 120 is an elevation of the knotting gear or pinion;

Fig. 121 is a section taken on the line 121—121 of Fig. 119;

Fig. 121ᵃ is a section taken on the line 121ᵃ—121ᵃ of Fig. 119;

Fig. 122 is an axial section through one of the teeth of the gear shown in Fig. 120;

Fig. 123 is a diagram of certain driving mechanism shown in elevation;

Fig. 124 is a section taken on the line 124—124 of Fig. 46;

Fig. 125 is a section taken on the line 125—125 of Fig. 124;

Fig. 126 is a section taken on the line 126—126 of Fig. 125;

Fig. 127 (see Sheet 19) is a detail view showing the knot portion of the completed spring;

Fig. 128 (see Sheet 24) is a section taken on the line 128—128 of Fig. 49;

Fig. 129 (see Sheet 24) is a section taken on the line 129—129 of Fig. 128;

Fig. 130 (see Sheet 24) is a section taken on the line 130—130 of Fig. 128;

Fig. 131 (see Sheet 17) is a section taken on the line 131—131 of Fig. 1.

Referring to the drawings, the operating parts of the combined machine are all mounted on a single unitary bed or base plate 150 to which are bolted the frame 151, which carries the coiling instrumentalities, and also the frame on which the knotting, setting, transfer and delivery mechanisms are mounted.

The machine as a whole is driven by a belt 153 trained around a pulley 154 on the main shaft 155 of the machine, one end of said shaft 155 being journaled in a bearing 156 on the end of bracket 157 bolted to the frame 151. The other end of said shaft 155 is suitably journaled in a bearing supported by or formed as a part of frame 151.

The pulley 154 is rotated continuously by the constantly running belt 153 and is capable of being clutched to or freed from the shaft 155 by the following mechanism. The interior mechanism of the clutch, not shown, is of any approved type, and is actuated by a pair of diametrically opposed bell crank members indicated at 158, and 159 (see Fig. 4). Said clutch levers 158 and 159 are operated by a cone faced collar 160 slidable on shaft 155. The numeral 161 (see Fig. 14) indicates the clutch lever pivotally supported on a stationary horizontal pivot 162. The upper arm of said lever 161 is forked to straddle the shaft 155 and carries a pair of aligned diametrically opposed pins 163 and 164, the inner adjacent ends of which are made with flattened or laterally elongated heads 165 which fit in opposite sides of a groove 166 extending circumferentially around the shift collar 160.

The outer end of pin 164 is equipped with a collar 167 which constitutes a pivot for an upstanding hand lever 168. Said hand lever 168 is capable of a small amount of movement on its pivot 167, said movement being limited by a bolt 169 movable in an arcuate slot 170 (see Fig. 15) formed in the upper extension 171 of one of the forks of the lever 161.

The clutch collar 160 is maintained in its right hand or driving position by means of a latch 172, said latch being in the form of a lever pivoted on a stationary pin 173 fixed in the side of bearing 156. The right hand or operative end of said lever 172 is forced upwardly by means of a coiled tension spring 174 pulling between the outer end of lever 172 and an eye bolt 175 fixed in the side of bracket 157.

On the right hand end of said lever 172 there is inserted a small hardened plate 176, the right hand edge of which projects a short distance to form a latching shoulder on the end of said lever. Said latching shoulder or plate 176 is arranged to engage behind the extreme outer end 177 of pin 164, said end 177 being milled off to produce a semi-circular cross section resting upon the tip of lever 172.

In order to facilitate the disengagement of the latch when it is desired manually to stop the machine, the lower end of lever 168 is equipped with a laterally extending lug 178 in which lug there is fixed a pin 179 projecting over the lever 172 and adapted to depress the lever when the hand lever 168 is moved to the left (see Fig. 4). It will be observed that the latching mechanism heretofore referred to locks the lever 161 in driving position against the tension of spring 180 pulling between a stationary hook bolt 181 and the lower end 182 of said lever 161, said spring 180 being effective to pull out the clutch and stop the machine when permitted to do so by depression of latch 172.

In addition to the hand lever 168, I prefer to equip the machine with electrically controlled stop mechanism suitably connected with the wire supply or other parts of the machine so that an electric contact or circuit is established when the wire supply becomes exhausted or when an obstruction such as a kink prevents the wire from feeding in the usual manner. Such electric circuit serves to energize a magnet 183 illustrated best in Figs. 4 and 14, the armature 184 of which magnet is connected by means of a link 185 to a pin 186 on latch 172. Obviously, when said armature is depressed by the energization of electro-magnet 183, latch 172 will be pulled down and the clutch thus disengaged.

In order to prevent undue consumption of current by the electro-magnetic device 183, and also to prevent it from being burned out by reason of the prolonged stoppage of the machine, I prefer to open the circuit of said electro-magnet 183 immediately upon its having performed its work in unlatching the clutch lever. To this end, I connect the lower end 182 of said clutch lever 161 by means of a link 187 to the end of a switch lever 188 (see Figs. 4, 16 and 17). The lower end of said pivoted switch lever 188 is equipped with an insulated knife contact 189 which, when the clutch is engaged, establishes a circuit between the spaced switch plates 190 and 191. The gap between said switch plates 190 and 191, which are insulated from each other, serves to prevent passage of current through magnet 183, after the clutch lever has been disengaged.

In order to insure prompt stoppage of the machine immediately upon disengagement of the clutch lever 161, I prefer to equip the machine with an automatic brake mechanism which is thrown into effect immediately upon the unlatching of the clutch lever. To this end I equip the pin 163 with a roller 192 upon which roller rests the inclined outer end 193 (see Fig. 21) of a brake lever 194. Said brake lever 194 is pivoted on a fixed pin 195 carried by the bracket 157, and is in the form of a bell crank. The lower arm 196 of said bell crank lever 194 (see Sheet 12) is apertured to receive an adjustable eye-bolt 197 pivotally connected to one end of a brake strap 198. Said brake strap 198, which is trained around a brake drum 199 keyed to shaft 155, has its other end connected to a stationary pin or stud 200.

The operation of said automatic brake mechanism will be apparent from the above description. Referring to Fig. 21, when the clutch collar is disengaged by movement of lever 161 in a clockwise direction, the roller 192 will move lever 194 in a similar direction, thus tightening the band 198 on brake drum 199.

*Wire propelling mechanism.*

There is keyed to the inner end of the shaft 155 a pinion 201 which meshes with and drives a pair of spaced non-meshing gears 202 respectively keyed to the rear ends of a pair of parallel horizontal shafts 203 and 204 journaled in spaced bearings formed in extensions 205 and 206 of the frame 151. On the front ends of said shafts 203 and 204 there are respectively keyed two feed rolls 207 and 208. The gears 202 mesh respectively with similar gears 209 keyed to the rear ends of a pair of substantially horizontal shafts 210 and 211. On the front ends of said shafts 210 and 211 there are keyed feed rolls 212 and 213 adapted respectively to cooperate with feed rolls 207 and 208.

The shafts 210 and 211, although substantially horizontal are capable of a slight amount of pivotal movement about a horizontal axis passing through the point 214 (see Fig. 6). To this end the rear ends of said shafts 210 and 211 are journaled in separate tilting bearings 215 and 216, the boxes of said bearings being provided with conical recesses, as at 217 (see Fig. 1), to accommodate a set of centers coaxial with a horizontal line passing through point 214. The intermediate centers 218 and 219 are stationarily mounted in the frame extension 205 while the outer pair of centers 220 and 221 are screwed into suitably threaded holes in said frame bar 205, so that they can be adjusted in or out, as the case may be, in order to permit free tilting movement of the upper pair of roll shafts 210 and 211.

The front ends of the upper pair of roll shafts 210 and 211 are journaled in separate bearing boxes 222 and 223 (see Fig. 10) said bearing boxes being provided with laterally extending lugs as at 224 to accommodate vertically extending bolts 225. The upper ends of said bolts 225 are equipped with suitable adjusting nuts 226, lock nuts 227 and locking clamps 228, while the lower ends of said bolts 225 extend through apertures drilled in the front end of an L-shaped rock arm 229 (see Fig. 11) and are headed on the under side of said rock arm as indicated at 230 (see Fig. 10). When permitted to do so by the position of rock arm 229, the upper shafts 210 and 211 are forced away from the lower pair of roll shafts 203 and 204 by means of a pair of coiled compression springs as at 231, said springs being positioned by pins 232 and 233 respectively fixed in the bearing boxes 224 and frame extension 206.

The rocker arm 229 is pivotally supported in the frame bar 206 on a horizontal transversely extending rod or shaft 234, and is formed with a rearwardly extending lever arm 235 by which the rocking member is actuated. Describing the driving mechanism for the tilting device, and referring to Figs. 6 and 9, it will be observed that on the roll shaft 211 there is keyed a pinion 236 which meshes with and drives a large spur gear 237 keyed to a sleeve 238 running freely on the lower roll shaft 204. To said sleeve 238 there is also keyed a radial cam 239 with which cam there cooperates a cam roll 240 journaled on the end of a pin 241 fixed in the rear end of tilter arm 235.

The wire from which the springs are made is contained on a suitable reel, not shown, and is drawn through a pair of suitable straightening devices 242 and 243 mounted on a small shelf-like bracket 244, bolted to frame member 206. The final straightener 243 is aligned with a wire guide 245, a detail of said guide being shown in Fig. 35. From the wire guide 245 the wire is delivered to the first pair of feed rolls 207 and 212, said rolls being suitably grooved out as indicated at 246 in Figs. 6 and 11 in order to grip the wire without flattening same and to propel same in the direction of the second set of feed rolls 209 and 213.

Intermediate the first and second set of feed rolls there is located a second wire guide indicated as a whole at 247, a detail of which is shown in Figs. 33 and 34. In view of the fact that the first set of rolls forces the wire through said guide 247 and into the second set of rolls 208 and 213, it is desirable to maintain substantial alignment of the guide 247 extending between the tangential points of the two sets of rolls. To this end the actual guide tube 248 is drilled out very slightly larger than the wire to be accommodated thereby, and is clamped in a mounting 249 by means of a set screw 250. The head 249, which is diametrically drilled to receive the guide tube 248, takes the form of the head of a bolt 251 extending through the frame member 206 and clamped therein by a suitable nut 252. In order to permit raising and lowering of the guide 248 in order to bring same into the proper condition of alignment with reference to the first and second sets of feed rolls, the bolt 251 is carried in an eccentric bushing 253, the rotation of which bushing is effective to raise or lower the center of guide 248 when desired.

Pressure between the upper rolls and the lower rolls, in order to render the sets of rolls effective to propel the wire, is positively applied by cam 239 cooperating with cam roll 240, as previously described. When the cam roll 240 rests upon a low spot of said cam 239, i. e., in the position shown in Fig. 6, the upper sets of rolls are elevated slightly by springs 231 and consequently no pressure is applied between the upper rolls and the lower rolls and the propelling of the wire is arrested. This occurs when it is desired to sever the wire to cut off a completely coiled spring.

So far as I am aware, in machines of this character, it has not hitherto been the practice to employ tandem sets of wire propelling rolls. It will be understood that the use of the first set of rolls serves not only to pull the wire off the reel and through the straightening devices, but also propels same forcibly into the second set of propelling rolls, thereby relieving the latter of the necessity of doing all of the work.

*The diameter controlling mechanism.*

The diameter of the convolutions of the spring is governed by a bending finger capable of being swung in a vertical plane according to a predetermined program. Such bending finger is shown best in Fig. 13 and Figs. 42 to 44 inclusive. It will be observed that immediately to the left of the second set of feed rolls there is located a guide 254. Said final guide 254, as shown best in Fig. 24, and which comprises a hardened steel tube similar to tube 248, is contained in an aperture bored diametrically in the block 255, being secured therein by a set screw 256. On the rear of said block 255 is a cylindrical stem 257 extending through the frame bar 206. On the rear end of said stem 257, and spaced from the adjacent face of frame bar 206 there is secured by means of a pin 258, an arm 259 extending downwardly as shown.

As shown in Fig. 25, the angular position of the arm 259 may be adjusted by a stop pin 260 threaded in the arm 259 and impinging against the stationary abutment 261, the arm 259 being held in adjusted position by means of the bolt 262 threaded into said abutment as indicated at 263. Said swinging adjustment of guide 254 is of especial value in accurately presenting the wire to the diameter control finger. The longitudinal position of the guide carrying stem 257 is adjusted by means of a pair of pointed set screws 264 and 265 engaging in a pair of V-shaped grooves, 266 and 267 formed in the circumference of stem 257. The screws 264 and 265 are, as to their axial positions, spaced apart differently from the spacing of the centers of the grooves 266 and 267 so that the points of the screws in connection with the V-shaped grooves will operate as cams to shift the stem 257 slightly in or out, as the case may be.

The bending finger 268 takes the form of an arm 269 rigidly united to the front end of a horizontal shaft 269ª extending through and journaled in frame members 206 and 205. Said bending finger is drilled longitudinally to receive a hardened steel rod 270, the lower end of which is grooved out slightly and beveled off as shown at 271 to receive and smoothly engage the wire as delivered by guide 254. Said rod 270 is capable of adjustment longitudinally in the bender arm 268, being locked in adjusted position by means of a suitable set screw 272. Longitudinal movement of the shaft 269ª is prevented by means of a collar 273 fixed on the rear end of shaft 269ª by a set screw 274. The shaft 269ª is rocked by the following mechanism.

Referring to Figs. 6 and 9, it will be observed that the pinion 236, in addition to meshing with the gear 237, controlling the feed rolls, also meshes with an upper spur gear 275, keyed to a horizontal shaft 276, rotatably supported in an arm 277 extending upwardly from frame 205 in a bracket 278 bolted to the upper ends of standards 278ª and 278ᵇ (see Fig. 7). On the front end of said shaft 276 there is keyed a hub 279 having a circumferential radially extending flange 280 to which, by means of pin or pins 281, there are secured a pair of cams 282 and 283. As shown best in Fig. 7, the cam 282 is of the radial type and cooperates with a cam roll 284, journaled on a pin 285 carried in an arm 286 mounted to swing about its upper end 287 on a pivot carried by a lug 288 projecting from the side of frame extension 278.

Still referring to Fig. 7, it will be seen that the outer edge of cam arm 286 is engaged by the tip of a screw 289 threaded into a tapped hole in the upper end of a bar 290. The screw 289 may be rotated to adjust the position of the upper end of arm 290 with reference to cam arm 286 by means of a hand wheel 291 keyed to the lower end of said screw 289, and it may be locked in said adjusted position by means of a set bolt 292 which pinches together the split end of nut 293 formed in the end of said arm 290. The lower end of said arm 290 is in the form of a circular rod slidable in a boss 294 formed on the end of an arm 295 keyed to the rock shaft 269ª previously referred to.

The arm 295 is rigidly secured to the shaft 269ª by means of a tapered pin 296 extending transversely through the hub 297 of arm 295 and cooperating with a notch or pinway formed in the side of said shaft 269ª. The rod or bar 290 may be locked in any position of longitudinal adjustment in boss 294 by means of a set screw 298. By adjusting the rod 290 in boss 294 the end of the screw 289 may be moved along cam bar 286 so as to bring the tip of said screw toward or away from the pivot point 287 and thus to decrease or increase the effect of cam 282. Also, by adjusting hand wheel 291 the bender may be set to impart a lesser or greater amount of curvature to the coils of the spring and thereby reduce or increase the diameter of all of the spring convolutions irrespective of changes of diameter between adjacent convolutions as determined by cam 282.

*The pitch controller.*

The pitch of the convolutions of the spring, i. e., their spacing along the axis of the spring may be varied independently of the diameter of the convolutions. Such independent pitch control is secured through the agency of cam 283 previously referred to. As shown best in Figs. 6, 7 and 4, the active part of said cam 283 comprises a circumferential longitudinally projecting formation 299 suitably shaped to give the desired travel of cam roll 300 in a direction substantially parallel with the axis of shaft 276. Said cam roll 300 is rotatably carried at an intermediate point in the length of a cam bar 301 depending from and pivoted on a pin 302 in the end of a stud 303 carried in a boss 304 (see Fig. 36).

As shown best in Figs. 4, 7, 36 and 37, the stud 303 is slidably mounted in boss 304 and is capable of being adjusted longitudinally therein by a hand wheel 305. To this end, the hand wheel 305 is keyed to the end of adjusting screw 306 accommodated in an aperture tapped in boss 304. The inner or rearwardly projecting end of screw 306 is reduced in diameter as shown at 307 to form a neck rotatable in a small arm 308 positioned by means of shoulder 309 on the end of screw 306 and by lock nuts 310 and 311 fitting the reduced threaded end 312 of the adjusting screw 306. Arm 308 is rigidly secured to the inner or rearwardly projecting end of stud 303 by means of a bolt 313.

By means of the above described instrumentalities, the position of pivot pin 302 on which depending cam lever 301 is mounted may be shifted rearwardly or forwardly in a direction parallel with the axis of cam shaft 276. In order to lock the adjusting screw 306 in adjusted position, I prefer to employ a plunger 314 (see Fig. 37) the side of which forms a part of the internal thread which fits the exterior of screw 306. Said plunger 314 is normally drawn upwardly by means of a coiled compression spring 315 surrounding the extended stem 316 of the plunger 314 and interposed between the top of boss 314 and the lower face of nut 317 threaded on the upper end of said plunger end 316. It will be understood that the spring 315 causes the plunger 314 to force its threads into cramping or wedging engagement with threads on the exterior of screw 306 thereby clamping the latter in any desired position.

The lower end of pitch cam arm 301, suitably shaped to avoid certain other parts of the mechanism, is reduced somewhat in width, as at 318 to enter a slot 319 extending vertically and diametrically through the pitch control rod 320, said pitch control rod 320 being longitudinally slidable in frame parts 206 and 205. On the front end of said pitch control bar 320 there is integrally secured an arm 321 extending at right angles from rod 320 and milled out on its front side to constitute a dove tail guide 322 for the pitch controller 323. The pitch controller 323 is bevelled on its front side as indicated at 324 and is also inclined as to its front face so that the lower end of said pitch controller 323 is nearer the front of the machine than the upper end thereof. By means of a set screw 325 the pitch controller 323 may be adjusted along dove tailed guide 322 in order to impart the right amount of pitch to the convolutions as the latter are spaced by the pitch controller.

*The cut off mechanism.*

The cutting off of the completely coiled spring from the end of the continuous wire is effected during the time when the forward movement of the wire has been temporarily arrested by the cam roll 240 dropping to a low part of cam 239, as previously described. Such cut off mechanism is shown best in Figs. 7, 13, 23 and Figs. 28 to 31 inclusive. Referring to said figures, the actual cutting is effected by means of a stationary knife member 326 and a movable knife member or punch 327. As shown best in Fig. 13, the wire 328, as it is delivered by guide 254 and bent by bender arm 270, passes just beneath the beveled tip 329 of the stationary knife 326 and passes in front of the cutting edge 330 of punch 327.

As shown best in Fig. 38, the stationary knife 326 is adjustably mounted to slide in a guide or holder 331 the front face of which is formed with a dove tailed slot fitting the dove tailed cross section of knife 326. Bolts 332 and 333 serve to clamp said knife or cutter support to the frame bar 206 of the machine. In order to clamp the cutter or knife 326 in the desired position of longitudinal adjustment, the left hand bolts 333 are formed with laterally projecting heads 335 overhanging and bevelled to fit the dove tailed edge of cutter 325 so that when the bolts 333 are tightened the cutter bar 326 will be rigidly and positively clamped in its holder.

The stationary knife support or holder 331 also serves as a guide for the movable knife or punch 327, the cutting end of which appears in Fig. 13. Said movable knife or shear is held up against the work so as properly to cooperate with the edge 330 of the knife 326, by means of steel plate or insert 336 inserted in a recess in the lower end of holder 331.

In order to provide for the necessary sharpening or grinding of the cutting edge 337 from time to time, the front end of shear bar for a considerable distance is made of uniform cross section as indicated at 338. The rear end 339 of the shear bar is adjustably supported in a holder 340 so that such actuating bar 340 may be maintained in standard relation with its cooperating mechanism whenever the bar 338 is shortened by said grinding of the cutting edge. To this end the front portion of the bar 340 is apertured at longitudinally spaced points to receive a pair of clamping bolts, 341, said clamping bolts extending through a pair of longitudinal slots 342 in the shank portions 343 of the shear bar 327.

In order to prevent the shear bar from slipping back in the holder, laterally extending serrations or rack teeth 344 are formed on one side of shank 343, said serrations cooperating with similar serrations formed in the adjacent face of a clamping plate 345 interposed between the heads 346 of clamping bolt 341 and the shank 343. Preferably, in order to take the shearing stress off bolts 341, the rear end of clamping plate 345 is arranged to abut against the shoulder 347 of holder 340.

The shear holder 340 is actuated by a pair of cams 348 and 349 mounted on the side face of gear 237, the cam 348 serving to move the holder 340 forwardly to sever the wire and the cam 349 serving to retract the holder. As shown best in Fig. 32, the cam 349 comprises the head of a bolt 350 extending through the web 351 of gear 237, said head 349 being rectangular in cross section to seat in a radial slot or groove 352 cut in the side of gear 237. The cam 348 is similarly constructed and fitted in the gear wheel 237, but as shown in Fig. 9, while the cam 349 is relatively narrow, and set relatively close to the axis of gear 237, the cam 348 is of greater length and extends relatively further from said axis. The rear end of holder 340 is bevelled as indicated in Fig. 27 and Fig. 23 so as to cooperate with the suitably bevelled side or face of cam 348. The position of holder 340, with reference to the axis of the gear 237 is such that as the gear 237 rotates, cam 349—being set close to the axis of the gear—will not engage the rear end of holder 340, which, however, will be engaged by the face of cam 348. Cam 348 will, therefore, cause a longitudinal forward movement of holder 340 to sever the wire.

The retractive movement of the holder 340 is effected through the agency of a plunger 353 arranged with its axis parallel to the axis of holder 340 and slidably mounted in a guide support in frame member 205. The rear end of plunger 353 is bevelled as indicated at 355 to cooperate with cam 349, the position of said plunger 353 being such that it will be engaged by cam 349 as gear 237 rotates, and will be forced forwardly. This occurs a short time after the cam 348 in its rotation has pushed holder 340 forwardly. The front end of plunger 353 engages a small wear plate 356 on the lower end of a lever 357 pivoted on a pin 358 in small bracket 359, and to side of frame 205.

The upper end of lever 357 is suitably shaped to enter a notch 360 in holder 340 and to engage a shoulder 361 whereby the forward motion of plunger 353 is converted into a rearward or retractile movement of holder 340. The plunger 340 is prevented from going back too far by means of a small plate 362 bolted to the rear face of frame member 205 by cap screw 363 (see Fig. 28), said plate 362 also serving as a guide for the rear end of the holder 340. It will be observed, by reference to Fig. 23, that one of the sides of plunger 340 is milled off to form a flat 364 engaged by the beveled corner 365 of guide plate 362. It will be seen that plate 362 acts as a stop for shoulder 366 at the end of flat portion 364, thereby preventing improper rearward movement of holder 340.

It will be understood that gears 237 and 275 have the same number of teeth and each make one revolution for each cycle of the machine. The severing of the wire should desirably take place when the forward movement of the wire is arrested, the length of such period determining the length of wire which goes into the spring. As it may be necessary to provide a longer or shorter end, either at one or both extremities of the spring, I prefer to employ special means for varying and regulating the length and cycle position of the period of wire dwell.

By reference to Figs. 6 and 26, it will be seen that the cam which has previously been designated as a whole 239 is composed of a pair of separate cams arranged side by side, the cam roll 240 being wide enough to engage both of said cams simultaneously. The rear cam 367 is a flat plate of suitable shape united to the hub of gear 237 by flat headed cap screws as at 368, the raised surface of said cam being substantially 180° as indicated in Fig. 26. The front cam 369 is positioned against the front face of cam 367 and is secured to the sleeve 238, to which gear 237 is keyed, by means of a pair of set screws 370.

The raised active surface of cam 370, as indicated in Fig. 26 is somewhat less than the active arc of cam 367 and is adapted to overlap same as indicated in Fig. 26. It is manifest that the period of elevation of cam roll 240 corresponds to an arc of 180° plus the angle $a$ by which the front cam 369 extends beyond cam 367. Such period of elevation of roll 240 may obviously be made greater or smaller by adjusting the angular position of the front cam 369 on sleeve 238.

*The transfer mechanism.*

Referring now to Sheets 15, 16, 17 and 18, 371 and 372 are spaced standards bolted to the top of bed plate 150 and to the tops of which standards there is bolted a cap frame 373. Bearing boxes 374 and 375 in said standards are furnished for the purpose of rotatably supporting therein a horizontal cam shaft 376 from which are driven all of the various instrumentalities for knotting, transferring, setting and delivering the springs, after they have been coiled.

The standard 371 is cast with a rearwardly extending bracket 377 in which is journaled one end of the shaft 378, and to said bracket 377 by means of bolts 379 there is secured a housing 380, the outer end of which housing is provided with a bearing aligned with the bearing in bracket 377 and also rotatable supporting shaft 378. On the outer end of shaft 378 there is keyed (see Figs. 1 and 2) a gear 381. Gear 381 is driven by a silent chain 382 from a pinion 383 keyed to the main drive shaft 155. Contained within the circular recess 384 formed by bracket 377, and keyed on shaft 378, there is a pinion 385. The gear 385 meshes with a large spur gear 386 keyed to shaft 376, and thus shaft 376 is driven continuously by the main power shaft 155.

To the right hand side of bed plate 150 (see Fig. 48) there is bolted a small bracket or standard 387 the upper end of which is drilled to form a bearing for shaft 388. The rear end of said shaft 388 is supported in a small L-shaped bracket 389, and the intermediate portion of the shaft is supported in a boss 390 formed integral with standard 372. Said shaft 388 constitutes a pivot for rock lever 391, said rock lever 391 being equipped at its extremities with pivot pins 392 and 393 which accommodate cam rolls 394 and 395. Cam roll 394 cooperates with a radial cam 396 keyed to main cam shaft 376 and cam roll 395 cooperates with a cam 397 behind cam 396 and also keyed to shaft 376. Cams 396 and 397 constitute in effect followers for each other, and hence cause a positive rocking movement of rock lever 391 in both directions.

On the opposite ends of rock lever 391 there are formed outwardly extending wings 398 and 399 to which are bolted a pair of upwardly converging rectangular bars 400 and 401. At their upper ends the parts 400 and 401 are bolted to a junction plate 402. Below the junction plate 402 there is bolted to the arms 400 and 401 a transverse strap 403 having secured thereto a guide lug 404 which extends down behind an arcuate guide member 405 bolted to frame member 372 as at 406 and 407. Behind guide member 405 and spaced therefrom the proper distance to accommodate guide lug 404 (see Fig. 48) there is a guide bar 408 similar to guide bar 405 and secured to frame 372 by the same bolts 406 and 407. Parts 405 and 408 thus form a guide slot for guide lug 404 and thus compel the upper ends of the A-shaped frame composed of parts 400 and 401 to rock in a plane at right angles to the axis of the shaft 376. The rocking movement of the A frame serves to effect the actual transfer of the coiled spring between the various instrumentalities which treat the spring after it has been coiled by the coiling mechanism.

Referring to Fig. 56, and Fig. 48, 409 and 410 are spaced bracket arms or standards formed integral with the upper end of frame 372. The upper ends of said arms 409 and 410 are equipped with bearings 411 and 412 in which are journaled stub shafts 413 (see Fig. 46) and 414 (see Fig. 124). On the inner ends of said stub shafts there are journaled arms or cranks 415 and 416 and on the outer ends of said cranks 415 and 416 and extending between the same there is bolted a swinging shelf or guide bar 417 (see Figs. 48, 56, 124 and 125). On crank 416 there is united an arm 418 (see Fig. #125) to the ends of which arm 418 there is pivotally secured, by means of a suitable ball and socket joint 419, the upper end of an actuating rod 420. The lower end of said actuating rod 420 (see Fig. 56) is connected by means of a ball and socket joint 421 to the front end of a rock arm 422, which is pivotally mounted on shaft 388. The inner end of said rock arm 422 is curved upwardly as indicated at 423 and is equipped with a pin 424 furnishing a pivot for cam roll 425 engaged by cam 426 keyed to shaft 376. Rotation of shaft 376 will cause cam 426 to rock arm 422, reciprocate rod 420, and rock guide bar 417 around the axis of bearings 411 and 412.

The bar or shelf 417 constitutes in effect a track for the carriage 427 (see Figs. 59, 63 and 64). Said carriage 427 comprises a flat casting provided with strengthening ribs 428 and having at its right hand edge a stout flange 429 overlapping the edge of track bar 417. In the depending flange 429 and at the inside thereof there are screwed a pair of studs 430 having enlargements 431, constituting journals for rollers 432, the upper sides of which engage in a slightly V-shaped groove 433 milled in the under side of and along the edge of track bar 417. To the under side of the inner margin of carriage 427 there is secured by two pairs of bolts 434, a retaining bar 435 having a lateral flange 436 fitting a rabbet 437 in lower edge of track bar 417. The weight of carriage 427 is mainly supported upon a pair of drum shaped rollers 438 mounted to rotate on pins 439 in carriage 427 the under sides of said rollers engaging the planed off under surface 440 of track bar 417.

On the outside edge of carriage 427 there is formed an integral outwardly projecting arm 441. Said arm 441 is made with a depending portion, which, in conjunction with a removable cap member 442 constitutes a socket for the ball 443 of a ball and socket joint. Said ball 443 is on the end of a connecting rod 444 on the other end which rod is a similar ball 445 (see Figs. 98, 99 and 100). Ball 445 constitutes the ball member of a ball and socket joint, the socket of which is formed by the upper end of junction plate 402 and cap 446 secured to said junction plate 402 by bolts 447.

The outer ends of the aligned stub shafts 413 and 414 constitute pivots for upstanding arms 448 and 449, the upper ends of which are bridged by a yoke bar 450 (see Figs. 45, 46, 56 and 65). Said yoke bar 450 carries a set of three similarly spaced dogs 451, 452 and 453 respectively secured to yoke bar 450 by bolts 454, 455 and 456. Yoke 450 is rocked about the axis of shafts 413 and 414 by means of an arm 457 formed integral with arm 449, said two arms constituting in effect a bell crank. The horizontal arm 457 (see Fig. 45) is connected at its outer end by means of a ball and socket joint 458 to the upper end of an actuating rod 459 connected at its lower end by means of a ball and socket joint 460 to the outer end of a rock lever 461.

The rock lever 461 is pivoted on shaft 388 and, (see Fig. 57) is equipped with spaced arms 462 and 463 on the ends of which arms are pivoted cam rollers 464 and 465. Cam rollers 464 and 465 cooperate with cams 466 and 467 keyed to main cam shaft 376, one of said cams constituting a follower for the other. It will be manifest that rotation of shaft 376 will effect the desired rocking movement of yoke bar through the train of mechanism just described.

To the upper surface of carriage 427 there are bolted a pair of arms 468 and 469 (see Fig. 58 (Sheet 27)). Each of the arms with its details is alike in construction, and therefore, the details of arm 469 only will be described. As shown best in Figs. 59 to 62 inclusive, said arm 469 is grooved along its upper surface to accommodate a rectangular plunger 470. Said plunger at its outer end is fitted with a pin 471 provided with a projecting upstanding portion 472 adapted to cooperate with lug 473 of dog 453 (see Fig. 68) and lug 474 of dog 452 (see Fig. 67). The corresponding pin 472ᵃ of arm 468 is similarly adapted to cooperate with lug 475 of dog 452 and lug 476 of dog 451. The lugs 474 and 476 constitute releasing means for the grippers, while lugs 473 and 475 constitute in effect setting means for the grippers. The grippers will now be described.

On the end of the casting which forms the arm 469 there are formed a pair of integral longitudinally spaced depending lugs 477 and 478 which lugs are suitably drilled out to provide laterally spaced longitudinally axially extending pairs of bearings accommodating shafts 479. On said shafts 479 there are mounted a pair of oppositely disposed gripper members 480 (see Fig. 61), which gripper parts are adapted to rock on their axes from the full line position shown in Fig. 61 to the dotted line position shown in said figure, for the purpose of grasping the spring.

The grippers 480 are rocked into and out of gripping position by means of a vertically slidable rack bar 481 interposed between shafts 479 and having on its opposite sides rack teeth as at 482 which are arranged to cooperate with teeth 483 by mutilated gears formed on the hubs 484 of the grippers 480. Said rack bar 481 is slidably mounted in lugs 477 and 478, said rack having on its outer ends vertically extending tongues 485 fitting within a corresponding groove formed in vertically extending guides 486 cast on the opposed inner faces of lugs 477 and 478. The rack bar 481 is normally pulled upwardly in the end of arm 469 by means of a pair of compression coiled springs 487, said springs surrounding the upwardly extending limbs 488 of a U-shaped rod, the central portion 489 of which extends through an aperture drilled transversely through the rack bar 481. The limbs 488 of the U-shaped pull rod extend upwardly through apertures in a cap plate 490 bolted to the top of arm 469 and the springs 487 are interposed between cups 491 supported on the top of plate 490 and adjustable cup shaped collars 492 threaded onto the threaded ends 493 of the limbs 488.

On the end of control bar 470 which slides in and along arm 469 there is mounted on a pin 494 a cam roll 495, the upper side of which rolls on the under side of plate 490, while the lower side of said cam roll 495 is engaged by the upper surface of the rack bar 481. As shown best in Fig. 59, the upper surface of said rack bar has a low portion 496 and a high part 497.

It will be manifest that when the control bar 470 moves from the dotted line position shown at 498 in Fig. 59 to its full line position shown in said figure, the rack bar 481 will be depressed, as shown, against the action of springs 487, and the gripper parts 480 will be thrown out into their full line positions as shown in Fig. 61. When the control bar 470 is moved back into its dotted line position as shown in Fig. 59, springs 487 will be permitted to pull up the rack bar 481, thus moving the grippers 480 into their dotted line position as shown at 500 in Fig. 61, and grasping the spring preparatory to a transfer movement.

In order to prevent improper movement of control bar 470 due to vibration or other forces, I prefer to apply friction or drag to its upper surface. This is done by means of a small cylindrical plug 501 slidably mounted in a cylindrical bore 502 in a dome 503 secured over the top of arm 469 by means of integral side lugs as at 504 which are held in place by the nuts 505 on the clamping bolts 506. The plug 501 is shorter than the recess 502, the open rear end of which is occupied by compression spring 507 which forces the plug 501 downwardly into rubbing engagement with the upper surface of the control bar 470.

The operation of the transfer mechanism is as follows. The cams and other instrumentalities are so timed and synchronized that when the coiling of the spring has been substantially completed and just before the coil has been cut off, cam 397 (see Fig. 2 and Fig. 49) has moved the transfer carriage 427 to its extreme right hand or rearmost position as shown in said figures. During the retractive movement of the carriage 427 the arms 468 and 469 have been maintained in elevated position by reason of the fact that the high part of cam 426 (see Fig. 56) cooperating with cam 425 and lever 422 has moved actuating rod 420 upwardly thus tilting upwardly the track bar 407 on which carriage 427 is slidably mounted.

When carriage 427 has reached its rearmost position as shown in Fig. 56, the cam roll 425 drops onto the low portion of cam 426 and permits rod 420 to drop and allow guides 427 and arms 468 and 469 to assume a substantially horizontal position. When arms 468 and 469 are thus dropping into horizontal position, the grippers 480 are open, as shown in full lines in Fig. 61, being held open by cam roll 495 forcing down rack bar 481.

After the arms 468 and 469 have resumed their horizontal position, the grippers of both arms are permitted to close. This is effected by cams 466 and 467 which rock bar 450 on arms 448 and 449. During the period when gripper arms 468 and 469 are being rocked from or to horizontal, bar 450 moves substantially in accordance with the rocking movement of pins 472 and 472ᵃ and hence has no effect on the opening or closing of the grippers. However, when gripper arms drop into horizontal position, bar 450 then moves rearwardly and pins 472 and 472ᵃ are engaged respectively by lugs 473 and 475 on bar 450, sliding the control rods 470 outwardly along the arms and moving cam roll 495 off high part 497 of the rack bar 481 and allowing springs 487 to pull up rack bar 481 and close the respective pairs of grippers.

Hence the gripping hands seize the two springs, one of which has just been coiled and is about to be cut off and the other of which has been knotted by the knotting instrumentalities hereafter to be described, said knotting instrumentalities being spaced from the coiler a distance equal to the spacing of arms 468 and 469. The knotting instrumentalities are indicated at 508 in Fig. 49.

The next movement of the transfer mechanism is a forward movement of the carriage under the influence of cams 396 and 397 (see Fig. 2) so as to bring gripper arm 469 in register with coiling mechanism 408 and to bring arm 468 in register with the mechanism indicated at 509 in Figs. 2 and 49, for "setting" or pressing the springs as hereinafter to be described. During said forward or outward movement of the carriage, the spring, which has previously been set by the mechanism 509 is engaged by a pusher in the form of an angularly bent piece of sheet metal 510 carried by arm 468 and is thereby pushed out of and away from the press mechanism and into delivery trough 511.

After the carriage has advanced the gripper arms outwardly and has thus moved the two springs carried thereby, into the field of the next successive treating mechanism, the grippers are released, prior to the raising of arms 468 and 469, by reason of arm 449 rocking outwardly under the influence of cams 466 and 467 which cause lugs 474 and 476 to engage respectively with studs 472ª and 472 moving cam rolls 495 inwardly of arms 468 and 469 and forcing down rack bar 481. Track bar 417 is then rocked by cam 426 to elevate arms 468 and 469 and the carriage is then moved rearwardly or retracted by cam 397.

*The knotting mechanism.*

Referring to Fig. 46, the numeral 512 represents a square track bar, the ends of which are turned off to form trunnions journaled in stationary bearings 513 and 514. On said track bar 512 there are arranged to reciprocate in opposite directions a pair of saddles 515 and 516 (see Fig. 78). The saddle 515 is reciprocated by a substantially horizontal actuating rod 517, one end of which is connected to an extension 518 of saddle 515 by a ball and socket joint 519, while the other end of said rod 517 is connected by means of a ball and socket joint 520 to the depending leg 521 of a three armed bell crank 522 pivoted on a pin 523 in bracket 524 (see Fig. 48) bolted to the left hand end of cap frame 373.

The said saddle 515 carries on its upper side a small bracket 525 in which there is mounted a stationary stud provided with a flange 526 larger than the diameter of the end coil of the spring, said stud also being provided with a rounded point or center 527 adapted to enter the final coil of the spring.

The rocker or bell crank 522 is actuated by its horizontal arm 528 which is connected by a ball and socket joint 529 to an actuating rod 530, (see Figs. 47 and 48). The lower end of the actuating rod 530 is connected by a ball and socket joint 531 to the outer end of a cam lever 532 pivoted on a pin 533 fixed in small bracket 534 bolted to the under side of cap frame 373. On the cam lever 532 there are provided depending lugs on which are pivotally mounted cam rolls 535 and 536 respectively cooperating with suitable cams 537 and 538, both of said cams being keyed to constantly running cam shaft 376. One of said cams cooperating with its cam roll is arranged to rock arm 532 in one direction, while the other cam may be considered a follower cam for the purpose of rocking the arm in the opposite direction. The effect of such mechanism is to reciprocate saddle 515 along square bar 512.

The saddle 516 is reciprocated along square track bar 512 by means of the upper upstanding arm 539 of three armed rocker 522, said upper arm 539 being connected to actuating rod 540 by bell crank 541. The saddle 516, as perhaps shown best in Fig. 85, comprises a slide 542 planed out to fit square bar 512 and having, as shown in Fig. 82, a circular portion 543 concentric with the axis of bar 512. To the left of said circular portion 543, there is a lateral sector shaped extension 544 to which extension there is secured a wear plate 545.

By means of bolts 546 there is secured to the sector arm 544 a bell mouthed ring or rim 547, said arm 544, plate 545 and bell ring 547 being rigid with rock-slide 542 and swinging therewith. On the opposite end of circular bearing 543 of the saddle, there is secured by means of suitable set screws as indicated at 548 in Fig. 82, a segmentary retaining ring 549. Parts 544 and 549 serve as limiting end bearings for a loose collar 550 having a bifurcated lug 551 equipped with a transverse pin 552 on which the end of the actuating rod 540 is pivoted. In view of the above description, it will be manifest that when square track bar 512 may be rocked on its trunnions, although saddle 543 and parts 544 and 547 will rock with the saddle, collar member 550 being journaled on the bar 543 on the saddle, will not be rocked thereby.

The collar 550 constitutes a part of a casting 553 adapted to slide but not to rock with slide 542 and being in part supported in its slidable movement by the upper planed surface of an upstanding block 554 (see Figs. 69 and 48) formed as an extension of cap frame 373. Member 553 is steadied and prevented from rocking away from block 554 by means of a lug 555 bolted to the side of casting 553 and having an inwardly extending tongue 556 at its lower end fitting within a correspondingly shaped groove in the side face of bracket 554.

Within the casting 553 there is mounted to rotate, (see Figs. 79 and 80) a small stub shaft 557 having on one of its ends a large head 558 to which, by means of screws 559 (see Fig. 69) there is secured a locating arm 560 arranged to sweep over the face of casting 553. On the inside end of stub shaft 557 there is keyed a pinion 561, which pinion (see also Fig. 83) is adapted to mesh with a rack bar 562 vertically slidable in a suitable guide 563 formed as a rigid part of casting 553. Since casting 553 has a reciprocatory movement across the machine the said end 564 of the rack bar is not directly connected to an actuating member, but is provided with a notch so that it may slide on the horizontal flange 565 of an L-shaped vertically slidable actuator-member 566 (see Figs. 90 and 91).

As shown in said figures, one side of the L-shaped member 566 is equipped with a dove tailed portion 567 fitting in a fixed correspondingly shaped guide 568 and the other side of said plate 566 is provided with a bifurcated lug 569 having a pin 570 to which is pivotally connected the upper end of the actuating rod proper 571. Said actuating rod 571 is operated by cam arm 572 (see Fig. 53) which is pivoted on a pin 573 in small bracket 574 bolted to the under side of cap frame 373. The lower end of said actuating rod 571 is pivotally connected to a pin 575 in the outer end of cam lever 572 which cam lever is equipped with a pair of cam rolls 576 and 577 cooperating respectively with cams 578 and 579 keyed to main cam shaft 376.

The cams 578 and 579 are so timed that the locating arm 560 is moved for approximately three-fourths of a revolution in a clockwise direction, viewed from the front as shown in Fig. 69, prior to the inward movement of slides or saddles 515 and 516. The approach movement of the slides or saddles occurs at the time when the transfer mechanism positions a coiled spring in line with the knotting mechanism. As shown best in Fig. 78, the small end of the spring is entered and compressed by rounded center 527 and the large end of the spring is pushed up against the circular surface 580 within rim 547 and comprising non-swinging plate 581 and swinging plate 545 flush with 581. It is also positioned within the rounded rim 547 of the swinging member 544, the inner diameter of said rim 547 being slightly in excess of the diameter of the end convolutions of the large end of the spring.

As soon as the transfer grippers have released their grip on the spring, the spring then being lightly held between the center 527 and plane 580, the cams 578 and 579 effect a reverse movement of the locating arm 560, which is arranged to slide over the parts 581, 545. The square edge 582 of arm 560 in its backward sweep in a counter-clockwise direction will engage the square cut end of the wire forming the terminal coil of the large end of the spring, which will result in a slight rotation of the spring around its axis into the position shown in Fig. 69. It will be understood that under ordinary circumstances, the variations in the temper and diameter of the wire and the tolerances in the mechanism will result in a comparatively small variation in the angular position of the end of the spring and therefore, said end will, in all cases, be found well within the angle of oscillation of arm 560. This is particularly true where, as here, I grasp the spring before it is severed and carry it directly to the knotter not letting go of it until the knotting mechanism has grasped it firmly.

Small movements of the end of the spring under the influence of the locating arm 560 may be taken up by the resiliency of the coils between the large and the small ends of the spring. If a large amount of locating angular movements, due to arm 560 occurs, the entire spring may be rotated slightly depending upon the compressive effect of the saddles and the fit of the small end of the spring on center 527.

Means are provided to clamp the end of the wire and for positioning the large terminal coil of the spring immediately after the end of the wire has been located by the mechanism which has previously been described. Such mechanism is shown best in Figs. 69, 70, 71, 86 and 87. In the swinging portion 544 of the saddle 516, and through its face plate 545, there extends a bolt 583 secured at its rear end by a nut 584. The head 585 of said bolt is bifurcated to provide an upper limb 586 and a lower limb 587, said limbs being beveled or pointed at their front ends so as to form a flaring opening adapted readily to admit the wire 588 of the terminal coil.

As shown best in Fig. 69, the radial distance of center of bolt 583 from axis of rotation of locating arm 560 is such as to bring the lower tine of the fork above the wire end 589. Such wire end 589 is clamped against the under side of bolt head 585 by means of a swinging finger 590 pivoted on a pin 591 carried on the back of swingable saddle portion 544. It will be observed that the crotch of the bifurcated head 585 is located away from face plate 545 a distance somewhat greater than the diameter of the wire 589, so as to permit the end wire 589 to be bent behind wire coil 588 (see Fig. 70).

Swinging clamping finger 590 is actuated by an axially fixed plunger 592 having a head 593 for engaging the under side of finger 590. Finger 590 has a relatively limited amount of pivotal movement, its downward movement being arrested by the bottom of the slot in plate 545 through which the finger extends. The normal position of plunger 592 is slightly below the depressed position of finger 590 so that the end of finger 590 will slide or move over the top of head 593 when the saddles move toward each other.

Plunger 592 is slidably carried in the bored out upper end of an actuating rod 594 coaxial with the plunger. The bore 595, which receives the plunger 592, is long enough at its lower end to accommodate a cushion spring 596 which normally tends to force the plunger 592 upwardly. Upward movement of the plunger 592 is limited by a pin 597 inserted in a hole drilled automatically through the shank of plunger 592 and extending through slide slots as at 598 in the sides of rod 594, the ends of said pin 597 engaging against a suitable stop collar 599 threaded on the upper end of the actuating rod 594. If desired, a suitable lock nut 600 may be employed to clamp stop collar 599 in any desired position.

Rod 594 is actuated by cam 601 (see Fig. 55) which cam is of the radial type and adapted to cooperate with a cam roll 602 carried on the flattened lower end 603 of rod 594. Instead of having the plunger 594 slidably supported, I prefer to carry the lower end of same by a swinging arm 604 pivoted on a pin 605 fixed on the lower end of a bracket 606 bolted to the under side of frame member 373. The flattened portion 603 on the lower end of rod 594 is drilled to accommodate a pivot pin 607 carried by the outer end of arm 604. The actuating rod 594 is maintained in upright position by a tension coiled spring 608 connected between bracket 606 and rod 594 and causing the head 593 of plunger 592 to slide along a wear plate 609, hereinafter to be described more in detail, secured to casting 554.

I will now describe the abutment by which the end of the wire is bent into the position shown in Figs. 70 and 71. This abutment comprises a small steel plate 610 (see Figs. 70, 71, 101 and 102) of thickness substantially equal to the thickness of the diameter of the wire and provided with a semi-circular groove to receive the wire as indicated in Fig. 102. Said plate 610 is fixedly secured to the face of the non-swinging saddle portion 553 by means of a flat head screw 611 and locating pin 612. As shown in Figs. 69 and 70, the grooved edge of the plate 610 is arcuate in shape, the arc being a portion of a circle which is concentric with the axis of locating arm 560. It is so positioned that the outer end of arm 560 will just slide past the arc shaped edge of plate 610.

The bending of the end of the wire is effected by a rocking movement of the square shaft 512, such rocking movement being accomplished by the following mechanism. Referring to Figs. 50, 51 and 52, it will be observed that on the shaft 512 there is secured an arm which comprises a lower socket plate 612$^a$ notched to receive square shaft 512, and an adjustable top plate 612$^b$. Said top plate is bolted to the top of bottom plate 612 by means of a pair of cap screws 612$^c$ passing through slots as at 612$^d$ whereby the position of plate 612, and hence the length of the arm may be adjusted. Said adjustment may be rendered somewhat more convenient by means of an end plate 612$^e$ secured to the plate 612$^b$ and extending down past the end of plate 612$^a$. A set screw 612$^f$ is threaded into the lower end of plate 612$^e$, and, when turned, will effect a sliding movement of plate 612$^b$ on plate 612$^a$. When the plate 612$^b$ has been moved into the required position by set screw 612$^f$, bolts 612$^c$ are turned down thus clamping the two plates rigidly together.

The outer end of plate 612$^b$ is bifurcated, as shown in Fig. 51 and as shown in Fig. 50 supports a pivot pin 612$^g$ for connecting with the head of an actuating rod 612$^h$. The lower end of said actuating rod 612$^h$ is connected to a pin 613 carried by one end of cam lever 613$^a$. Said cam lever 613$^a$ is pivotally supported on shaft 613$^b$ and carries a pair of cam rolls 613$^c$, 613$^d$, cooperating respectively with a pair of cams 613$^e$ and 613$^f$, both of said cams being keyed to the main cam shaft 376 and each constituting a follower for the other. It will be manifest from an inspection of Fig. 50 that when the main cam shaft 376 is rotated, cams 613$^e$ and 613$^f$ will rock square shaft 512 at predetermined times in the cycle of operations.

The rounded edge 613$^g$ of plate 610 constitutes a stationary bending abutment, which is effective to bend the wire into the position shown in Fig. 70 when the square shaft 512 rocks the swinging saddle portion 544 carrying with it the end of the wire which is clamped by finger 590 against forked head 585. Downward movement of finger 590, supported by plunger 592 is permitted by spring 596. At the completion of said bending operation, the saddle parts are in the position shown in Fig. 70, and remain in such position until the completion of the knot.

The next step in the operation of knotting the end of the wire around the terminal coil of the spring consists in wrapping the inwardly projecting end of the wire around the coil. This is effected by the following mechanism. Referring particularly to Figs. 53, 54, 55, 96, 97 and 118, it will be seen that in the top of cap frame 373 there is planed a groove 614 which receives tongue 615 of a casting, the upper surface of said casting being planed off to the same height as the block extension 554. The lower edges of casting 616 are also dove-tailed as indicated at 617 and 618 to fit respectively in a correspondingly shaped rabbet in block 554 and the undercut beveled edge of a clamping block 619.

In the upper surface of the cap frame 373 there is formed a groove rectangular in cross section, the bottom of said groove being formed with a hemispherical bearing surface adapted to rotatably receive a gear shaft 620. The upper half of the bearing for said shaft 620 is formed by a pair of cap pieces 621 and 622 each of which is clamped in place by a set of four fillister head cap screws as at 623, the heads of which are seated in recesses drilled in the upper surfaces of the cap pieces.

The upper surfaces of the cap pieces 621 and 622 are level with the planed upper surface of the cap piece 373 which supports casting 616, and the tongue 615 formed on the under side of said casting 616 extends into a slot 624 in the top of the cap piece 622. The side plate 609, which has previously been referred to, is shaped substantially to correspond with the side of casting 616 and is secured thereto by bolts as at 625 and dowels as at 626. Said plate 609, as indicated in Fig. 97 is drilled out to form a bearing for one side of 627 of the knotter pinion 628.

The other side 629 of the hub of said pinion is rotatably supported in another plate 630 fitting within a suitably shaped recess in casting 616, the lower corners of the plate 630 being dove-tailed, as indicated at 631 to prevent said plate from being displaced upwardly. It will be understood that in assembling these parts the plate 630 is inserted through the casting 616 from the under side thereof before the casting 616 is secured in place on the top of the cap frame 373. Both of the knotter pinion bearing plates 609 and 630 are slotted vertically as indicated at 632 in Fig. 96 (see Sheet 32), said slots extending slightly beyond the center of pinion 628. In the position shown in Figs. 96, 97, 69 and 70, said slots register with and form continuations of a slot 632 extending throughout the length of the pinion and its hub, and radially to the center thereof. The slotted upper edges of plates 609 and 630 have the same outline except that plate 609 has an upstanding ear or horn as indicated in dotted line at 633 in Fig. 96. This is for the purpose of engaging the second turn of the spring to hold same away from the end coil during the knotting operation.

On one end of shaft 620 there is keyed a spur gear 634 which is arranged to mesh with the teeth of gear pinion 628. As the slot 632 is of no greater width than the tooth space of said pinion and is located to coincide with one of the tooth spaces, it does not interfere with the proper meshing and driving engagement of said gear 634 and pinion 628. There is also keyed to the shaft 620 and in a position intermediate the cap pieces 621 and 622 a roll-tooth pinion or worm gear 635, the lower part of which gear extends through a slot formed in the bottom of cap frame 373.

It will be observed that the axis of shaft 620 is located at right angles to the axis of the main shaft 376 of the machine permitting said roll-tooth pinion 635 to function as a worm gear adapted to be driven by a worm rotating with the shaft 376. Said worm is formed on the outer circumference of a wheel 636 keyed to shaft 376, a development of which worm is shown in Fig. 119, sheet 40. As shown in Figs. 119 to 122 inclusive, the roll-tooth pinion 635 is equipped with a set of outwardly projecting radial pivot pins or studs 637 having heads 638 for retaining rollers 639 and secured in place by lock pins 640.

The worm is of the multiple thread type and in its general construction is similar to that shown in my previous patent, above referred to. As shown in Fig. 120, the worm pinion 635 has eight teeth or rollers, and the worm wheel 636 has eight thread spaces 641 around its circumference, thus insuring that the pinion 635 makes a complete revolution for each revolution of the worm wheel 636. As shown best in Fig. 54, the thread spaces or helical teeth 642 on the worm wheel occupy less than one-fourth of the total circumference of the worm wheel 636, the remainder of the circumference of the rim of the wheel being fitted with a thread 643 of zero pitch. Hence, the shaft 620 will make a revolution during approximately one-fourth of the revolution of cam shaft 376 and will be quiescent during the remainder of the cycle.

The driving pinion 634 is fitted with twenty four teeth, and the knotter pinion driven thereby is equipped with twelve teeth, thus the knotter pinion will make two revolutions during each cycle of operation of the machine. The rotary movement of the knotter pinion will be at all times in the same direction except for a slight reverse movement at the end of its rotation to relieve the knot of its spring inherent after the wrapping operation, thereby permitting the knot to be withdrawn freely from the knotter pinion. To permit such slight reverse movement of the knotter pinion while at the same time bringing the slot of the knotter pinion into its normal vertical position, the leading end of the zero-pitch thread portion 643 is made with a curved offset 644 which throws the knotter pinion slightly over or beyond the vertical the necessary amount so that when the thread portion 643 of the thread finally positions pinion 635 the latter will have been brought back to its vertical position.

I will now describe the actual knotting operation. Referring particularly to Figs. 69 to 77 inclusive, and Fig. 97, it will be seen that the left hand hub of the knotter pinion 628 is beveled as shown at 645 to prevent interference with the upwardly curving terminal coil of the spring when the knotter pinion is rotated (see Fig. 71). The right hand side of the knotter pinion does the actual work of wrapping the free wire end 589 around the wire 588 of the terminal convolution.

In Fig. 69, it will be observed that the further side of the end face of the right hand hub portion 627 of the knotter pinion is rounded off on the corner as shown at 646. This permits the wire end 589 to slide freely down said face portion when the rotation of the square shaft 512 moves the parts into the position shown in Fig. 70. When the parts are in the position shown in Fig. 70, the wire end 589, because of its being gripped tightly by clamping finger 590, tends, by reason of its spring tension after bending, to straighten out the bend 647, and therefore presses tightly against the rounded face 646. Hence, when knotter pinion revolves in the direction of arrow 648, at the end of one-half revolution, the end 589, although still occupying the same vertical plane as shown in Fig. 71, will have snapped behind the hook-shaped flange 649. The parts will then be in the position shown in Fig. 74 with the end 589 of the wire lying behind hook portion 649 and partially within a shallow groove 650 formed by the stepped edge 651 (see Fig. 73) of the rounded face portion 646.

On further rotation of knotter pinion in the direction of arrow 651$^a$ the corner of the hook 649 will engage and rotate wire end 589 around the wire 588 which at that time coincides substantially with the axis of the knotter pinion. After such further rotary movement of somewhat more than one and one-half revolutions, the end 589 will have been wrapped around wire 588 into substantially the condition shown in Fig. 77. The overthrow rotary movement of the knotter pinion takes place at the end of its wrapping movement after which the pinion rocks back into its normal position as shown in Fig. 75, relieving the knot from tension and permitting the knotted spring to be readily withdrawn from the slot in the knotter pinion.

*The compressor mechanism.*

The next operation is the setting of the spring, that is to say, the compression of same to a point or to a pressure considerably in excess of that which will be encountered in actual service, so that the springs will be set to a standard length. Referring to Figs. 53 and 104, 652 is an inclined flange formed integrally on the side of cap frame 373, said flange 652 being planed off to receive a horizontally extending cast plate 653 of angular cross section. Said plate 653 has a suitable number of spaced stiffening ribs as at 654 and is adjustably secured to flange 652 by means of bolts 655 extending through slots 656 in said plate.

The top flange 657 of said angle plate 653 is planed off to provide a dove-tailed guide way 657$^a$ which slidably receives a shoe 658 corresponding in cross section with said dove-tailed guide way. To said shoe 658 there is secured, by means of countersunk cap screws 659, a small upstanding bracket 660. At the bottom of dove-tailed groove 657$^a$ there is planed or milled a pair of longitudinally extending grooves or recesses 661 and 662 of rectangular cross section for permitting longitudinal movement of the downwardly projecting heads of pins 663 and 664 fixed in opposite ends of shoe 658. The grooves 661 and 662 with the corresponding pins 663 and 664 are not in alignment, but are laterally offset to bring them in line with chains 665 and 666 trained over a pair of grooves in the circumference of idler pulley 667, the ends of said chains being respectively secured to the depending heads of pins 663 and 664.

Referring now to Fig. 56$^a$, it will be observed that chain 665 extends downwardly to a clevis bolt 668 adjustably secured by means of suitable nuts as at 669 in the end of a cam arm 670. Said cam has one end pivoted on a pin 671 carried in upstanding bracket 672 bolted to the bed plate 150 of the machine and is equipped with a suitable cam roll 673 cooperating with a radial cam 674 keyed to the main cam shaft 376. Similarly chain 666 extends down and is connected to the outer end of a cam arm 675 pivoted on pin 671 and equipped with a suitable cam roll 676 cooperating with radial cam 677 also keyed to main cam shaft 376. Cams 674 and 677 are so shaped that they will impart to chains 665 and 666 movements of equal linear speed, but of course, in opposite directions, so that as the shaft 376 rotates, the slide or shoe 658 will be reciprocated back and forth in the dovetailed groove 657$^a$.

Straddling the guide way 657$^a$ is a bracket 678 bifurcated to provide spaced legs as at 679, bolted to the top of flange or shelf 657. The legs 679 are spaced and suitably shaped with the necessary clearance to permit bracket 660 to pass through the bracket 678 when the shoe 658 is drawn toward the left of Fig. 104, that is to say, inwardly of the machine. Bracket 660 is formed with an upstanding boss 680 drilled longitudinally to form a bearing for the journal 681 of a fluted key-bar 682, said key-bar 682 having a suitable flange 683 and a head 684 preventing longitudinal movement of said key-bar within bearing 680.

The key-bar 682 has its outer surface milled or planed to form axially parallel longitudinally extending key-ways or flutes 685, the outer end of the bar extending through the bore of the collar or head 686 carried on the end of said key-bar 682. The said bore is not circular, but is milled out to fit the keyways in key-bar 682 (see Fig. 114). Bar 682 can slide through head 686, but cannot rotate in same. Head 686 is slidably contained in a pocket 687 bored out in the top of bracket 678 and is equipped with a wear plate 688 screwed to the face of the head 686 by flat head screws 689.

A bumper spring 690 serves to prevent the head 686 from delivering too great a shock to the bracket 678 when the head 686 is retracted by bar 682. Said spring 690 is contained in the annular space 691 formed by reducing the diameter of the left hand of head 686, as shown at 692. In order to prevent the spring 690 from being displaced, the right hand end of same is preferably welded or soldered to the shoulder 693. In order to prevent the head 686 from flying off the end of key-bar 682 a small collar 694 is fixedly secured on the end of key-bar 682, said collar being of somewhat greater diameter than that of bar 682, measured between the keyways. The head 686 is at its left hand end bored out to receive said collar 694.

In the end of key-bar 682 there are drilled a set of eight holes 695, the axes of which are parallel with the axis of the key bar and are arranged at equi-spaced points around a circle also concentric with the axis of the key bar. Two of said holes are shown in Fig. 110.

Referring now particularly to Figs. 104 to 113, inclusive, 696 is a casting bolted to the top of flange 657, said casting 696 having a pair of spaced upper extensions 697 and 698, said extensions 697 and 698 being formed with bosses 699 and 700 aligned with key-bar 682. The rear boss 699 is bored out to form a bearing for sleeve 701, which has a central enlargement 702 formed with ratchet teeth as indicated at 703 in Fig. 111. In order to facilitate the insertion of sleeve 701 the boss 699 is made in two parts clamped together by bolts 704 as indicated in said figure.

The right hand boss 700 of casting 696 is bored out to act as a bearing for rotary sleeve 704', the left hand end of which is also rotatably supported in an enlargement of the right hand end of boss 699. On the right hand end of said sleeve 704' (see Fig. 105) there is formed a flange or face plate 705 fitted with a steel wear plate 706 secured by flat head screws 707. The circumference of face plate 705 is formed with ratchet teeth 708 facing in the same direction as the ratchet teeth 703.

Immediately above the ratchet wheel 702 and formed as an integral extension of the upper bearing 699 is a boss 709 bored out vertically to form a cylindrical recess 710 containing a coiled compression spring 711. Said compression spring 711 surrounds the stem of a small plunger 712 extending upwardly through a hole drilled in boss 709 and having a head 713 against which the lower end of the compression spring 711 presses thereby forcing said plunger 712 downwardly toward the center of bearing 699. On the lower end of plunger 712 and below the head 713 there is formed a pawl or dog 714 which cooperates with ratchet teeth 703 to prevent sleeve 701 from moving in more than one direction of rotation. A pin 715 fixed in a hole drilled transversely and diametrically through the upper end of plunger 712 rides in a vertical slot 716 and prevents plunger 712 from turning.

The teeth of ratchet wheel 705 are engaged by a pawl 717 on the bottom end of a plunger 718 similar to plunger 712 and serving the same purpose. Said plunger 718 is forced downwardly by a spring 719 contained in a recess 720 in boss 721, the lower end of said spring pressing against a head or collar 722 fixed on plunger 719 while the upper end of said spring bears against the bushing 723 screwed into boss 721 and through which plunger 718 slidably extends. Diametric pin 724 cooperates with slot 725 to maintain plunger 718 in its proper angular position with respect to ratchet teeth 708. In order to prevent ratchet wheel 705 from moving away from bearing 700 the bearing sleeve 704', behind bearing boss 700 is equipped with a collar 726 fixed in place on said sleeve by set screw 727.

The ratchet sleeve 701 is bored out to the proper diameter to rotatably and slidably accommodate a rifle bar 728, said rifle bar having milled therein, a pair of helical grooves 729. To the left hand end of sleeve 701 there is secured by suitable pins or screws 730 a key plate 731 provided with inwardly extending keys as at 732 arranged to fit and slide in rifle grooves 729. On the other end of ratchet sleeve 701 and secured thereto in a manner similar, there is a key plate 733 also provided with inwardly projecting parts or keys 734 fitting said rifle grooves 729. Rifle bar 728 is of less diameter than the interior of sleeve 704 and is rotatable and slidable in a collar or bushing 735 secured in the end of sleeve 704' by a pin 736.

The right hand end of rifle bar 728 is unrifled as indicated at 737 and at its extremity is reduced in diameter as indicated at 738 to fit in an aperture drilled in a cylindrical plunger 739, said parts being rigidly secured together by a diametric pin 740. The outer end of plunger 739 is drilled to receive a set of four fixed pins 741 arranged to register with alternate apertures 695 in the end of the fluted key bar 682. The ends of apertures 695 are countersunk slightly as indicated at 742 and the ends of pins 741 are rounded somewhat as indicated at 743 so that the ends of pins 741 will readily enter said apertures.

The head 739 is of the proper diameter to slide freely in sleeve 704, but is prevented from rotating in said sleeve by a pair of keys 744 fixed in the periphery of head 739. Normally the rifle bar 728 is forced in a right hand direction and held in the full line position shown in Fig. 105 by means of a coiled compression spring 745 located in the annular space between rifle bar 728 and sleeve 704, one end of said spring engaging against the bushing 735 and the other end of said spring pressing against the left hand end of head 739.

The purpose of the rifle bar and ratchet arrangements just described is to effect a rotary movement of the work so as to bring the knot into such position that it will not interfere with the nesting of the springs in said shoe 746. It will be understood that springs of this character are bulky, and in order to conserve space and facilitate transportation and handling within the factory, should be delivered in the form of nested rows. The operation of the combined setting and ratcheting or positioning mechanism will now be described.

After the spring has been knotted, it is grasped by the grippers of arm 468 and moved into a position coaxial with fluted key bar 682 and rifle bar 728, rifle bar 728 being at that time in its retracted position as shown in Fig. 104. Before the spring is released by the grippers, bar 682 will commence to slide inwardly or forwardly by reason of cam 674 operating chain 665 thereby causing the end of fluted key bar 682 to enter the coils of the spring. Before collar 683 strikes against the rear of head 686, the grippers are released and the transfer mechanism retires. When said collar 683 strikes the compression head 686, the latter is carried forward with the fluted bar 682 and compresses the spring to the desired amount. During this time the spring is prevented from buckling or being laterally distorted because it is guided by fluted key bar 682. The spring is thus given the required amount of "set" and its length standardized.

During the time that the spring is being compressed by compression head 686, the end of bar 682 has engaged the end of head 739 on rifle bar 728 and during the remainder of the forward inward movement of fluted bar 682 the rifle bar 728 slides inwardly against the compression of spring 745. During such inward sliding movement of rifle bar 728, it rotates on its axis because of its rifle grooves being keyed with ratchet 701, such rotation is compelled by pawl 714 which engages ratchet teeth 703 and prevents sleeve 701 from turning. It will be understood that rifle bar 728 cannot rotate in face plate 705 because of the keys 744, and therefore turns face plate 705, such rotation being permitted by ratchet teeth 708 wiping past pawl 717. The rotation of plate 705 will be in the direction of arrow 747 and during such rotation the fluted key bar 682 will also be rotated by reason of pins 741 being engaged in apertures 695. On the return movement of the rifle bar 728 due to compression spring 745, plate 705 will be locked against rotation by ratchet teeth 708 engaging pawl 717 while ratchet sleeve 701 will be permitted to rotate in the direction of arrow 748 by ratchet teeth 703 slipping past pawl 714. The rotary movement of face plate 705, in conjunction with a corresponding rotary movement of compression head 686 between which two parts the work is at that time compressed, causes rotary movement of the work around its axis, and brings the knot into the desired angular position to effect proper nesting of the springs.

I will now describe the operation of the entire machine. It will first be understood that if a revolution of cam shaft 276 on cam shaft 376 be considered a cycle, there will be a complete spring produced at each cycle of the machine, while three cycles will be consumed in the passage of the wire through the machine until it emerges as a delivered or nested spring.

As previously described, the wire fed from a suitable reel is delivered to the straighteners 242 and 243 and is drawn forward and propelled through the machine by the two pairs of rolls 207, 212, 208 and 213, which force the wire through the wire guide 254 and against the bending arm 270 which curves the wire into spiral form. During the coiling of the wire the convolutions are spaced by the movable pitch controller 323 and after the necessary length of wire has been fed forward by the feeding rolls, the cutting mechanism 327—329 operates to sever the coil, the two pairs of feeding rolls being at that time slightly separated to arrest feeding movement of the wire.

Slightly before the actual severing of the coiled spring from the end of the wire, the grippers of arm 469 have been dropped and seize the coiled spring. Immediately after the wire has been cut, the gripper arm 469 makes a forward stroke and locates the spring in line with the knotting mechanism. Center 527 and parts carried by the knotting saddle approach and seize the spring whereupon the grippers of transfer arm 469 open and rise and arm 469 makes a return stroke. Meanwhile, the second turn of the spring has been located in fork 586 and 587 and locating arm 560 has made a to and fro oscillation to position the severed end of the coil.

Clamping finger 589 is then elevated and the center 567 and parts carried by the swinging member 544 swing down carrying with them the spring and bending the severed end of the spring on abutment 613 also carrying the first turn of the spring into the slot of knotter pinion. Knotter pinion is then rotated slightly more than two revolutions then making a slight backward movement to bring the slot again vertical and square shaft 512 is again rocked back into its normal position to move center 527 and parts carried by swinging arm 544 back into normal position as shown in Fig. 69, at the same time disengaging the knot from the knotter pinion.

Finger 589 then falls back and at the same time transfer arm 468 rocks down and its grippers grasp the spring. Immediately thereafter, the saddles respectively carrying center 529 and the knotting mechanism move away from each other leaving the spring supported in the air by the grippers of arm 468.

Arm 468 then advances one stroke and slides the spring in between face plate 706 and compression head 686 in readiness for the spring to be compressed and twisted. Grippers of arm 468 are then opened, leaving the spring axially aligned with the compression head and then arm 468 rises out of the way and makes a backward stroke to a position in line with the knotting mechanism to receive the next spring which is knotted. After the grippers of arm 468 have moved out of the way, fluted key bar 682 advances into the spring and collar 683 strikes compression head. At the same time rifle bar 728, when its head 739 is engaged by end of fluted key bar 682, rotates and twists the spring about its axis to bring the knot up from the bottom of the coil and into a forward position for proper nesting. Key bar 682 and compression head 686 then retire, leaving the spring held by a slight compressive tension between compression head 686 and face plate 705. When swinging arm 468 moves another spring into alignment with the compression head, the pusher 510 slides the finished spring out from between compression head and face plate 706 and into the end of the nested row of springs in trough 746.

In connection with delivery trough 746, it may sometimes be found desirable to employ a block of wood or other object fitting loosely within the trough and slidable therein in order to furnish a slight resistance, to facilitate proper nesting of the springs one within the other, also to hold the springs in proper position and prevent them from rolling down the trough, which may, if desired be placed on a slight incline. When in their normal position, the face plate 706 and compression plate 688 constitute in effect parts of the trough 746 which at a point intermediate the knotting mechanism is flared out in order properly to guide the ends of the spring when the latter is moved or slid in between the face plate and compression head.

The described details of construction and operation being merely illustrative of a single phase of my invention, it will be understood that the scope of the invention should be determined by reference to the appended claims, said claims being construed as broadly as possible, consistent with the state of the art.

I claim as my invention:

1. In a spiral spring making machine, the combination of feed rolls, means for continuously operating said feed rolls to move forward a length of wire, a pivotally mounted bender engaging said wire fed forward by said rolls, means for swinging said bender on its pivot as it engages said wire so as to shape the same into helical form, means for temporarily arresting the effect of said feed rolls, while maintaining them in rotation, a pitch controller, means for moving said pitch controller to regulate the pitch of the spring convolutions, and a cutting device operative during the period of rest of the wire.

2. In a machine of the class described, the combination of a pair of axially parallel cooperating feed rolls for propelling a length of wire to be formed into a coil spring, a shaft, a cam synchronized with the feed rolls for rocking said shaft according to a predetermined plan, a bender integral with said shaft for bending said wire as it is fed forward, whereby said length is converted into a coil having convolutions of various diameters, a pitch control member mounted so as to be movable in the direction of the axis of said coil and a cam for effecting movement of said member according to a predetermined plan during formation of said coil whereby the pitch of said coil may be varied during formation thereof.

3. In combination, a pair of axially parallel cooperating feed rolls for propelling the length of wire to be formed into a coiled spring, a shaft, a cam synchronized with the feed rolls for rocking said shaft on an axis parallel with the roll axis, according to a predetermined plan, a member on said shaft for bending said length of wire subsequent to its delivery by the feed rolls whereby said length is converted into a coil having convolutions of various diameters, a rod slidable in a direction also parallel with the roll axis, a member on said rod for engaging the convolutions formed by the bending member and a cam for effecting sliding movement of said rod according to a predetermined plan, for the purpose of varying the pitch or spacing of the convolutions progressively during the formation of the spring.

4. In combination, a pair of axially parallel cooperating feed rolls for propelling the length of wire to be formed into a coiled spring, a shaft, a cam synchronized with the feed rolls for rocking said shaft on an axis parallel with the roll axis, according to a predetermined plan, a member on said shaft for bending said length of wire subsequent to its delivery by the feed rolls whereby said length is converted into a coil conveying convolutions of various diameters, a rod slidable in a direction also parallel with the roll axis, a member on said rod for engaging the convolutions formed by the bending member and a cam for effecting sliding movement of said rod according to a predetermined plan, for the purpose of varying the pitch or spacing of the convolutions progressively during the formation of the spring, independently of the movement of the bender.

5. In combination, a pair of axially parallel cooperating feed rolls for propelling the length of wire to be formed into a coiled spring, a shaft, a cam synchronized with the feed rolls for rocking said shaft on an axis parallel with the roll axis, according to a predetermined plan, a member on said shaft for bending said length of wire subsequent to its delivery by the feed rolls whereby said length is converted into a coil conveying convolutions of various diameters, a rod slidable in a direction also parallel with the roll axis, a member on said rod for engaging the convolutions formed by the bending member and a cam for effecting sliding movement of said rod according to a predetermined plan, for the purpose of varying the pitch or spacing of the convolutions progressively during the formation of the spring, independently of the movement of the bender, the arrangement including means for severing said length from a continuous wire supply after a complete cycle of operations of the bender and of the convolution spacing.

6. In combination, a pair of axially parallel cooperating continuously rotating feed rolls for propelling the length of wire to be formed into a coiled spring, a shaft, a cam synchronized with the feed rolls for rocking said shaft on an axis parallel with the roll axis, according to a predetermined plan, means operative during a cycle of the machine for relatively moving the feed rolls to arrest forward movement of the wire, a member on said shaft for bending said length of wire subsequent to its delivery by the feed rolls whereby said length is converted into a coil conveying convolutions of various diameters, a rod slidable in a direction also parallel with the roll axis, a member on said rod for engaging the convolutions formed by the bending member and a cam for effecting sliding movement of said rod according to a predetermined plan, for the purpose of varying the pitch or spacing of the convolutions progressively during the formation of the spring, independently of the movement of the bender, the arrangement including means for severing said length from a continuous wire supply after a complete cycle of operations of the bender and of the convolution spacing.

7. In a machine for making coiled wire springs, the combination of a pair of rolls on substantially parallel axes and grooved to receive and grip between their perforations the end of a continuous wire supply, means for driving said rolls to propel said wire, a radial cam, means for rotating said cam on an axis parallel with the roll axis and in synchronism with said rolls, a lever connected to one of said rolls to move the same relatively to the other roll and thereby to effect a change in the gripping effect of said pair of rolls and a lever connected between said member and said cam whereby rotation of said cam will control the gripping effect of said rolls and the movement of the wire.

8. In a machine of the class described, the combination of a pair of spaced axially parallel roll shafts, one of said roll shafts being movable away from or toward the other roll shaft for a limited amount, a lever pivoted intermediate said roll shafts, a cam concentric with one of said roll shafts and driven in synchronism therewith, said lever cooperating with said cam and the other roll shaft to effect said relative movement.

9. In a machine for making coiled wire springs, the combination of means for propelling the end of a continuous wire supply and means for bending said wire into the form of a coil having convolutions of different diameters comprising a pivoted arm having a face portion extending across the path of the wire, obliquely to the length of the latter, and operative to engage the wire as it is fed forward, and means for swinging said arm according to a predetermined plan.

10. In a machine for making spiral springs, the combination of feed rolls, means for rotating said feed rolls to feed forward a length of wire, a rock shaft, a bender on said rock shaft for directly engaging said wire as the latter is fed forward, means for rocking said shaft and thereby to oscillate said bender as the latter engages the wire so as to vary the radius of the bend, and a pitch controller comprising a member adapted to engage said wire after the bending operation to space the helicals as they are formed by the bender to form same into a spiral and means for severing said spiral from said length of wire.

11. In a machine of the class described, the combination of a pair of continuously rotated feed rolls for feeding forward a length of wire, means for intermittently arresting the effect of said feed rolls, a rock shaft having means thereon for engaging said wire as it is fed forward, means for rocking said shaft during the bending operation so as to vary the effect of said bending means whereby the wire is shaped into a coil having convolutions of various diameters, means for engaging the wire so as to axially space the successive convolutions as they are formed, comprising a member movable in the direction of the axis of the formed coil and means for moving said member during formation of the coil so as to vary said spacing according to a predetermined plan.

12. In a spiral spring machine, the combination of feed rolls, means for continuously rotating said feed rolls to feed forward a length of wire, a rock shaft, means on one end of said rock shaft for engaging the wire as it is fed forward to shape the same into a coil, means for rocking said shaft according to a predetermined plan whereby said wire engaging means is effective to shape the wire into a coil having convolutions of various diameters, pitch control means for spacing the successive convolutions and means for automatically moving said control means so as to vary the spacing of said convolutions according to a predetermined plan, means for severing the coil from said wire length comprising a stationary member, a movable member mounted so as to be slidable in the direction of its axis, means on the end of said movable member for cooperating with said stationary member to cut the wire, means for sliding said movable member to effect the cutting operation and means for arresting the effect of said feed rolls during said cutting operation.

13. In a spiral spring machine, the combination of feed rolls, means for continuously rotating said feed rolls to feed forward a length of wire, a rock shaft, means on one end of said rock shaft for engaging the wire as it is fed forward to shape the same into a coil, means for rocking said shaft according to a predetermined plan whereby said wire engaging means is effective to shape the wire into a coil having convolutions of various diameters, pitch control means for spacing the successive convolutions and means for automatically moving said control means so as to vary the spacing of said convolutions according to a predetermined plan, means for severing the coil from said wire length comprising a stationary member, a movable member mounted so as to be slidable in the direction of its axis, means on the end of said movable member for cooperating with said stationary member to cut the wire, cam means for effecting the cutting operation and means for arresting the effect of said feed rolls during said cutting operation.

14. In combination, a set of axially parallel feed rolls for propelling a length of wire, a shaft oscillatably mounted on an axis parallel with the roll axes, an arm on said shaft for engaging and bending a length of wire delivered by the rolls to form same into a coil, a radial cam rotatable on an axis parallel with the roll axis and means connecting said cam with said arm manually adjustable for changing the effect of the cam on the arm.

15. In combination, a set of axially parallel feed rolls for propelling a length of wire, a shaft oscillatably mounted on an axis parallel with the roll axes, an arm on said shaft for engaging and bending a length of wire delivered by the rolls to form same into a coil, a radial cam rotatable on an axis parallel with the roll axis and means connecting said cam with said arm, comprising another arm pivotally mounted on an axis parallel with the cam axis, an arm member on said bender shaft engaging said last mentioned arm.

16. In combination, a set of axially parallel feed rolls for propelling a length of wire, a shaft oscillatably mounted on an axis parallel with the roll axes, an arm on said shaft for engaging and bending a length of wire delivered by the rolls to form same into a coil, a radial cam rotatable on an axis parallel with the roll axis and means connecting said cam with said arm, comprising another arm pivotally mounted on an axis parallel with the cam axis, an arm member on said bender shaft engaging said last mentioned arm, said last named element being provided with adjustable means for changing the angular position of said bender shaft.

17. In combination, a pair of feed rolls for propelling a length of wire to be wound into a coil, means for bending a wire to form said length into a coil having a plurality of convolutions and means for progressively varying the pitch of said convolutions during the formation of the coil comprising a lever having one end thereof stationarily pivoted for swinging the other end in a direction substantially parallel with the axes of the rolls, means on said last named end for engaging a previously bent wire, and a cam for progressively controlling the swinging movement of said lever according to a predetermined plan, during the formation of said coil.

18. In a spiral spring machine, the combination of feed rolls, means for continuously rotating said feed rolls to feed forward a length of wire, a rock shaft, means on one end of said rock shaft for engaging the wire as it is fed forward to shape the same into a coil, means for rocking said shaft according to a predetermined plan whereby said wire engaging means is effective to shape the wire into a coil having convolutions of various diameters, pitch control means for spacing the successive convolutions and means for automatically moving said control means so as to vary the spacing of said convolutions according to a predetermined plan, means for severing the coil from said wire length comprising a stationary member, a movable member mounted so as to be slidable in the direction of the axis of the formed coil, means on the end of said movable member for cooperating with said stationary member to cut the wire, cam means for effecting the cutting operation and means for arresting the effect of said feed rolls during said cutting operation.

19. In combination, a set of feed rolls adapted to receive between them, grip and propel a length of wire to be formed into a coil, a stationary knife, a reciprocable shear member cooperating with said knife and movable in a direction substantially parallel with the roll axes to sever the roll wire, cam means operable to actuate said reciprocable shear member with a relatively quick movement, a bender for coiling the wire behind the edge of said stationary knife, guide means interposed between the bender and the rolls and means for progressively moving said bender during the formation of the coil to vary the diameter of the convolutions thereof.

20. In combination, means for propelling the end of a continuous wire supply, means for bending said wire as propelled for converting a length of same into a coil, means for progressively varying the pitch of the convolutions of said coil during the formation thereof, a stationary knife for severing a completed spring, a movable shear member cooperating with said knife, a cam, means for positively reciprocating said shear member back and forth, comprising a single rotary member, a cam on said rotary member engaging said shear member for moving said shear in one direction, and another cam on said rotary member for moving said shear in the other direction.

21. In a machine for coiling and knotting springs, the combination of coiling mechanism, knotting mechanism, means for transferring the coiled spring directly from the coiling mechanism to the knotting mechanism and means for compressing the spring after same has been knotted.

22. In a combined machine for coiling and knotting springs, the combination of mechanism for coiling the end of a continuous wire length into the form of a spring, means for severing said spring from the continuous length after the coiling thereof, knotting mechanism, means for transferring the coiled and severed spring directly from the coiling and severing mechanisms to the knotting mechanism, means for compressing the spring after the same has been knotted, and mechanism for transferring the knotted spring from the knotting mechanism to the compressing mechanism.

23. In combination, coiling mechanism, knotting mechanism and compressing mechanism for producing finished, coiled, knotted and compressed springs, and transfer mechanism for moving the coiled spring successively into the field of the knotting mechanism and of the compressor mechanism and for delivering said spring from the compressor mechanism.

24. In combination, mechanism for coiling the end of a continuous wire length in the form of a spring, severing mechanism for cutting off said spring from the continuous wire length, knotting mechanism, compressor mechanism, the coiling, knotting and compressor mechanisms being located substantially in line, and means for moving the coiled spring successively step by step from the coiling to the knotting mechanism and from the knotting mechanism to the compressor mechanism.

25. In combination, mechanism for coiling the end of a continuous wire length in the form of a spring, severing mechanism for cutting off said spring from the continuous wire length, knotting mechanism, compressor mechanism, the coiling, knotting and compressor mechanisms being located substantially in line, and means for moving the coiled spring successively step by step from the coiling to the knotting mechanism and from the knotting mechanism to the compressor mechanism for delivering the completed spring from the compressor mechanism in a direction aligned with said line.

26. In combination, coiling mechanism for operating upon the end of a continuous wire length to form a coiled wire spring, severing mechanism synchronized with the coiling mechanism and operating after an operative movement of the latter, and knotting mechaism and transfer mechanism for effecting movement of the coiled and severed spring from the coiler to the knotter and comprising gripping mechanism arranged to grasp the coiled spring prior to severance and maintain said grasp until said spring is carried into the field of the knotting mechanism.

27. In combination, coiling mechanism for operating upon the end of a continuous wire length to form a coiled wire spring, severing mechanism synchronized with the coiling mechanism and operating after an operative movement of the latter, and knotting mechaism and transfer mechanism for effecting movement of the coiled and severed spring from the coiler to the knotter and comprising gripping mechanism arranged to grasp the coiled spring prior to severance and maintain said grasp until said spring is carried into the field of the knotting mechanism, the knotting mechanism including means for effecting control of the spring while the latter is still grasped by the transfer mechanism.

28. In combination, coiling mechanism which includes a bender and means for intermittently feeding the end of a continuous wire length to said bender to form a coil, severing mechanism synchronized with the feed and bending mechanism and arranged to operate during a period of inactivity of the feed mechanism, a gripper for grasping the coiled spring before the same has been severed, knotting mechanism provided with means for grasping the spring, a transfer mechanism for moving said gripper to convey the spring from the coiling mechanism to the knotting mechanism and arranged to maintain said gripper in operative gripping engagement with the coiled spring from the time the spring is severed until same is grasped by the knotting mechanism.

29. In combination, coiling mechanism, knotting mechanism, and compressor mechanism arranged in a series, means for moving a coiled spring from the coiling mechanism step by step through the field of the other two mechanisms comprising a pair of gripping mechanisms spaced apart substantially in accordance with the spacing of said mechanisms and means for reciprocating said grippers in unison.

30. In combination, coiling mechanism, knotting mechanism, and compressor mechanism arranged in a series, means for moving a coiled spring from the coiling mechanism step by step through the field of the other two mechanisms comprising a pair of gripping mechanisms spaced apart substantially in accordance with the spacing of said mechanisms and means for reciprocating said grippers in unison, the arrangement providing for transfer of each spring from one gripper to the other gripper in the progress of the spring though said mechanisms.

31. In combination, coiling mechanism, knotting mechanism, and compressor mechanism arranged in a series, means for moving a coiled spring from the coiling mechanism step by step through the field of the other two mechanisms comprising a pair of gripping mechanisms spaced apart substantially in accordance with the spacing of said mechanisms and means for reciprocating said grippers in unison, the arrangement providing for transfer of each spring from one gripper to the other gripper in the progress of the spring through said mechanisms and for preventing conflict between said grippers and the spring being operated upon by the intermediate mechanism.

32. In combination, a set of three mechanisms for successively operating upon a wire unit and arranged substantially in an equi-spaced series, a pair of grippers for effecting transfer of the unit step by step from one mechanism and successively into the fields of the other mechanisms and reciprocable in unison by steps a distance corresponding to the spacing of said mechanisms and means for effecting movement of said grippers laterally of the direction of reciprocation to avoid interference of the grippers with the wire units being operated upon by the intermediate mechanism.

33. In combination, a set of three mechanisms for successively operating upon a wire unit and arranged substantially in an equi-spaced series, a pair of grippers for effecting transfer of the unit step by step from one mechanism and successively into the fields of the other mechanisms and reciprocable in unison by steps a distance corresponding to the spacing of said mechanisms and means for effecting reciprocatory movement of said grippers laterally of the direction of reciprocation to avoid interference of the grippers with the wire units being operated upon by the intermediate mechanism.

34. In combination, a set of three mechanisms for operating upon a wire unit and arranged in substantially equi-spaced alignment, a carriage reciprocating in a direction parallel with said series of mechanisms, its stroke corresponding with the spacing of said mechanisms, a pair of gripping mechanisms mounted on said carriage, moving therewith and spaced a distance equal to the mechanism spacing, means for laterally shifting said gripping mechanisms on said carriage at the ends of its reciprocations to permit transfer of the wire unit from one gripper to the other gripper during the time said unit is in the field of the intermediate mechanism.

35. In combination, a set of three mechanisms for operating upon a wire unit and arranged in substantially equi-spaced alignment, a carriage reciprocating in a direction parallel with said series of mechanisms, its stroke corresponding with the spacing of said mechanisms, a pair of gripping mechanisms mounted on said carriage, moving therewith and spaced a distance equal to the mechanism spacing, means for laterally shifting said gripping mechanisms on said carriage at the ends of its reciprocations to permit transfer of the wire unit from one gripper to the other gripper during the time said unit is in the field of the intermediate mechanism, the arrangement including means for maintaining said unit in the field of and under the control of said intermediate mechanism during the period of transfer from one gripper to the other gripper.

36. In combination, coiling mechanism, knotting mechanism, and compressor mechanism arranged in equi-spaced alignment, a carriage reciprocating parallel to said line, arms spaced on said carriage, a pair of grippers on each of said arms and arranged to grasp a spring operated on by said first three mentioned mechanisms, means for rocking said carriage to move said arms laterally of the line of reciprocation, and means for operating said grippers to open and close the same after rocking movement of said carriage in one direction only.

37. In combination, mechanism for coiling a wire spring, mechanism for knotting said spring, means for setting said spring after same has been knotted and means for turning said spring after same has been knotted and before delivery thereof, to facilitate nesting.

38. In combination, mechanism for coiling a wire spring, mechanism for knotting said spring, and means for turning said spring after same has been knotted and before delivery thereof, to facilitate nesting.

39. In combination, mechanism for coiling a wire spring, mechanism for knotting said spring, means for turning said spring after same has been knotted and before delivery thereof, to facilitte nesting, and means for compressing said spring after knotting as an incident to the turning movement thereof.

40. In combination, coiling mechanism, knotting mechanism, compressing mechanism, means associated with the compressor mechanism for effecting a turning movement of the spring around its axis and transfer mechanism for effecting successive movements of the spring from the coiling mechanism to the knotting mechanism, from the knotting mechanism to the compressor mechanism and for delivering said spring from the compressing mechanism.

41. In combination, coiling mechanism, knotting mechanism, compressing mechanism, means associated with the compressor mechanism for effecting a turning movement of the spring around its axis and transfer mechanism for effecting successive movements of the spring from the coiling mechanism to the knotting mechanism, from the knotting mechanism to the compressor mechanism and for delivering said spring from the compressing mechanism, the knotting mechanism and the compressing mechanism being provided with means for holding the spring while the latter is in the field of said knotting and compressing mechanisms.

42. In combination, coiling mechanism, knotting mechanism, compressing mechanism, means associated with the compressor mechanism for effecting a turning movement of the spring around its axis, transfer mechanism for effecting successive movements of the spring from the coiling mechanism to the knotting mechanism, from the knotting mechanism to the compressor mechanism and for delivering said spring from the compressing mechanism, the knotting mechanism and the compressing mechanism being provided with means for holding the spring while the latter is in the field of said knotting and compressing mechanisms, whereby the transfer mechanism may deliver control of the spring to said mechanisms while said mechanisms are operating upon said spring.

43. In combination, a coiler, a knotter, and compressor arranged in a straight line and equi-spaced from each other in said order, means associated with the compressor for rotating the knotted spring to facilitate nesting after delivery thereof, and transfer mechanism for effecting successive step by step straight line movements of the spring from the coiling mechanism and successively to the knotting mechanism and compressing mechanisms and for delivering said spring from the compressing mechanism after it has been rotated.

44. In combination, coiling mechanism, knotting mechanism, transfer means for moving the coiled spring into the field of the knotting mechanism and means for positioning one end of the spring in the knotting mechanism, comprising an abutment, means for forcing the spring endwise against said abutment and a rim enclosing said abutment plate.

45. In a mechanism for knotting the end coil of a spring, the combination of an abutment plate, means for pressing against said plate the end coil of a spring which is to be knotted, and a locating member for rotating the coil into a standard position desired for knotting and arranged to sweep over the surface of the said abutment plate.

46. In a mechanism for knotting the end coil of a spring, the combination of means for positioning a spiral spring and means for grasping said spring by pressure applied toward opposite ends thereof in opposite directions and thereby compressing said spring axially and an enclosure for the end coil of the spring which is to be knotted for preventing said coil from shifting laterally.

47. In a mechanism for knotting the end coil of a spring, the combination of means for positioning a spiral spring and means for grasping said spring by pressure applied toward opposite ends thereof in opposite directions and thereby compressing said spring axially and an enclosure for the end coil of the spring which is to be knotted for preventing said coil from shifting laterally and means for rotating said spring about its axis while in said enclosure to locate said end coil in standard position desired for knotting.

48. In a mechanism for knotting the end coil of a wire spring unit of spiral form, the combination of a pair of members movable toward each other to engage a spring positioned between said members thereby to compress and grasp said spring, one of said members comprising an abutment plate for engaging the end coil which is to be knotted and a locating finger arranged to sweep over said plate to engage the end of said coil for rotating same into standard position desired for knotting.

49. In a mechanism for knotting the end coil of a wire spring unit of spiral form, the combination of a pair of members movable toward each other to engage a spring positioned between said members thereby to compress and grasp said spring, one of said members comprising an abutment plate for engaging the end coil which is to be knotted and a locating finger arranged to sweep over said plate to engage the end of said coil for rotating same into standard position desired for knotting, and a rim projecting on the surface of said plate and surrounding said end coil for positioning the latter.

50. In a mechanism for knotting the end coil of a wire spring unit of spiral form, the combination of a pair of members movable toward each other to engage a spring positioned between said members thereby to compress and grasp said spring, one of said members comprising an abutment plate for engaging the end coil which is to be knotted and a locating finger arranged to sweep over said plate to engage the end of said coil for rotating same into standard position desired for knotting, and a rim projecting on the surface of said plate and surrounding said end coil for positioning the latter, a bending abutment and means for swinging said spring toward said abutment to bend the end of said coil.

51. In a mechanism for knotting the end coil of a wire spring unit of spiral form, the combination of a pair of members movable toward each other to engage a spring positioned between said members thereby to compress and grasp said spring, one of said members comprising an abutment plate for engaging the end coil which is to be knotted and a locating finger arranged to sweep over said plate to engage the end of said coil for rotating same into standard position desired for knotting, and a rim projecting on the surface of said plate and surrounding said end coil for positioning the latter, a bending abutment and means for swinging said spring toward said abutment to bend the end of said coil, said rim being movable over said plate with said spring during said bending operation.

JOHN F. GAIL.